US012585149B2

(12) United States Patent
Qian et al.

(10) Patent No.: US 12,585,149 B2
(45) Date of Patent: Mar. 24, 2026

(54) LIQUID CRYSTAL ON SILICON DISPLAY DEVICE HAVING STACKED INTEGRATED CIRCUIT SUBSTRATES

(71) Applicant: OmniVision Technologies, Inc., Santa Clara, CA (US)

(72) Inventors: Yin Qian, Milpitas, CA (US); Lindsay Alexander Grant, Campbell, CA (US); Sunny Yat-San Ng, San Jose, CA (US); Hongli (Henry) Yang, Saratoga, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 167 days.

(21) Appl. No.: 18/396,489

(22) Filed: Dec. 26, 2023

(65) Prior Publication Data

US 2025/0208454 A1 Jun. 26, 2025

(51) Int. Cl.
*G09G 3/00* (2006.01)
*G02F 1/133* (2006.01)
(Continued)

(52) U.S. Cl.
CPC .... *G02F 1/13306* (2013.01); *G02F 1/133553* (2013.01); *G02F 1/13439* (2013.01);
(Continued)

(58) Field of Classification Search
CPC ........ G02B 2027/0178; G02B 27/0172; G02F 1/13306; G02F 1/133553; G02F 1/13439; G02F 1/13452; G02F 1/136277; G02F 2203/02; G09G 2330/021; G09G 2340/00; G09G 2360/18; G09G 2370/00; G09G 3/36

See application file for complete search history.

(56) References Cited

U.S. PATENT DOCUMENTS

| | | |
|---|---|---|
| 9,459,500 B2 | 10/2016 | Lin et al. |
| 10,620,491 B2 | 4/2020 | Fan |

(Continued)

OTHER PUBLICATIONS

U.S. Pat. No. 9,459,500 B2, issued Oct. 4, 2016 to Lin et al.

(Continued)

*Primary Examiner* — Insa Sadio
(74) *Attorney, Agent, or Firm* — Larry E. Henneman, Jr.; Henneman & Associates, PLC

(57) ABSTRACT

An example liquid crystal display device includes a reflective display backplane and one or more integrated circuit substrates arranged in a stacked configuration. The reflective display backplane includes an array of reflective pixel mirrors and a corresponding array of data latches. The top face of one integrated circuit substrate is connected to the back side of the reflective display backplane and is configured as a display driver, providing control signals to the reflective display backplane using a set of through-silicon-vias. Optionally, another integrated circuit substrate is connected (face-to-back) to the one integrated circuit substrate and is configured to provide virtual reality, augmented reality, and/or other video processing support to the display driver. An example embodiment is provided with a chip-scale-package structure formed on the bottom integrated circuit substrate of the stack.

19 Claims, 52 Drawing Sheets

(51) Int. Cl.
    *G02F 1/1335*     (2006.01)
    *G02F 1/1343*     (2006.01)
    *G02F 1/1362*     (2006.01)
    *G09G 3/36*     (2006.01)
    *G02B 27/01*     (2006.01)

(52) U.S. Cl.
    CPC ......... *G02F 1/136277* (2013.01); *G09G 3/36* (2013.01); *G02B 27/0172* (2013.01); *G02B 2027/0178* (2013.01); *G02F 2203/02* (2013.01); *G09G 2330/021* (2013.01); *G09G 2340/00* (2013.01); *G09G 2360/18* (2013.01); *G09G 2370/00* (2013.01)

(56)             References Cited

U.S. PATENT DOCUMENTS

| | | | |
|---|---|---|---|
| 11,018,206 | B2 | 5/2021 | Yamazaki et al. |
| 11,101,313 | B2 | 8/2021 | Horikoshi et al. |
| 2007/0040965 | A1 | 2/2007 | Kuan et al. |
| 2015/0372065 | A1 | 12/2015 | Yamazaki |
| 2018/0288342 | A1 | 10/2018 | Hicks et al. |
| 2019/0305027 | A1 | 10/2019 | Qian et al. |
| 2020/0092509 | A1* | 3/2020 | Jung .................... H04N 25/771 |
| 2021/0104570 | A1 | 4/2021 | Mitsuhashi et al. |
| 2021/0311112 | A1 | 10/2021 | Tokunaga |
| 2022/0140277 | A1 | 5/2022 | Yang et al. |
| 2022/0229337 | A1 | 7/2022 | Fung et al. |
| 2022/0244603 | A1 | 8/2022 | Ko et al. |
| 2022/0246668 | A1 | 8/2022 | Umebayashi et al. |
| 2022/0293698 | A1 | 9/2022 | Gao et al. |
| 2022/0390783 | A1 | 12/2022 | Amari et al. |

OTHER PUBLICATIONS

U.S. Pat. No. 10,620,491 B2, issued Apr. 14, 2020 to Fan.
U.S. Pat. No. 11,018,206 B2, issued May 25, 2021 to Yamazaki et al.
U.S. Pat. No. 11,101,313 B2, issued Aug. 24, 2021 to Horikoshi et al.
U.S. Patent App. 2007/0040965 A1, dated Feb. 22, 2007 by Kuan et al.
U.S. Patent App. 2015/0372065 A1, dated Dec. 24, 2015 by Yamazaki.
U.S. Patent App. 2018/0288342 A1, dated Oct. 4, 2018 by Hicks et al.
U.S. Patent App. 2019/0305027 A1, dated Oct. 3, 2019 by Qian et al.
U.S. Patent App. 2021/0104570 A1, dated Apr. 8, 2021 by Mitsuhashi et al.
U.S. Patent App. 2021/0311112 A1, dated Oct. 7, 2021 by Tokunaga.
U.S. Patent App. 2022/0140277 A1, dated May 5, 2022 by Yang et al.
U.S. Patent App. 2022/0229337 A1, dated Jul. 21, 2022 by Fung et al.
U.S. Patent App. 2022/0244603 A1, dated Aug. 4, 2022 by Ko et al.
U.S. Patent App. 2022/0246668 A1, dated Aug. 4, 2022 by Umebayashi et al.
U.S. Patent App. 2022/0293698 A1, dated Sep. 15, 2022 by Gao et al.
U.S. Patent App. 2022/0390783 A1, dated Dec. 8, 2022 by Amari et al.
Goto et al., "3-Layer Stacking Technology with Pixel-Wise Interconnections for Image Sensors Using Hybrid Bonding of Silicon-on-Insulator Wafers Mediated by Thin Si Layers," 2022 IEEE 72nd Electronic Components and Technology Conference (ECTC), San Diego, CA, USA, 2022, pp. 122-125.
Honda et al., "Triple-Stacked Silicon-on-Insulator Integrated Circuits Using Au/SiO2 Hybrid Bonding," 2019 IEEE SOI-3D-Subthreshold Microelectronics Technology Unified Conference (S3S), San Jose, CA, USA, 2019, pp. 1-3.
Kagawa et al., "Development of face-to-face and face-to-back ultra-fine pitch Cu—Cu hybrid bonding," 2022 IEEE 72nd Electronic Components and Technology Conference (ECTC), San Diego, CA, USA, 2022, pp. 306-311; and.
Tan et al., "A Back-to-Face Silicon Layer Stacking for Three-Dimensional Integration." 2005 IEEE International SOI Conference Proceedings, Honolulu, HI, USA, 2005, pp. 87-89.
Kagawa et al., "Development of face-to-face and face-to-back ultra-fine pitch Cu—Cu hybrid bonding," 2022 IEEE 72nd Electronic Components and Technology Conference (ECTC), San Diego, CA, USA, 2022, pp. 306-311.

\* cited by examiner

1100

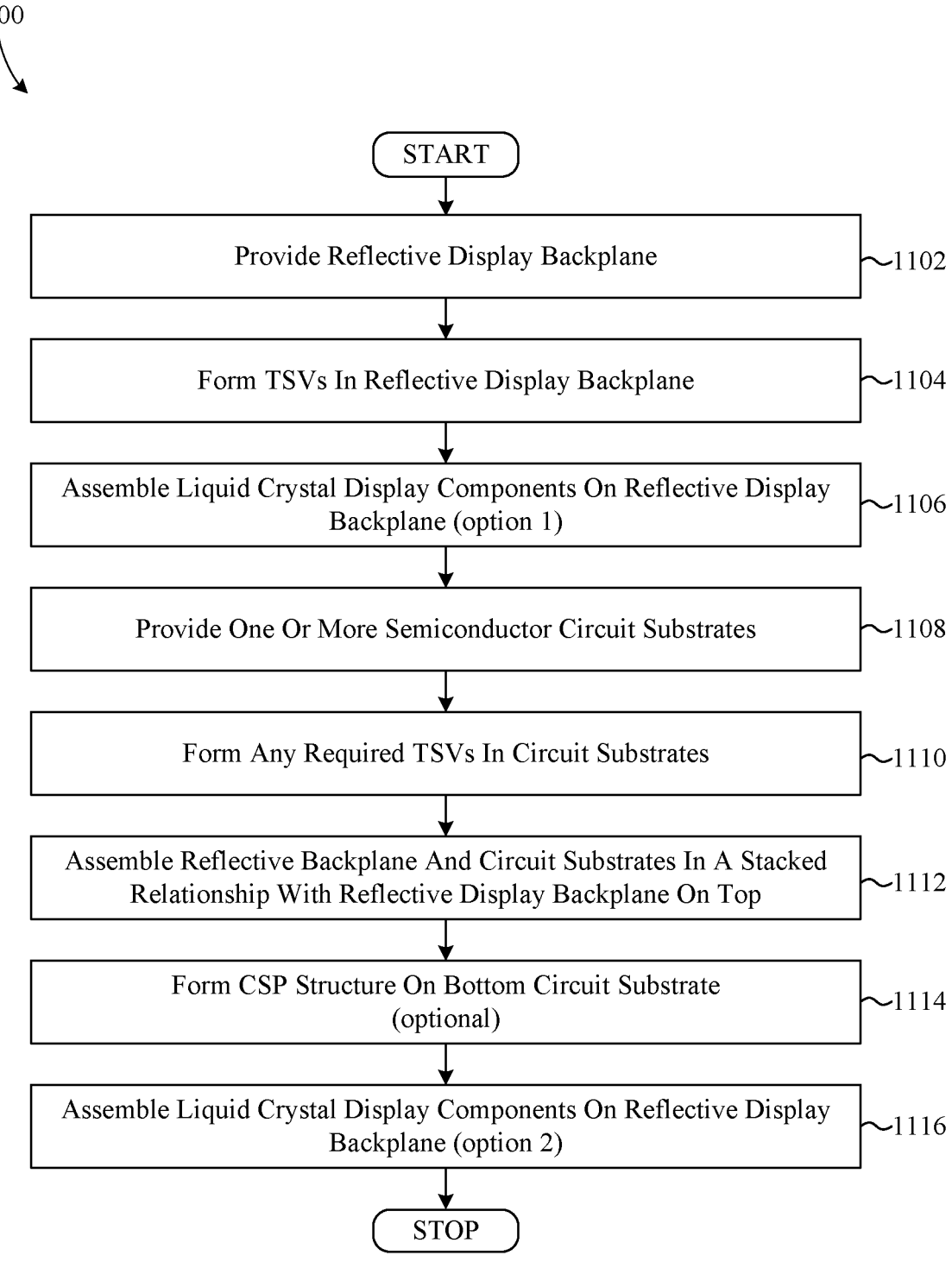

START

Provide Reflective Display Backplane        ~1102

Form TSVs In Reflective Display Backplane        ~1104

Assemble Liquid Crystal Display Components On Reflective Display Backplane (option 1)        ~1106

Provide One Or More Semiconductor Circuit Substrates        ~1108

Form Any Required TSVs In Circuit Substrates        ~1110

Assemble Reflective Backplane And Circuit Substrates In A Stacked Relationship With Reflective Display Backplane On Top        ~1112

Form CSP Structure On Bottom Circuit Substrate (optional)        ~1114

Assemble Liquid Crystal Display Components On Reflective Display Backplane (option 2)        ~1116

STOP

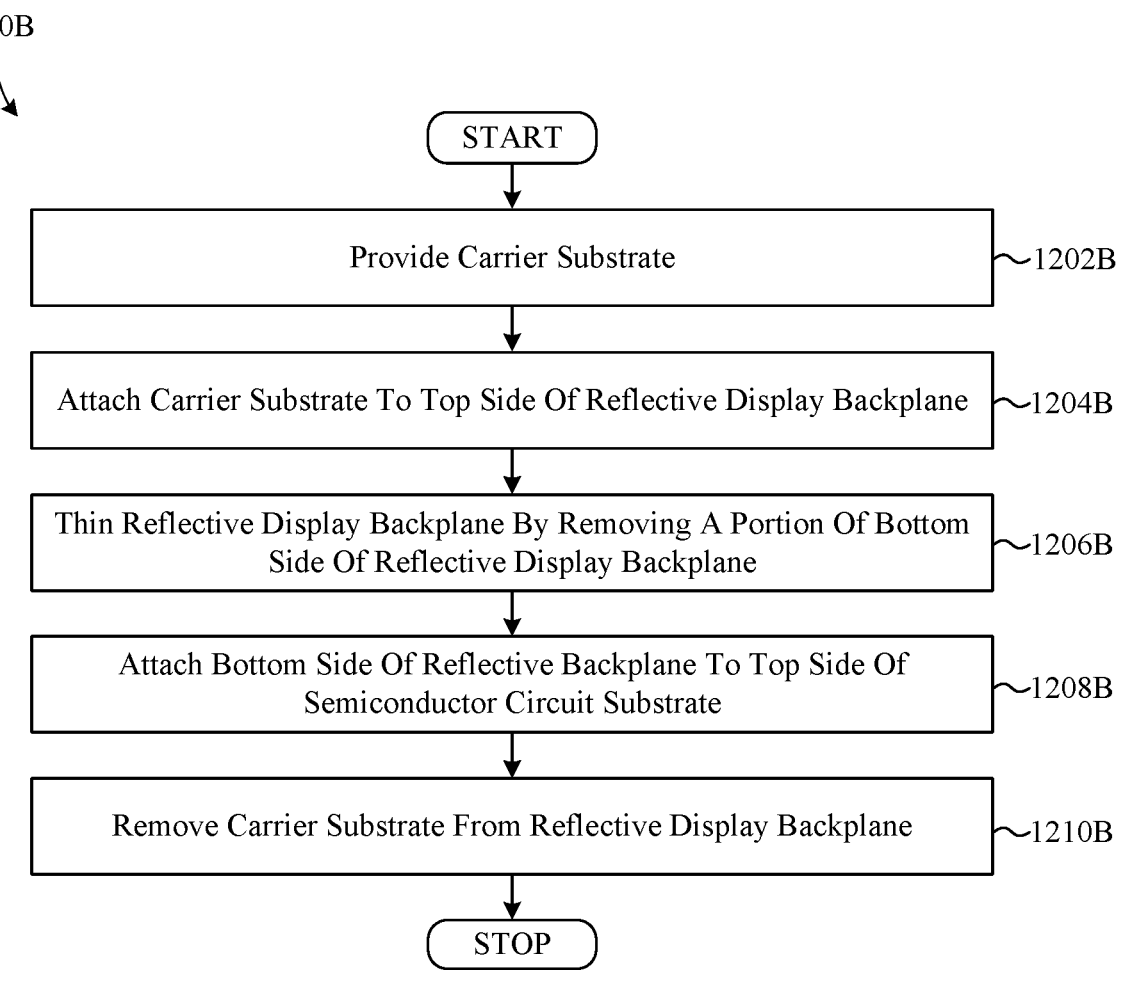

START

Provide Carrier Substrate ~1202B

Attach Carrier Substrate To Top Side Of Reflective Display Backplane ~1204B

Thin Reflective Display Backplane By Removing A Portion Of Bottom Side Of Reflective Display Backplane ~1206B Attach Bottom Side Of Reflective Backplane To Top Side Of Semiconductor Circuit Substrate ~1208B Remove Carrier Substrate From Reflective Display Backplane ~1210B

STOP

FIG. 12B

LIQUID CRYSTAL ON SILICON DISPLAY DEVICE HAVING STACKED INTEGRATED CIRCUIT SUBSTRATES

BACKGROUND OF THE INVENTION

Field of the Invention

This invention relates generally to display devices, and more particularly to liquid crystal on silicon (LCoS) display devices.

Description of the Background Art

Liquid crystal on silicon (LCoS) display devices are currently being incorporated into a variety of host devices including, but not limited to, augmented reality (AR) eyewear, virtual reality (VR) eyewear, automotive applications, and so on.

In such applications, it is important for an LCOS display device to be designed with a high form factor so as to relax design constraints imposed on the hosting device by the module. For example, in AR and VR eyewear applications, such LCOS display devices are typically designed to be as small as possible in order to minimize the space the module occupies on the hosting eyewear. It is also important that LCoS display devices consume as little power as possible during operation in order to maximize the operating time between charges in battery powered hosting devices.

Current LCOS display devices generally have a poor form factor and high power consumption, which inadvertently imposes undesirable design constraints and low performance characteristics on hosting devices.

What is needed, therefore, is an LCOS device having improved form factor and lower power consumption during operation.

SUMMARY

The present invention overcomes the problems associated with the prior art by providing a liquid-crystal-on-silicon (LCoS) display device with a smaller size and footprint than prior art LCOS devices. Example embodiments of the invention demonstrate more efficient energy usage by combining circuit substrates having different voltage requirements and synergistic functionality in a stacked relationship.

Integrated circuit substrates (or simply circuit substrates) are formed by doping regions of a semiconductor substrate (e.g., a silicon wafer, a bulk substrate) to form semiconductor devices (e.g., diodes, transistors, etc.) and forming metal interconnect layers on the semiconductor substrate to interconnect the semiconductor devices to form electrical circuits. Thus, a circuit substrate includes the semiconductor substrate and the circuitries formed in and on the semiconductor substrate. In some embodiments, the semiconductor substrate may correspond to one or more epitaxially grown semiconductor layers (e.g., P or N doped silicon) formed on a carrier wafer, where carrier layer may be removed during fabrication process e.g., chemical mechanical polishing process.

An example liquid crystal display device includes a first circuit substrate, a second circuit substrate, and a first set of conductive vias. The first circuit substrate has a first surface, a second surface opposite the first surface, and a first set of integrated circuits. The first set of integrated circuits is formed in and on the second surface of the first circuit substrate and includes a first set of metal interconnect layers.

The first circuit substrate additionally includes an array of conductive pixel mirrors formed over the first set of metal interconnect layers and electrically coupled to the circuits of the first set of integrated circuits via the first set of metal interconnect layers. The second circuit substrate has a first surface, a second surface opposite the first surface, and a second set of integrated circuits formed in and on the second surface of the second circuit substrate. The second set of integrated circuits includes a second set of metal interconnect layers. The first set of conductive vias passes through the first circuit substrate and electrically connects the first set of metal interconnect layers to the second set of metal interconnect layers.

The example liquid crystal display device can additionally include a layer of liquid crystal material and a transparent electrode. The layer of liquid crystal material is disposed over the array of conductive mirrors. The transparent electrode is disposed over the layer of liquid crystal material.

In one particular example liquid crystal display device, the first set of metal interconnect layers includes at least one bond pad. The bond pad(s) is/are exposed on the first surface of the first circuit substrate. The bond pad(s) facilitate(s) electrical connection to the first set of metal interconnect layers.

Alternatively, other example liquid crystal display devices can include a chip scale packaging structure and a second set of conductive vias. The chip scale packaging (CSP) structure can have a first surface and a second surface opposite the first surface. The CSP structure can include a first set of contacts formed on the first surface of the CSP structure and a second set of contacts formed on the second surface of the CSP structure. The conductive vias of the second set of conductive vias pass through the second circuit substrate and electrically connect the second set of metal interconnect layers to the first set of contacts of the CSP structure.

Another example liquid crystal display device additionally includes a third circuit substrate and a second set of conductive vias. The third circuit substrate has a first surface, a second surface opposite the first surface, and a third set of integrated circuits formed in and on the second surface of the third circuit substrate. The third set of integrated circuits includes a third set of metal interconnect layers. The conductive vias of the second set of conductive vias pass through the second circuit substrate and electrically connect the second set of metal interconnect layers to the third set of metal interconnect layers.

This example liquid crystal display device can additionally include a chip scale packaging (CSP) structure and a third set of conductive vias. The CSP structure has a first surface and a second surface opposite the first surface. The CSP structure can include a first set of contacts formed on the first surface of the CSP structure and a second set of contacts formed on the second surface of the CSP structure. The third set of conductive vias pass through the third circuit substrate and electrically connect the third set of metal interconnect layers to the first set of contacts of the CSP structure.

In example liquid crystal display devices, the first circuit substrate can be a reflective display backplane, including a data input and a control signal input. The second set of integrated circuits can include a video data buffer and a control signal generator. The control signal generator can be configured to generate control signals based on data stored in the data buffer and provide the control signals to the control signal input of the reflective display backplane. The third set of integrated circuits can include video processing circuitry. As an optional, non-limiting example, the video processing circuitry can include circuitry configured to receive video data of a first format, and also include circuitry configured to convert the video data of the first format to video data of a second format.

In another example liquid crystal display device, the first set of integrated circuits can include a plurality of pixel latches. Each pixel latch of the array of pixel latches can be electrically coupled to an associated one of the conductive pixel mirrors. The second set of integrated circuits can include a frame buffer configured to store at least one frame of pixel data. Optionally, the frame buffer can have a capacity sufficient to store a plurality of frames of pixel data (e.g., a ping-pong frame buffer, dual frame buffer, triple frame buffer, and so on).

In another example liquid crystal display device, the first set of integrated circuits can operate at a first voltage. The second set of integrated circuits can operate at a second voltage, which is different than the first voltage. The first voltage can be higher than the second voltage. The example liquid crystal display device can additionally include inter-face circuitry, whereby digital video data can be transferred from the second set of integrated circuits operating at the second voltage to the first set of integrated circuits operating at the first voltage.

In another example liquid crystal display device, the first circuit substrate and the second circuit substrate may be fabricated or processed at different technology nodes for cost reduction. The first circuit substrate can be processed at a first technology node that is less advanced than a second technology node at which the second circuit substrate is fabricated or processed. For example, the first circuit sub-strate can be processed at a technology node of at least 65 nm. The second circuit substrate can be processed at a technology node of 28 nm or less. In a particular example liquid crystal display device, the first circuit substrate can have a technology node of at least 130 nm. The second circuit substrate can have a technology node of 22 nm or less.

In a particular example liquid crystal display device, the second set of integrated circuits can include display driver circuits. The display driver circuits can include control circuitry and memory. The control circuitry can be config-ured to generate control signals, defined to drive the array of conductive pixel mirrors of the first circuit substrate, based on video data stored in the memory.

Some of the example liquid crystal display devices addi-tionally include a liquid crystal layer and a dam. The liquid crystal layer is disposed over the pixel mirrors, and the dam surrounds and contains the liquid crystal layer. The first set of integrated circuits, the first set of metal interconnect layers, the second set of integrated circuits, and the second set of metal interconnect layers are all contained within a space defined by a perimeter of the dam projected along an axis perpendicular to the first surface of the first circuit substrate. Stated another way, all of the circuitry of the liquid crystal display device is disposed under and within the footprint of the liquid crystal layer components.

Another example liquid crystal display device includes a first circuit substrate, a liquid crystal layer, a transparent electrode, and a second circuit substrate. The first circuit substrate has a top surface, an opposite bottom surface, an array of pixel mirrors formed on the top surface, a first set of integrated circuits configured to assert pixel data on the pixel mirrors, and a plurality of electrical contacts formed on the bottom surface. The electrical contacts are connected to the first set of integrated circuits. The liquid crystal layer is disposed over the pixel mirrors, and the transparent elec-trode is disposed over the liquid crystal layer.

The second circuit substrate includes a top surface, a bottom surface opposite the top surface, a second set of electrical contacts formed on the top surface, and a second set of integrated circuits electrically coupled to the second set of electrical contacts, The second set of integrated circuits include, without limitation, a frame buffer config-ured to store digital video data and control circuitry config-ured to generate control signals based at least in part on the digital video data. The first set of electrical contacts is rigidly connected to the second set of electrical contacts, thereby providing a mechanical bond between the first circuit sub-strate and the second circuit substrate, and providing an electrical connection over which the control signals are communicated from the second set of integrated circuits to the first set of integrated circuits.

Example methods of manufacturing a liquid crystal dis-play devices are also disclosed. An example method includes providing a reflective display backplane including an array of pixel mirrors, and forming vias through the reflective display backplane. The example method addition-ally incudes providing one or more circuit substrates, form-ing vias in the one or more circuit substrates, and assembling the reflective display backplane and the one or more circuit substrates in a stacked relationship with the reflective dis-play backplane on top. The circuitry of the reflective display backplane and the one or more integrated circuit substrates are electrically connected by the vias. A chip-scale-package can be formed on a bottom one of the circuit substrates. The example method additionally includes assembling liquid crystal display components over the array of pixel mirrors.

BRIEF DESCRIPTION OF THE DRAWINGS

The present invention is described with reference to the following drawings, wherein like reference numbers denote substantially similar elements:

FIG. 11 is a flowchart summarizing an example method of manufacturing an LCoS display device, such as might be included in the projection systems of FIGS. 1 and 2;

FIG. 12B is a flowchart summarizing another example method of performing step 1112 of the method of FIG. 11.

DETAILED DESCRIPTION

The present invention overcomes the problems associated with the prior art, by providing LCOS display devices including plurality of stacked circuit substrate layers having semiconductor circuit layers and metal interconnect layers formed therein and thereon. The invention also provides methods of manufacturing LCOS display devices. In the following description, numerous specific details are set forth (e.g., circuitry configurations, number of stacked layers, electrical bonding techniques, etc.) in order to provide a thorough understanding of the invention. Those skilled in the art will recognize, however, that the invention may be practiced apart from these specific details. In other instances, details of well-known electronics manufacturing practices (e.g., wire bonding, semiconductor doping, etching, back-lapping, etc.) and components have been omitted, so as not to unnecessarily obscure the present invention.

Spatially relative terms, such as "beneath," "below," "over," "under," "above," "upper," "top," "bottom," "left," "right," "center," "middle," and the like, may be used herein for ease of description to describe one element or feature's relationship relative to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" "over" the other elements or features. Thus, the exemplary terms "below" and "under" can encompass both an orientation of above and below. The device may be otherwise oriented (rotated ninety degrees or at other orientations) and the spatially relative descriptors used herein are interpreted accordingly. In addition, it will also be understood that when an element is referred to as being "between" two other elements, it can be the only element between the two other elements, or one or more intervening elements may also be present.

Figure 1:
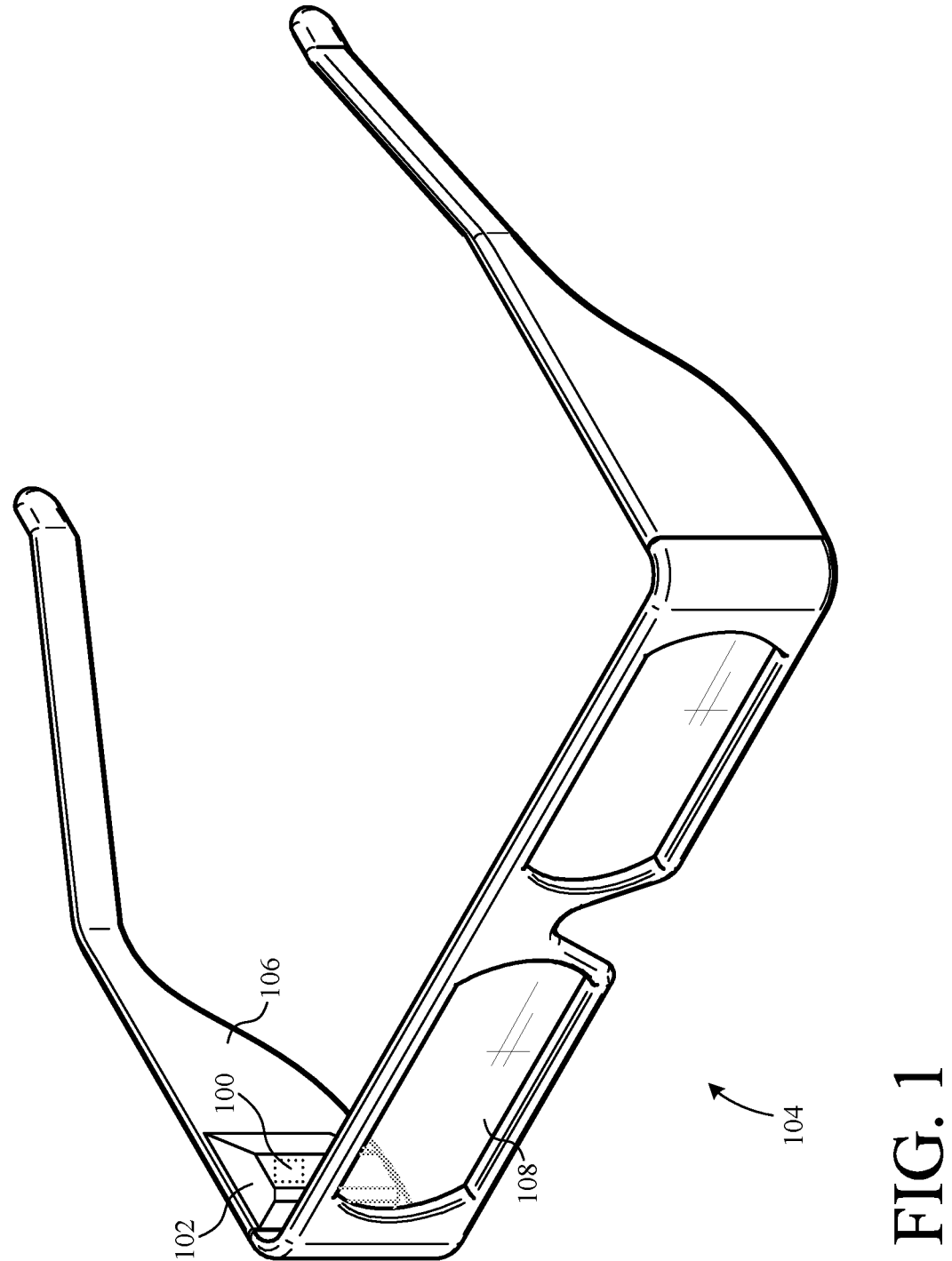
FIG. 1 is a perspective view of a pair of augmented reality (AR) glasses, hosting a projection system including an LCoS display device (not visible)

FIG. 1A shows, representationally, a liquid crystal on silicon (LCoS) display device 100, included in a projection system 102. Projection 102 is integrated with a hosting device, which is depicted by way of non-limiting example as a pair of augmented reality (AR) glasses 104. In particular, projection system 102 is fixed to the interior of an arm 106 of AR glasses 104. Projection system 102 projects images directly onto a lens 108 of AR glasses 104, where the images can be viewed by a person wearing AR glasses 104.

Figure 2:
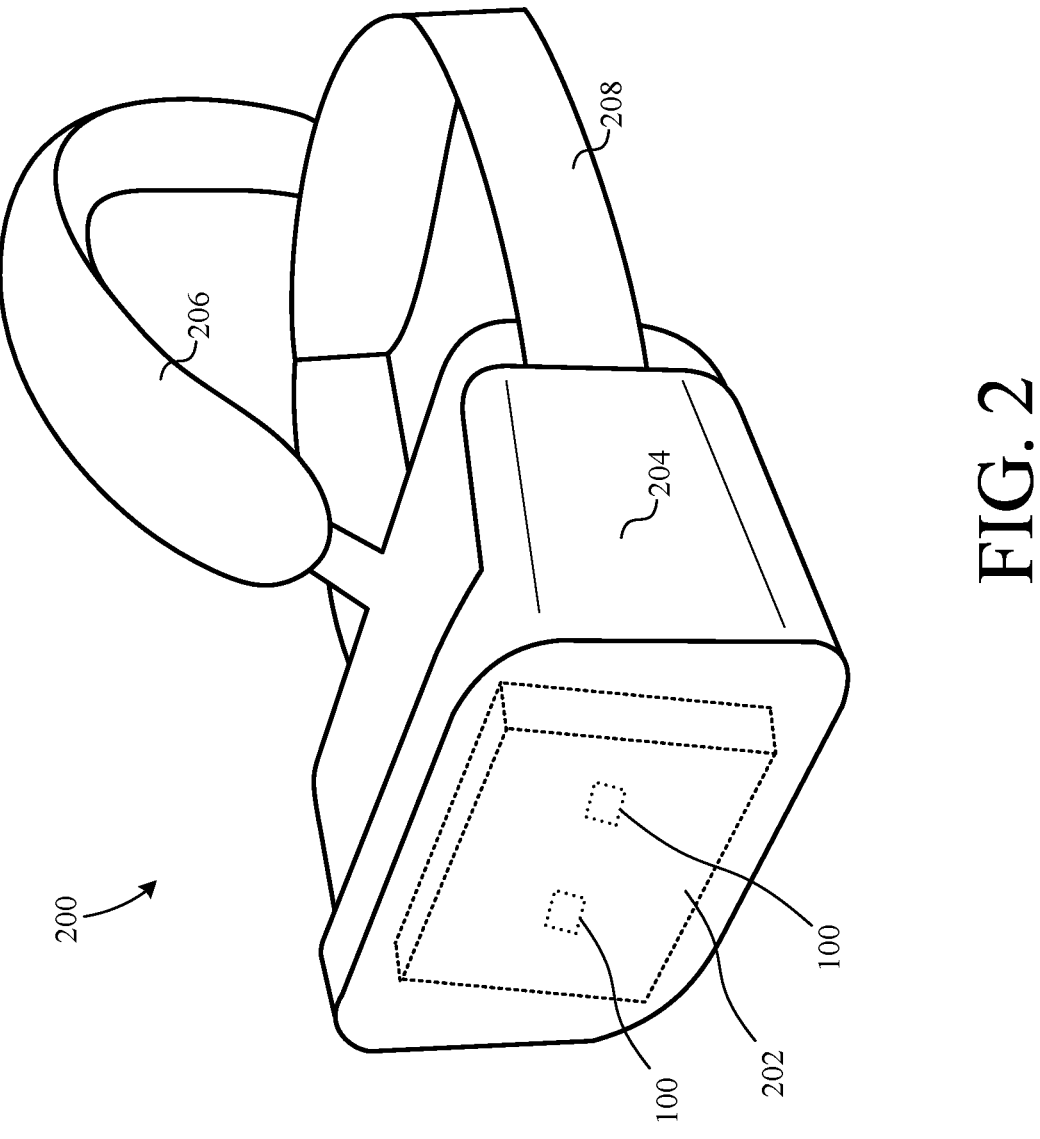
FIG. 2 is a perspective view of virtual reality (VR) goggles, hosting a projection system including an LCOS display device (not visible)

FIG. 2 shows another example hosting device 200, which is depicted by way of non-limiting example as a set of virtual reality (VR) goggles 200. VR goggles 200 include an imaging system 202 that includes one or more of display devices 100. VR goggles 200 include various other electronic components (e.g., PCB, battery, etc.) (not shown) disposed within a housing 204. VR goggles 200 further include a head-strap 206 and a headband 208 for securing housing 202 to a user's head, over the eyes.

AR glasses 104 and goggles 200 are intended to illustrate example environments. However, display 100 can be incorporated into other environments such as, for example, heads up displays (HUD) in automotive applications, medical devices, optical instrumentation, and so on.

Figure 3:
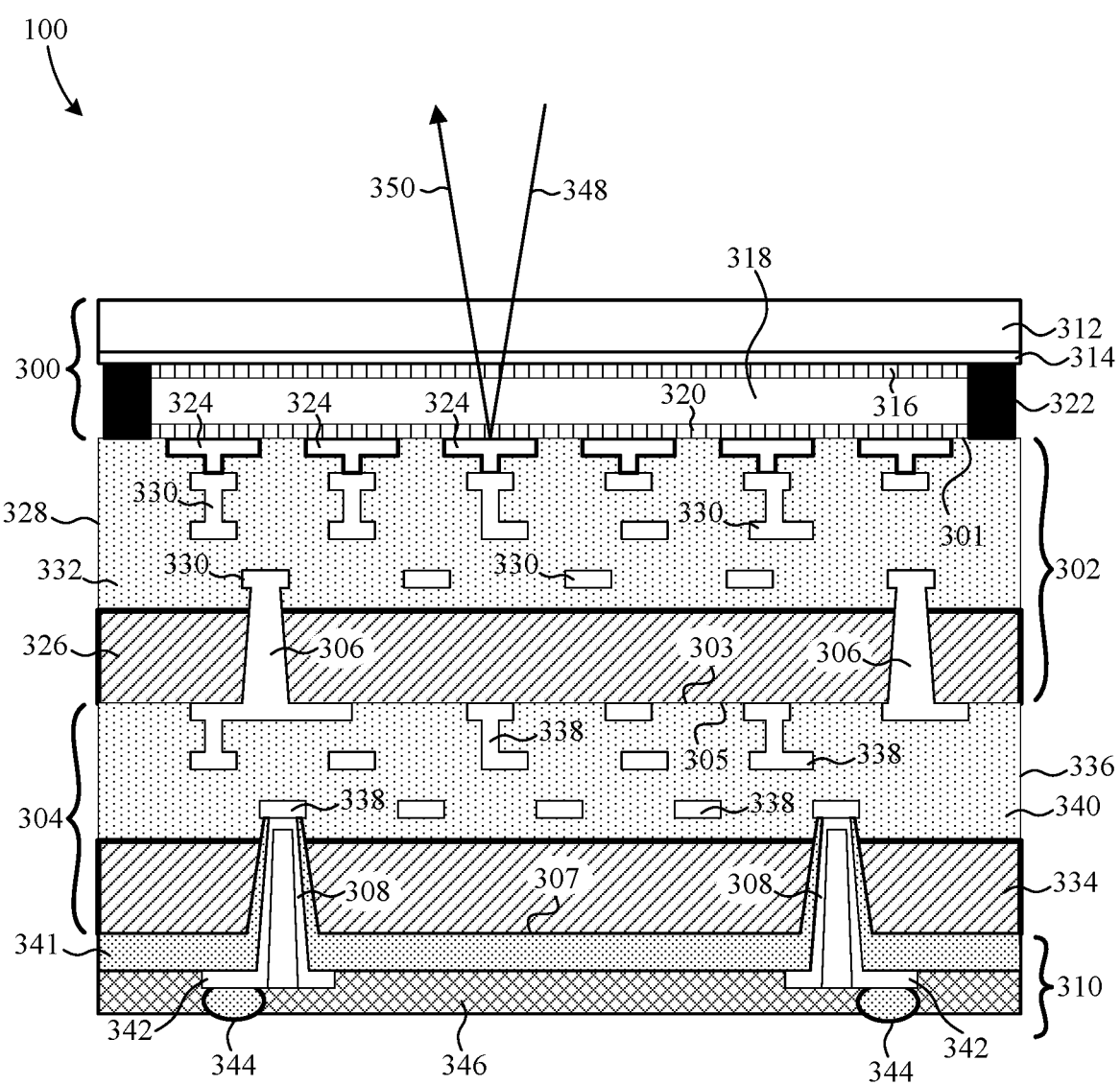
FIG. 3 is a cross-sectional side view of a first example LCOS display device, such as might be included in the projection systems of FIGS. 1 and 2.

FIG. 3 is a cross-sectional view of LCOS display device 100, which includes a display assembly 300, a first circuit substrate 302, a second circuit substrate 304, a first set of through silicon vias (TSVs) 306 (first set of conductive vias), a second set of TSVs 308 (second set of conductive vias), and a chip scale package (CSP) structure 310. Display assembly 300 is formed over the top surface 301 of first circuit substrate 302. The opposite bottom surface 303 of first circuit substrate 302 is bonded to the top surface 305 of second circuit substrate 304. CSP structure 310 is coupled to the bottom surface 307 of second circuit substrate 304. The first set of TSVs 306 electrically connect circuitry disposed on the second circuit substrate 304 to circuitries disposed on the first circuit substrate 302, and the second set of TSVs 308 electrically connect circuitry of CSP structure 310 to circuitry of second circuit substrate 304.

As will be described in greater detail hereinafter, TSVs typically include an opening formed through a silicon substrate. The opening itself is sometimes referred to as a via or a through hole, but TSVs include additional structure. In particular, a TSV typically includes an insulating lining formed on the wall of the via and a conductive core that connects circuitry on a top side of the silicon substrate to circuitry on the bottom side of the silicon substrate The insulating lining provides isolation between the conductive core and the silicon substrate.

Display assembly 300 includes a cover glass (transparent layer) 312, a transparent electrode 314, a first liquid crystal alignment layer 316, a liquid crystal layer 318, a second liquid crystal alignment layer 320, and a dam 322. Transparent electrode 314 is formed on the bottom surface of cover glass 312 and is, for example, a layer of conductive material (e.g., indium tin oxide) that is thin enough to be transparent and function as a common electrode across liquid crystal layer 312. Alignment layers 316 and 320 facilitate the alignment of the liquid crystal molecules of liquid crystal layer 318. Alignment layer 316 is formed on the bottom surface of transparent electrode 314, and alignment layer 320 is formed over first circuit substrate 302. Alignment layers 316 and 320 can be formed from any suitable material such as, for example, polyimide, $SiO_2$, and so on. The transparent electrode 314, the first liquid crystal alignment layer 316, the liquid crystal layer 318, the second liquid crystal alignment layer 320 are disposed or otherwise arranged between cover glass 312 and the first circuit substrate 302. Dam 322 is disposed around the perimeter of liquid crystal layer 318 and functions as a gasket to encapsulate and retain liquid crystal layer 318 between alignment layers 316 and 320.

First circuit substrate 302 includes LCOS circuitry that is configured to drive a plurality of pixel mirrors 324. The LCOS circuitry includes various semiconductor circuit components (i.e., latches, row/column decoders, line registers, transistors, etc.) (not visible) formed in and on a semiconductor material layer e.g., silicon substrate 326. The various circuit components formed in and on silicon substrate 326 are electrically connected together and to pixel mirrors 324 by a metal interconnect layer 328, which includes various conductive metal elements 330 and an electrically insulating material 332. In an embodiment, metal interconnect layer 328 may include one or more metal layers embedded in the electrically insulating material 332, and the plurality of pixel mirrors 324 is formed from the topmost metal layer of the one or more metal layers. Pixel mirrors 324 are highly reflective electrodes (e.g., aluminum, silver-plated aluminum, and so on) formed in and on the top surface of interconnect layer 328. Pixel mirrors 324 may be arranged into an array form.

Second circuit substrate 304 includes, by way of non-limiting example, an application specific integrated circuit (ASIC), which further includes various logic circuit components (not visible) formed in and on a silicon substrate 334. In this example, the circuitry of second circuit substrate 304 would be configured as a display driver. Examples of such display driver circuitry include, but are not limited to, timing circuits, display data transfer circuits, display data buffers, frame buffers, display control signal generators, and so on. The various circuit components formed in and on silicon substrate 334 are electrically connected together through a metal interconnect layer 336, which includes multiple interconnected layers of various conductive metal elements 338 separated by an electrically insulating material 340. The top surface of interconnect layer 336 is bonded to the bottom surface of silicon substrate 326 in a stacked configuration.

First set of TSVs 306 are formed through silicon substrate 326 with a first dielectric lining layer (e.g., formed with oxide-based material) and filled with conductive material (e.g. copper, aluminum, and so on) to electrically connect interconnect layer 336 to interconnect layer 328. The conductive material is isolated from silicon substrate 326 by the first dielectric lining layer. Likewise, second set of TSVs 308 are formed through silicon substrate 334 with a second dielectric lining layer (e.g., formed with oxide-based material) such as insulating layer 341 and filled or lined with conductive material (e.g. copper) to electrically connect CSP structure 310 to interconnect layer 336.

In this example embodiment, first circuit substrate 302 is an LCOS chip (e.g., a reflective display backplane) that operates at a first voltage, and second circuit substrate 304 is an ASIC chip that operates at a second, different voltage that is lower than the first voltage. Specifically, the voltage that drives circuitries of the first circuit substrate 302 and the plurality of pixel mirrors 324 included in the first circuit substrate 302 is higher than the voltage required to drive the logic circuitry of the second circuit substrate 334.

First circuit substrate 302 and second circuit substrate 304 can be fabricated under different technology nodes. First circuit substrate 302 can be fabricated or processed at 65 nm or 130 nm node. Second circuit substrate 304 can use 22 nm or 28 nm node, which is more advance technology for processing and integrated circuit circuitry formation.

CSP structure 310 is coupled to/formed on the bottom surface of silicon substrate 334 and is configured to electrically connect LCOS display device 100 to the circuitry of a hosting device. CSP structure 310 includes an insulating layer 341, a plurality of metal contacts (conductive structure) 342, a plurality of solder bumps 344, and an interposer layer 346 (e.g., solder mask). Insulating layer 341 is deposited after the formation of holes (or vias) through silicon substrate 334, but before the deposition of conductive material (e.g., metal) to form the second set of TSVs 308. The metal contacts 342 are electrically connected to the second set of TSVs 308, and solder bumps 344 are electrically connected to metal contacts 342. Further, solder bumps 344 are configured to provide electrical connectivity for external signal routing (e.g., power connection, control signals or data signals). For example, solder bumps 344 are configured to be electrically connected to contact pads of a host device by some suitable process such as, for example, reflow, ultrasonic bonding, etc., thereby establishing signal connection. Interposer layer 346 is disposed around and between metal contacts 342.

Although not shown in the drawings, an insulating layer similar to insulating layer 341 may be disposed between first circuit substrate 302 and second circuit substrate 304, and into holes (or vias) through silicon substrate 326) to form the second set of TSVs 308.

An example operation of LCOS device 100 is summarized as follows. Incident light 348 is polarized in a first predetermined polarization state and enters through the top surface of glass 312, passes through layers 314, 316, 318, and 320, is reflected off of the plurality of pixel mirrors 324, and then passes again, in an opposite direction, through the layers 320, 318, 316, 314, and 312, before exiting LCOS device 100 as illustrated in FIG. 3. The polarization of the light is altered by liquid crystal layer 318, depending on the electrical field applied across the liquid crystal layer 318 (i.e. the voltage difference between pixel mirrors 324 and transparent electrode 314). When transparent electrode 314 is held at a particular voltage, the electrical field across liquid crystal layer 318 is controlled by the voltages asserted on the individual mirrors 324. Thus, the polarization of the incident light 348 is spatially modulated according to image signals asserted on pixel mirrors 324, and the incident light 348 is output as a spatially modulated beam 350. The modulated beam 350 is then analyzed by an analyzer (not shown) having a predetermined polarization state to produce a displayable image. The intensity of light displayed for each pixel thus depends on the polarization imparted by the liquid crystal in the liquid crystal layer 318, responsive to a particular signal asserted on each pixel mirror 324.

Figure 4A:
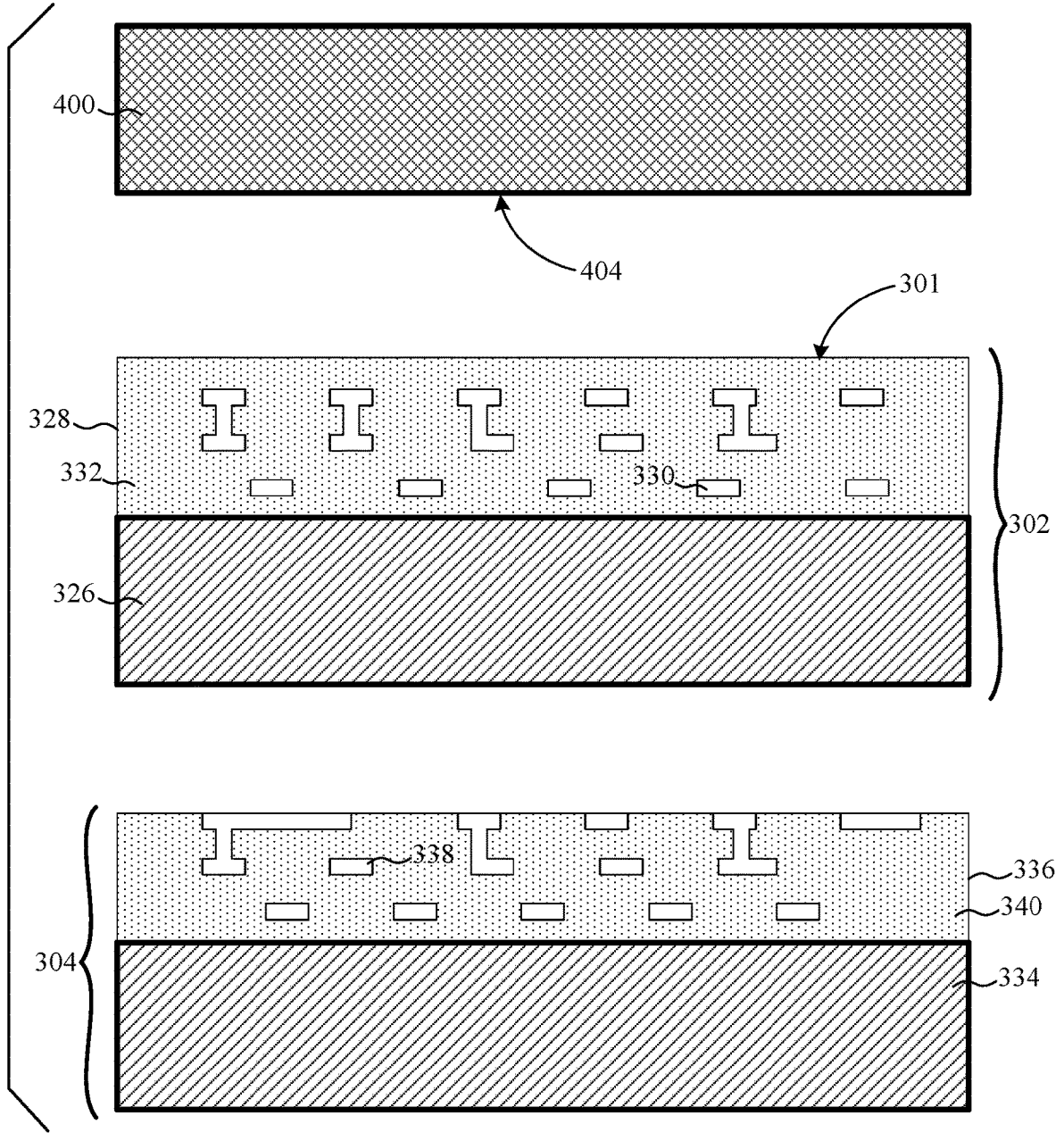
FIG. 4A illustrates a first step in a first example method of fabricating the LCoS display device of FIG. 3.
Figure 4B:
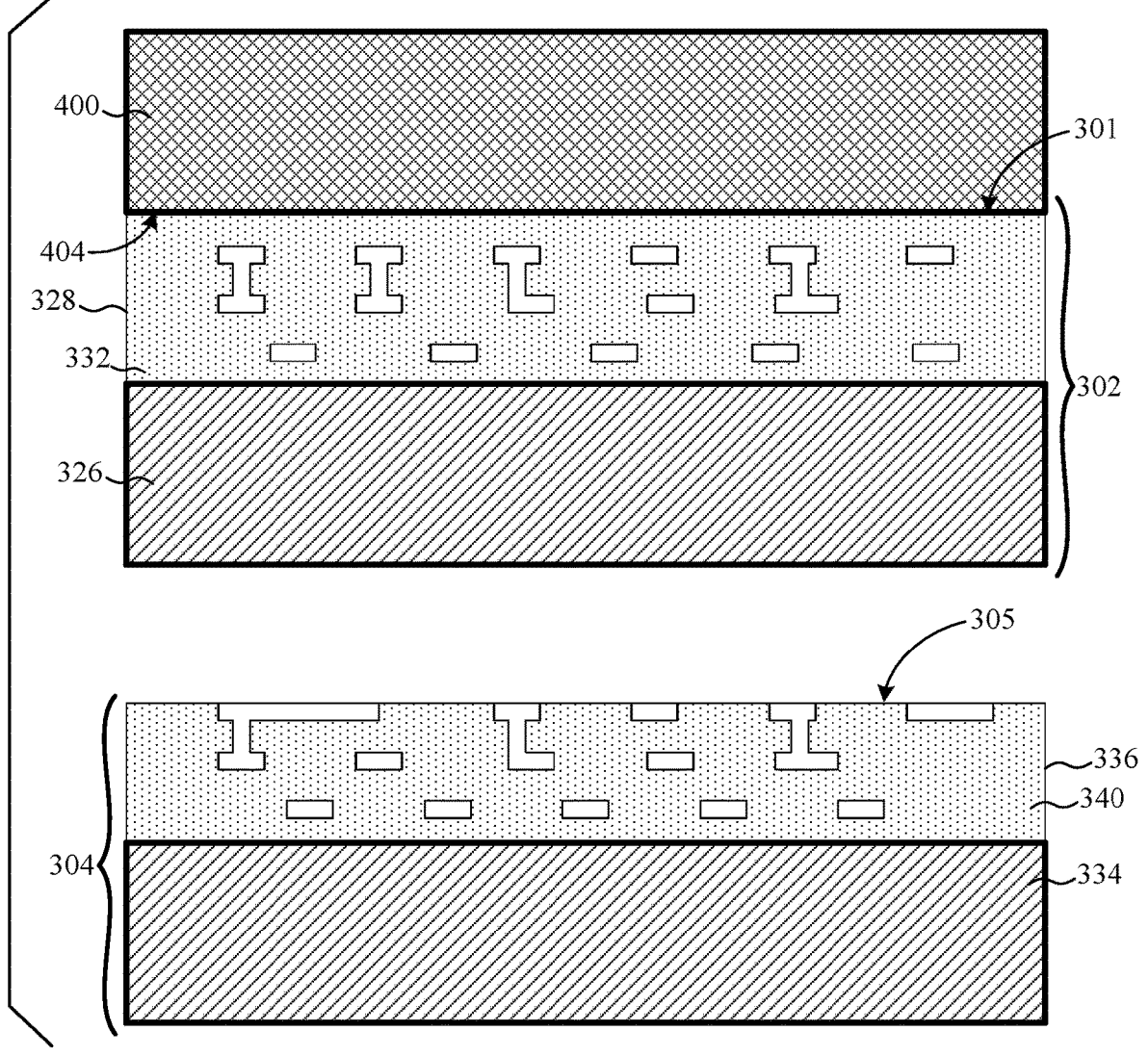
FIG. 4B illustrates a second step in the first example method of fabricating the LCOS display device of FIG. 3.

FIGS. 4A-4H illustrate a first example method of manufacturing LCOS device 100. As illustrated in FIG. 4A, a carrier wafer substrate 400, first circuit substrate 302, and second circuit substrate 304 are provided as separate components. Then, as illustrated in FIG. 4B, top surface 301 of interconnect layer 328 of first circuit substrate 302 is temperature bonded to a bottom surface 404 of carrier wafer substrate 400. In the illustrated embodiment, first circuit substrate 302 may be pre-processed to have one or more integrated circuitries (e.g., including pixel latches) and a plurality of metal elements formed thereon. Similarly, the second circuit substrate 304 may be pre-processed to have one or more integrated circuitries (e.g., including display driver circuitries and memory unit) formed thereon.

Figure 4C:
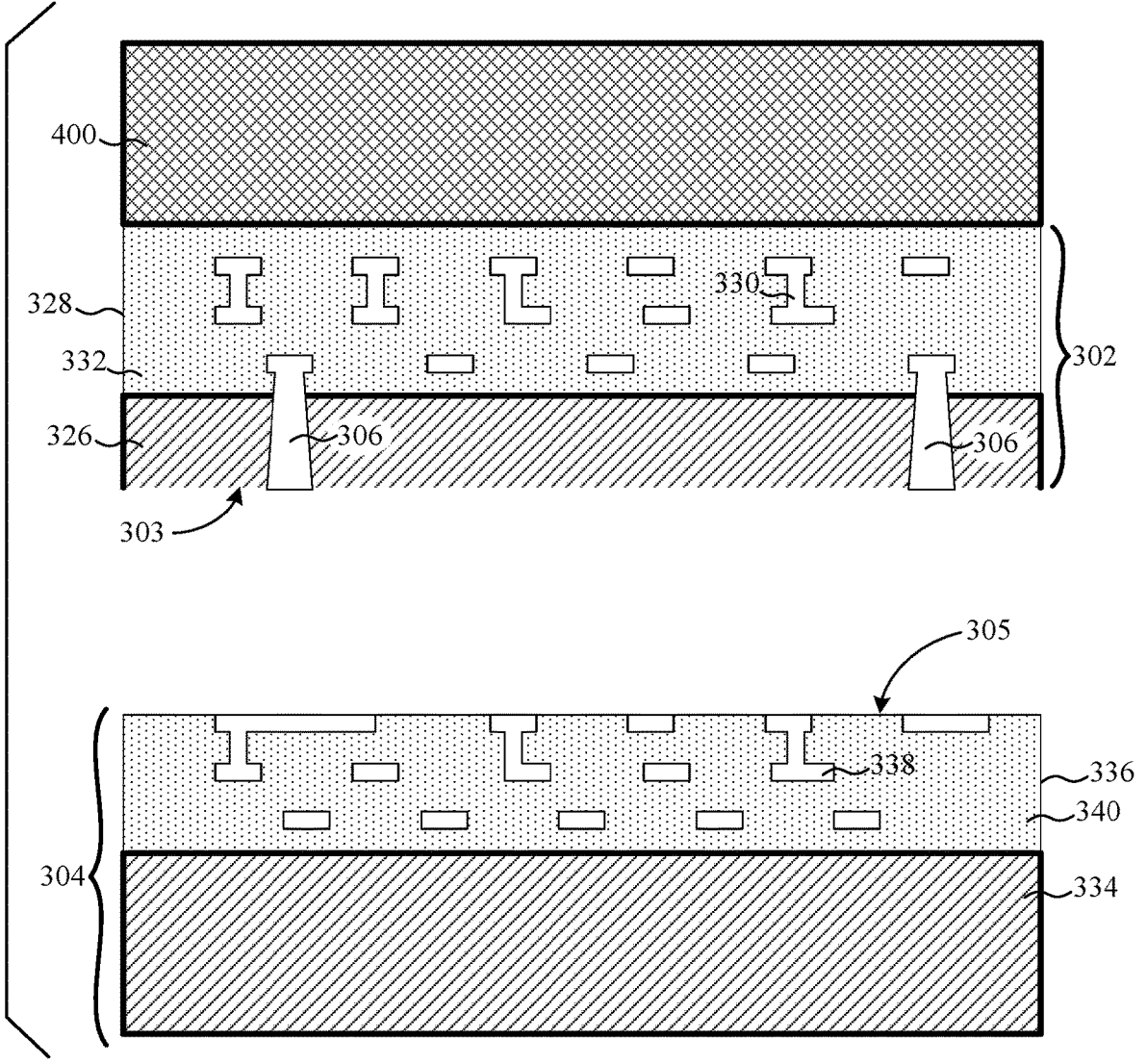
FIG. 4C illustrates a third step in the first example method of fabricating the LCOS display device of FIG. 3.

Next, as illustrated in FIG. 4C, silicon substrate 326 is first thinned down by removing material from the bottom (may also be referred to as rear or back) surface 303 of silicon substrate 326 by some suitable means such as, for example, back grinding, back lapping, chemical etching, etc. Once silicon substrate 326 is thinned down a predetermined amount, the first set of TSVs 306 are formed through silicon substrate 326. During formation of first set of TSVs 306, TSVs 306 are electrically connected to particular metal elements 330 and exposed on the bottom surface 303 of silicon substrate 326.

Figure 4D:
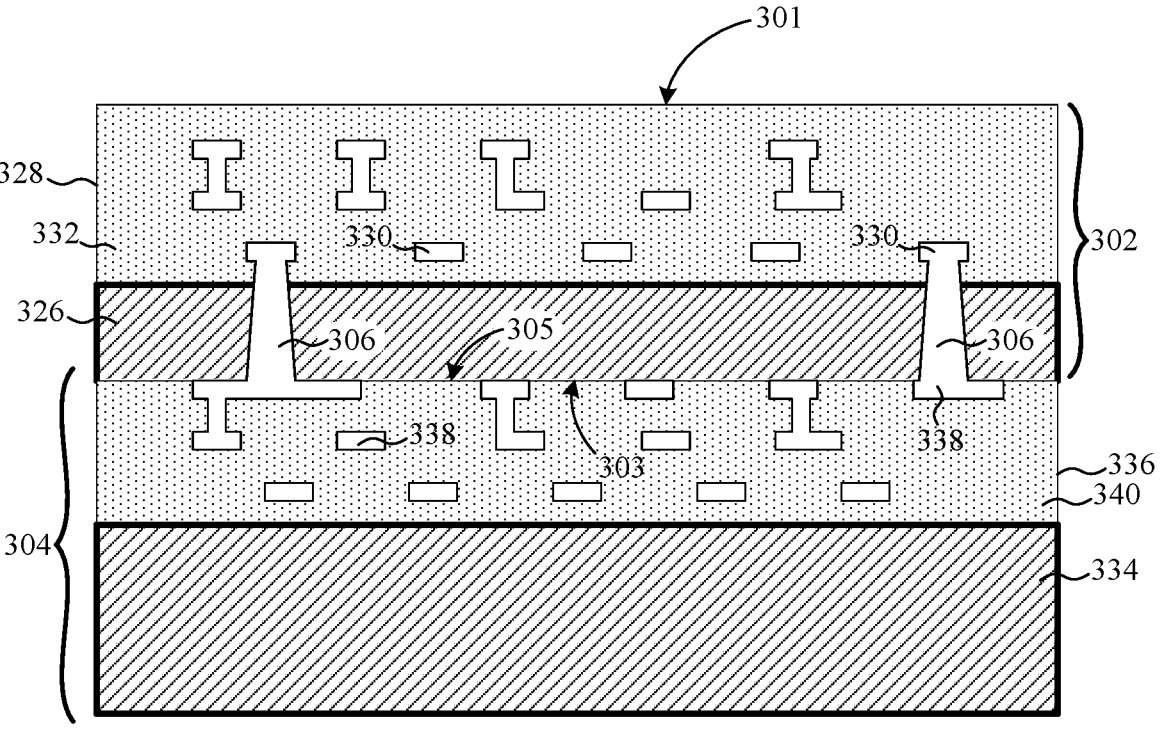
FIG. 4D illustrates a fourth step in the first example method of fabricating the LCOS display device of FIG. 3.

Then, as illustrated in FIG. 4D, the top surface 305 of interconnect layer 336 is bonded to the ground-down bottom surface 303 of silicon substrate 326. The bonding of interconnect layer 336 to silicon substrate 326 includes physically bonding interconnect layer 336 to silicon substrate 326 and also electrically connecting particular metal elements 338 of interconnect layer 336 to TSVs 306. Once first circuit substrate 302 and second circuit substrate 304 are electrically and physically bonded together, carrier wafer 400 is removed from interconnect layer 328 of circuit substrate 302.

Figure 4E:
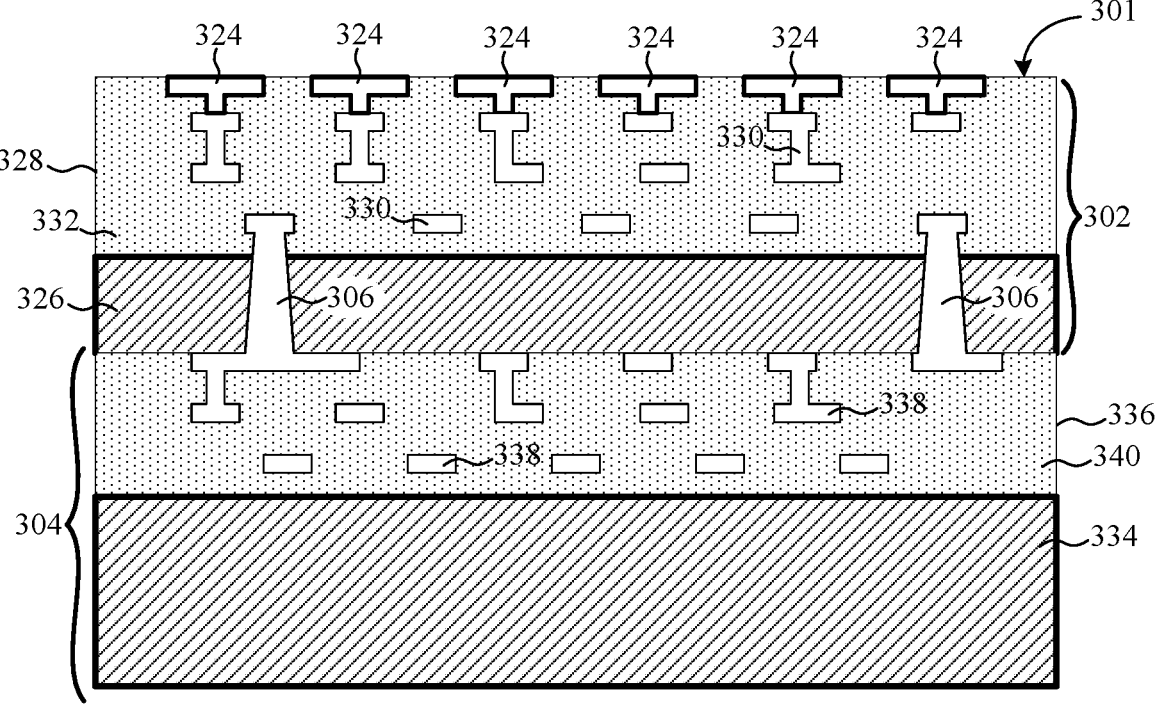
FIG. 4E illustrates a fifth step in the first example method of fabricating the LCOS display device of FIG. 3.

Next, as illustrated in FIG. 4E, pixel mirrors 324 are formed on the top surface 301 of interconnect layer 328 of first circuit substrate 302. In forming pixel mirrors 324, each pixel mirror 324 is electrically connected to a particular one of metal elements 338 of interconnect layer 328, thereby providing a dedicated connection between each pixel mirror 324 and corresponding circuitry (e.g., pixel latch circuitry) of silicon substrate 326.

Figure 4F:
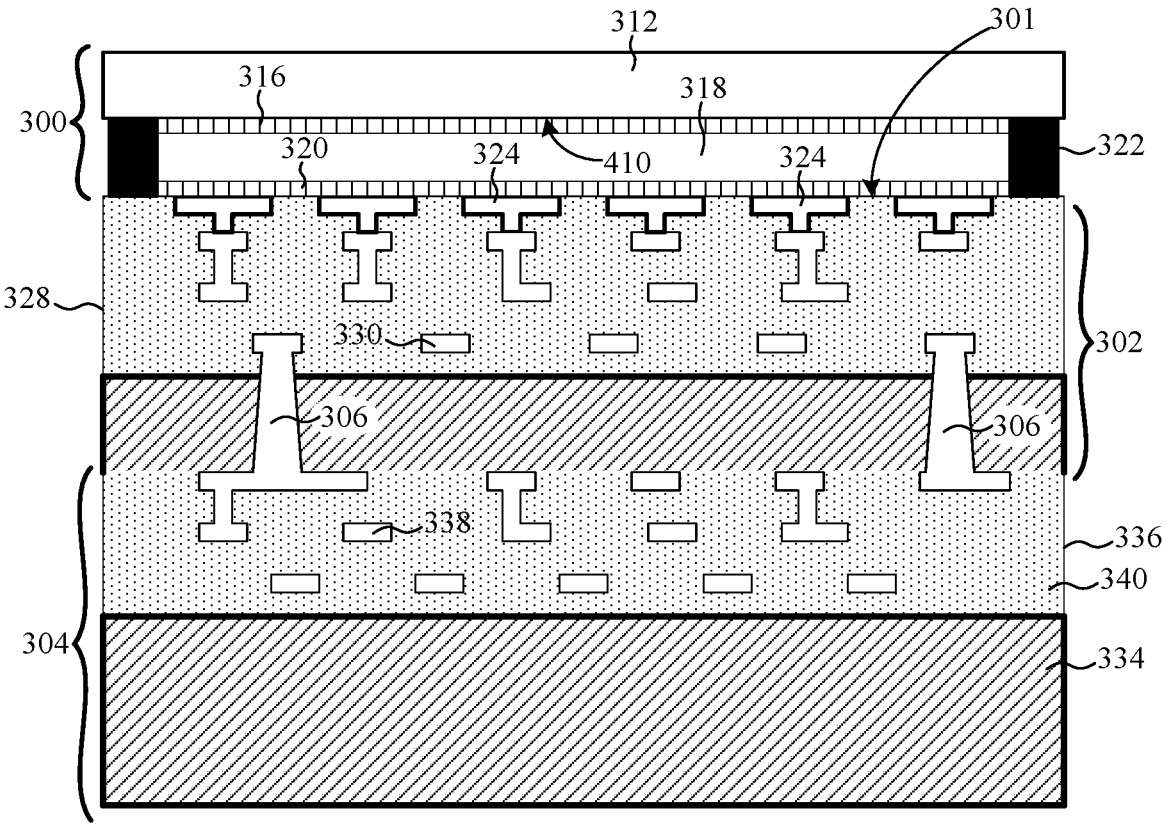
FIG. 4F illustrates a sixth step in the first example method of fabricating the LCOS display device of FIG. 3.

Then, as illustrated in FIG. 4F, display assembly 300 is formed on the top surface 301 of interconnect layer 328, over pixel mirrors 324. That is, alignment layer 316 is formed on the bottom surface 410 of cover glass 312. The alignment layer 320 is formed over the top surface 301 of interconnect layer 328 and pixel mirrors 324. The alignment layers 316 and 318 are disposed between the cover glass 312 and interconnect layer 328. Dam 322 is sandwiched between the bottom surface 410 of cover glass 312 and the top surface 301 of interconnect layer 328. The liquid crystal material is deposited in the space bound by dam 322 and alignment layers 316 and 320, to form liquid crystal layer 318. The liquid crystal layer 318 is formed or otherwise disposed between the cover glass 312 and silicon substrate 326.

Figure 4G:
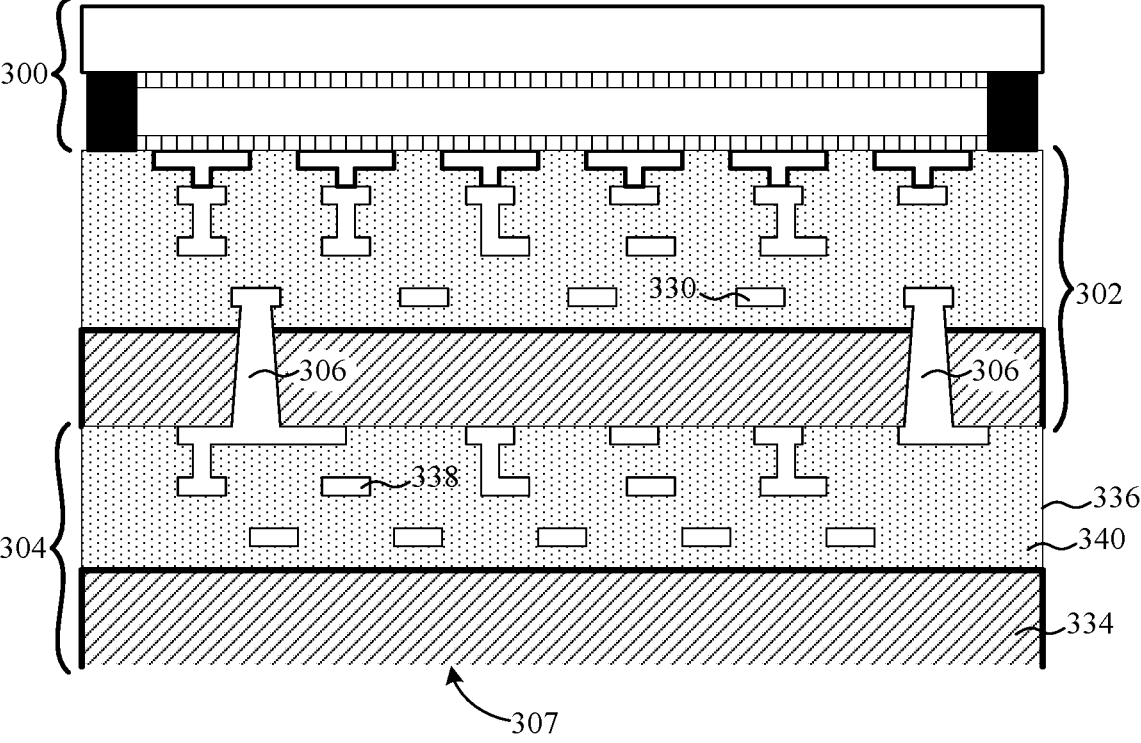
FIG. 4G illustrates a seventh step in the first example method of fabricating the LCOS display device of FIG. 3.
Figure 4H:
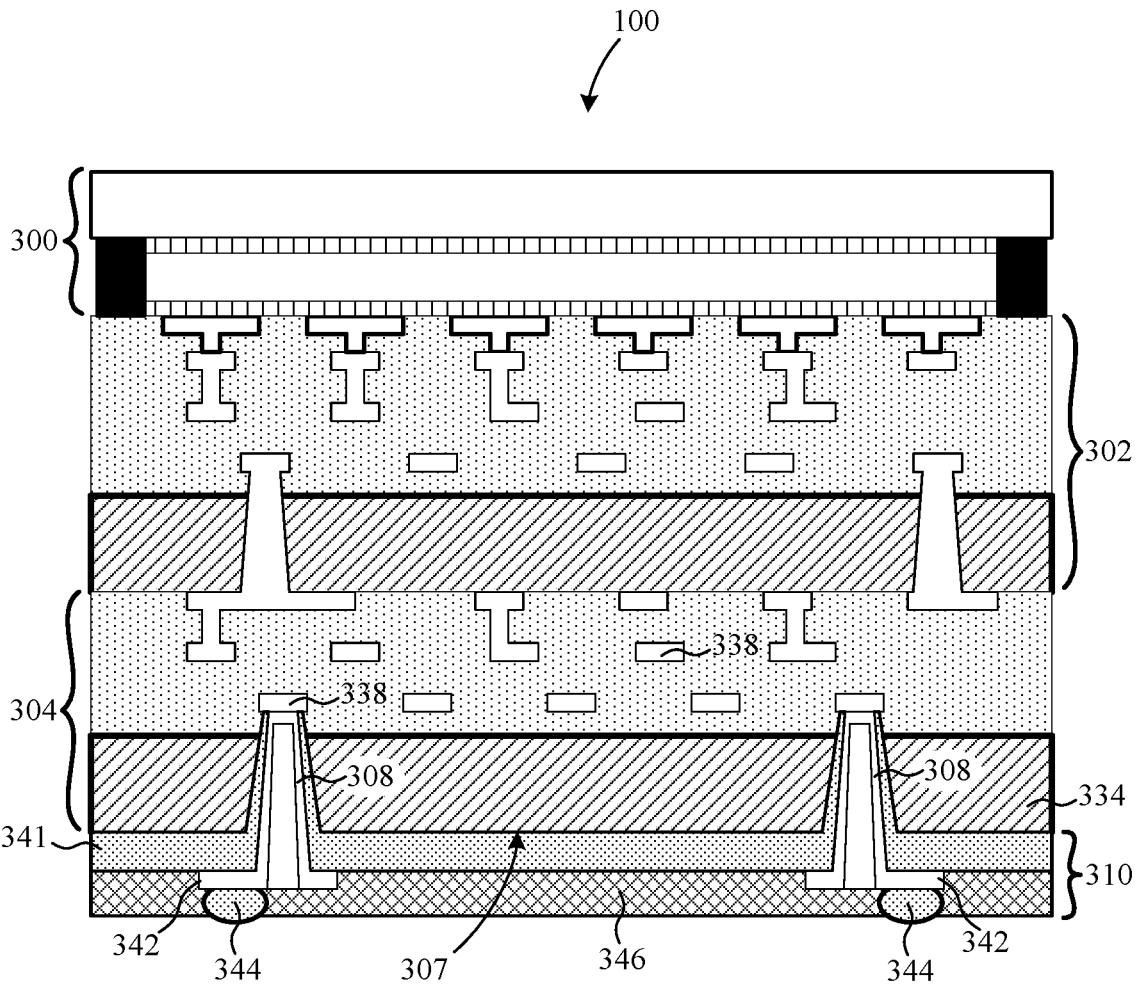
FIG. 4H illustrates an eighth step in the first example method of fabricating the LCOS display device of FIG. 3.

Next, as illustrated in FIG. 4G, silicon substrate 334 is thinned down by removing material from the bottom surface 307 of silicon substrate 334 by some suitable means such as, for example, back grinding, back lapping, chemical etching, etc. Then, as illustrated in FIG. 4H, insulating layer 341 is formed on bottom surface 307 (e.g., via material deposition technique), and TSVs 308 and CSP structure 310 are formed. Second set of TSVs 308 are formed through silicon substrate 334. In one example, a plurality of openings or trenches corresponding to positions of TSVs 308 are formed through silicon substrate 334. Insulating layer 341 is deposited after openings (or trenches) are formed through silicon substrate 334, lining sidewall surfaces of the openings or trenches, but before the deposition of conductive material (e.g., metal material such as copper or aluminum) of second set of TSVs 308, such that the insulating layer 341 provides electrical isolation between the conductive material and silicon substrate 334. During formation of second set of TSVs 308, TSVs 308 are electrically connected to particular metal elements 338 and left exposed on the bottom surface of insulating layer 341. The bottom surface of insulating layer 341 may be the surface of the insulating layer 341 that is away from the bottom surface 307 of silicon substrate 334. Metal contacts 342 are then formed and electrically connected to second set of TSVs 308 to electrically connect corresponding metal elements 338, and solder bumps 344 are formed on the bottom surface 307 of silicon substrate 334 in contact with metal contacts 342. Interposer layer 346 (e.g., soldier mask) is disposed between and around metal contacts 342. In embodiments, interposer layer 346 may enclose the metal contacts 342. Interposer layer 346 may further be disposed to surround solder bumps 344.

Figure 5A:
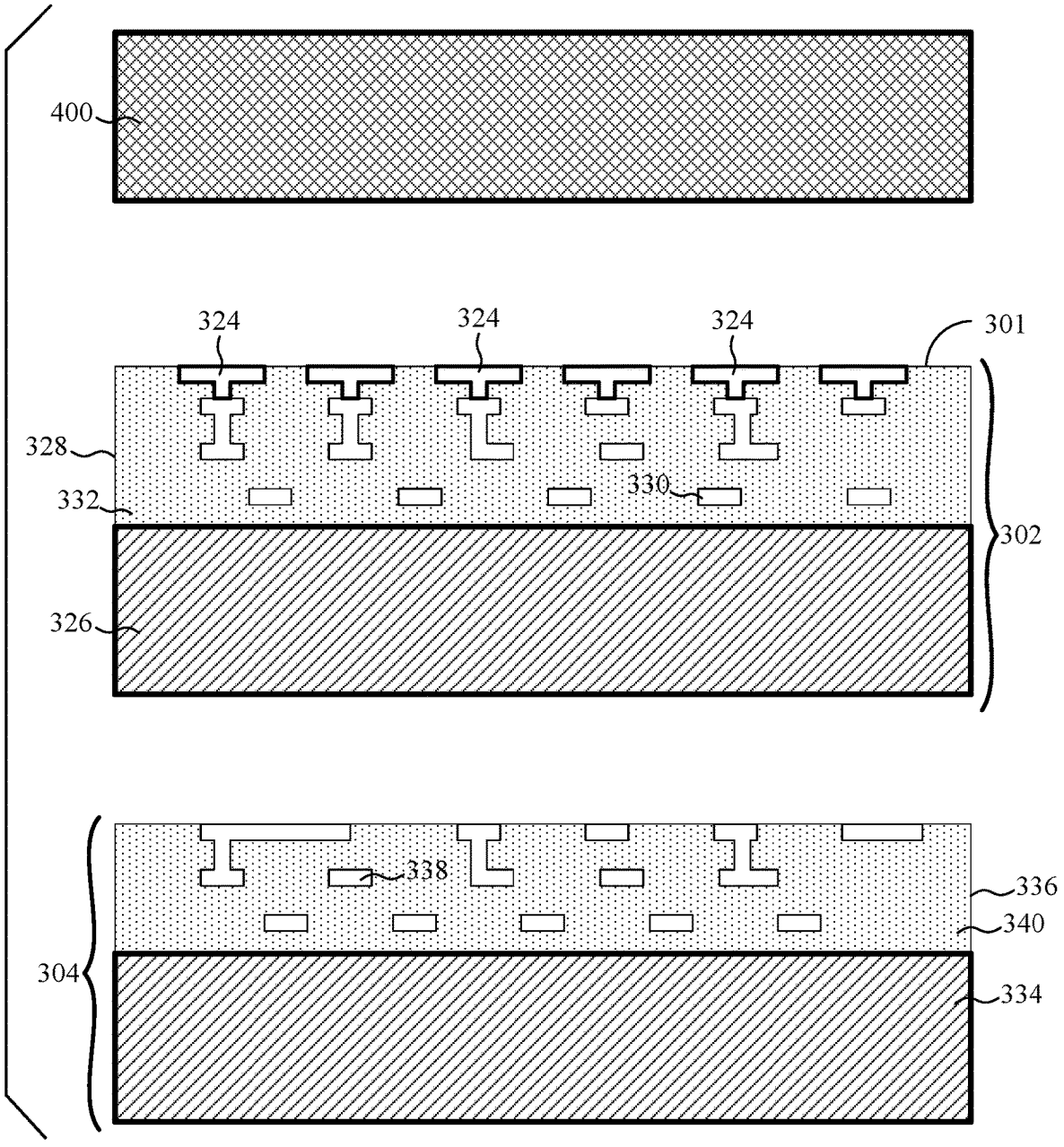
FIG. 5A illustrates a first step in a second example method of fabricating the LCOS display device of FIG. 3.
Figure 5B:
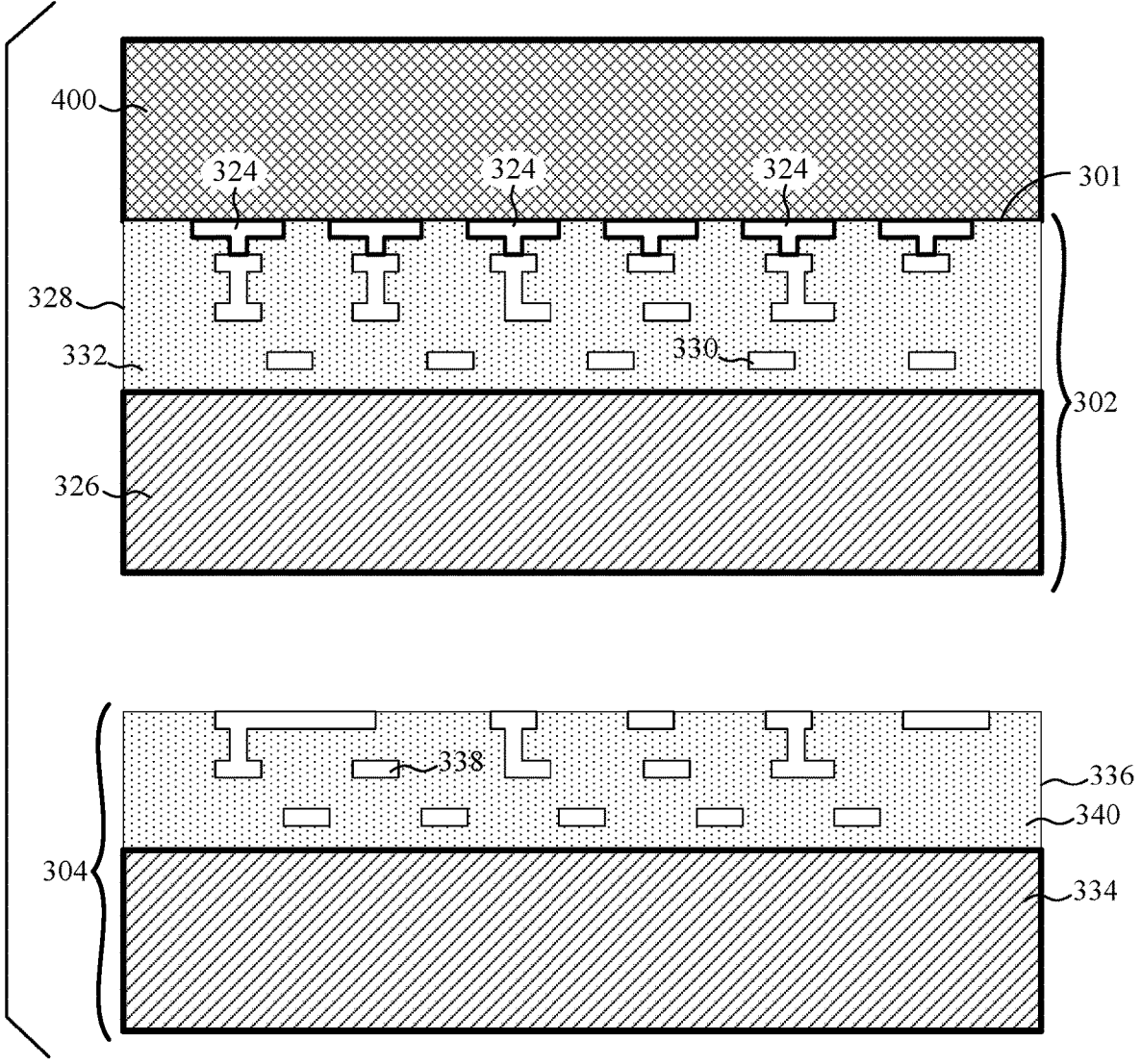
FIG. 5B illustrates a second step in the second example method of fabricating the LCOS display device of FIG. 3.

FIGS. 5A-5H illustrate a second example method of manufacturing LCOS device 100. Initially, as illustrated in FIG. 5A, carrier wafer substrate 400, first circuit substrate 302, and second circuit substrate 304 are provided as separate components. In this particular method, first circuit substrate 302 is initially provided with pixel mirrors 324 already formed on top surface 301 of interconnect layer 328. Then, as illustrated in FIG. 5B, carrier wafer substrate 400 is bonded (e.g. temperature bonded) to top surface 301 of interconnect layer 328.

Figure 5C:
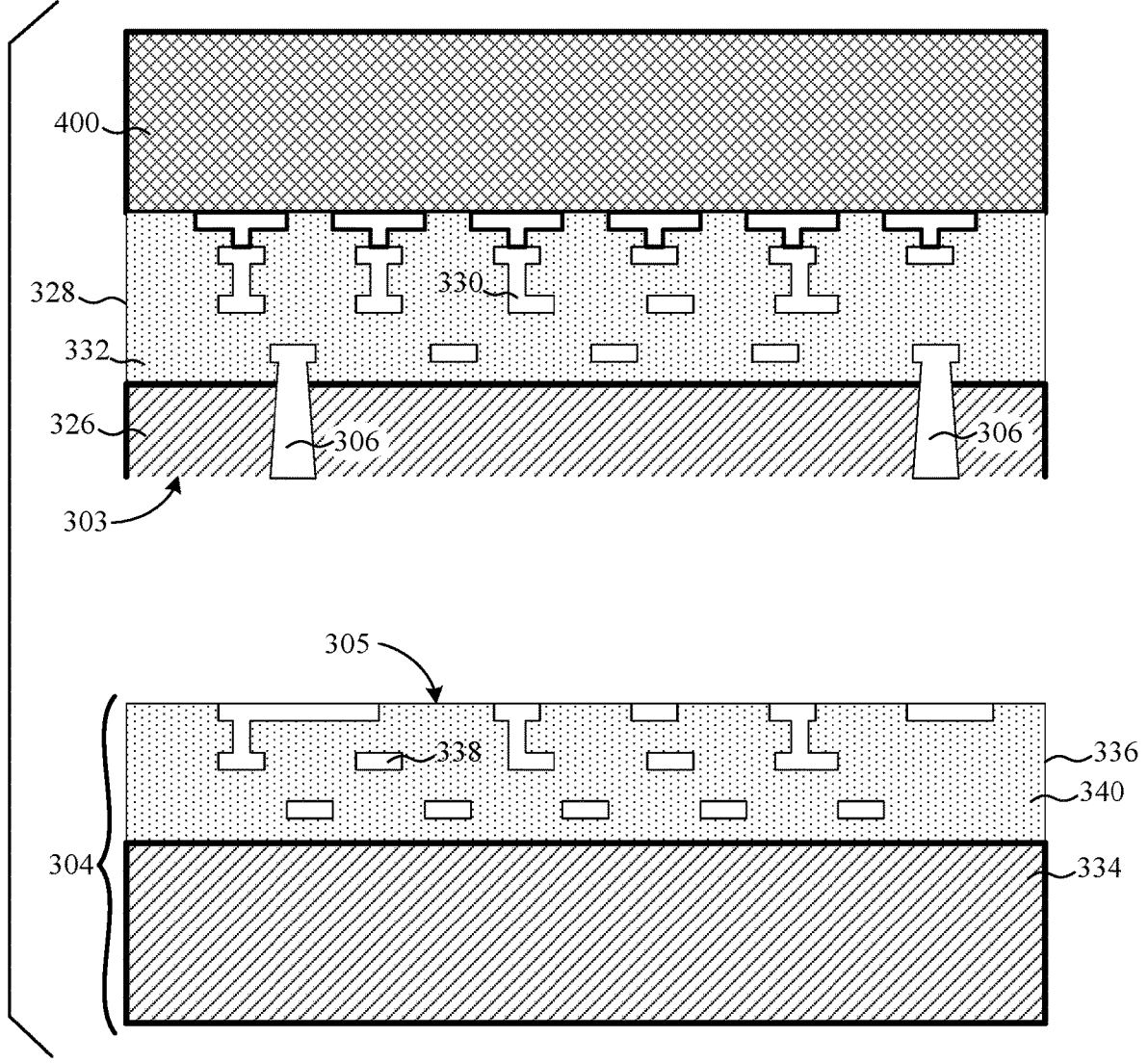
FIG. 5C illustrates a third step in the second example method of fabricating the LCOS display device of FIG. 3.

Next, as illustrated in FIG. 5C, silicon substrate 326 is first thinned down by removing material from the bottom surface 303 of silicon substrate 326 by some suitable means such as, for example, back grinding, back lapping, chemical etching, etc. Once silicon substrate 326 is thinned down, first set of TSVs 306 are formed through silicon substrate 326. During formation of first set of TSVs 306, TSVs 306 are electrically connected to particular ones of metal elements 330 and left exposed on the bottom surface 303 of silicon substrate 326.

Figure 5D:
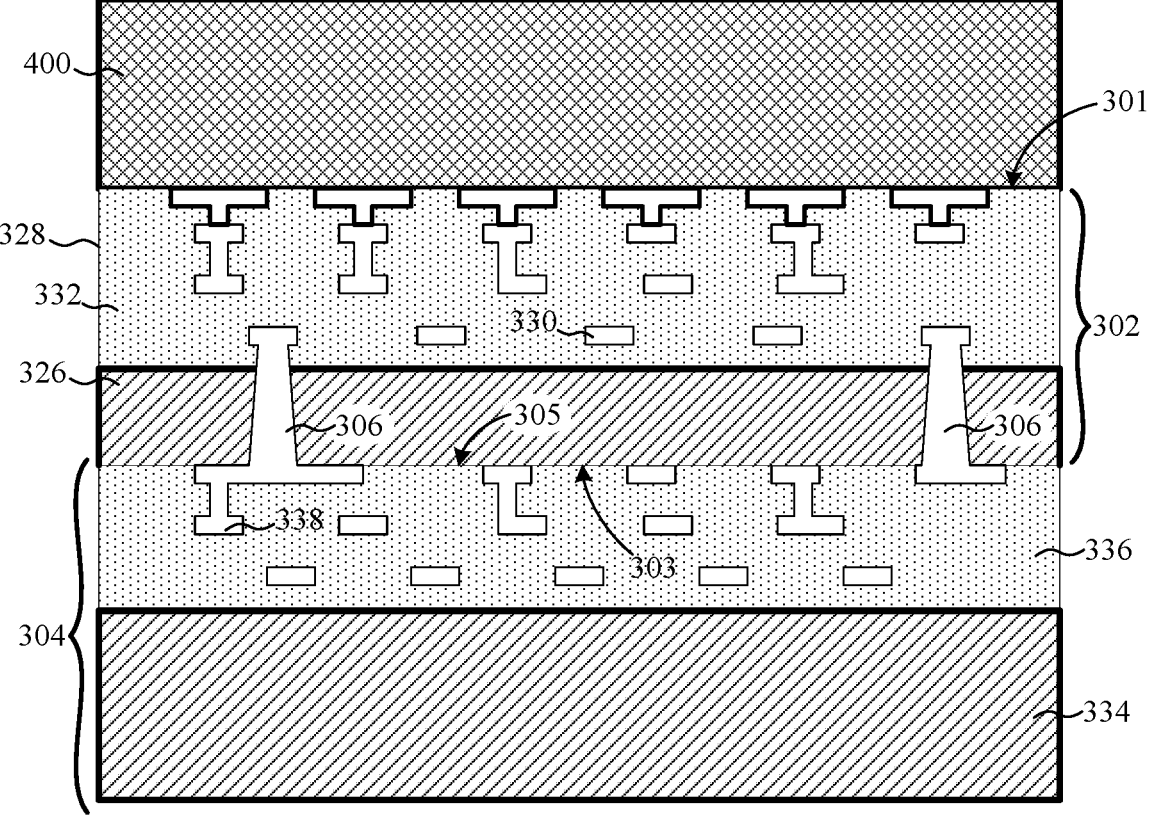
FIG. 5D illustrates a fourth step in the second example method of fabricating the LCOS display device of FIG. 3.

Then, as illustrated in FIG. 5D, the top surface 305 of interconnect layer 336 is bonded to the ground-down bottom surface 303 of silicon substrate 326. The bonding of interconnect layer 336 of the second circuit substrate 304 to silicon substrate 326 of the first circuit substrate 302 includes physically bonding interconnect layer 336 to silicon substrate 326 and also electrically connecting metal elements 338 of interconnect layer 336 to TSVs 306.

Figure 5E:
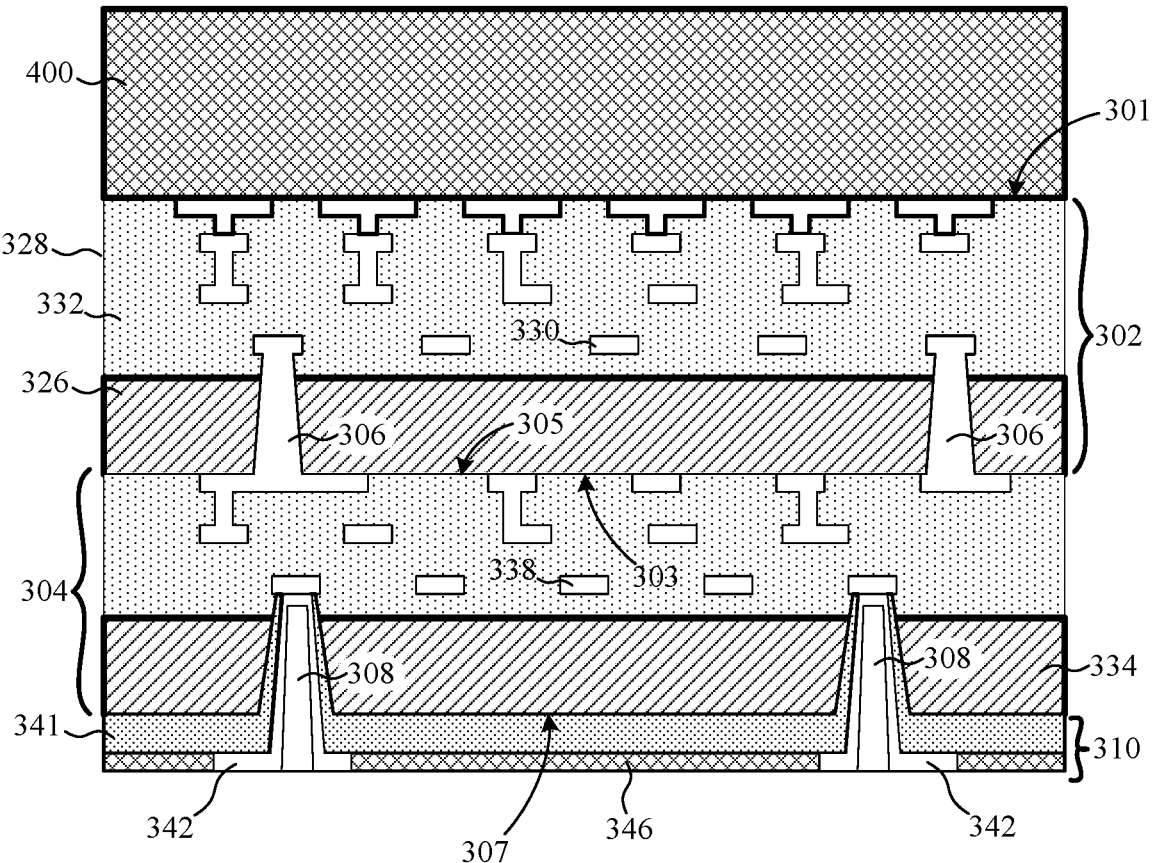
FIG. 5E illustrates a fifth step in the second example method of fabricating the LCoS display device of FIG. 3.

Next, as illustrated in FIG. 5E, silicon substrate 334 is thinned down, insulating layer 341 is formed, second set of TSVs 308 are formed, and the remainder of CSP structure 310 is formed on bottom surface of the silicon substrate 334. Silicon substrate 334 is thinned down by removing material from the bottom surface 307 of silicon substrate 334 by some suitable means such as, for example, back grinding, back lapping, chemical etching, etc. Second set of TSVs 308 are formed through silicon substrate 334. In one example, a plurality of openings or trenches corresponding to positions of TSVs 308 are formed through/on silicon substrate 334. Insulating layer 341 is deposited after openings are formed through silicon substrate 334, lining sidewall surfaces of the openings or trenches, but before the deposition of the conductive material (e.g., metal material such as copper or aluminum) of TSVs 308, such that the insulating layer 341 provides electrical isolation between conductive material and silicon substrate 334. During formation of conductive TSVs 308, TSVs 308 are electrically connected to particular metal elements 338 and left exposed on the bottom surface of insulating layer 341. The bottom surface of insulating layer 341 may be the surface of the insulating layer 341 that is away from the bottom surface 307 of silicon substrate 334. Metal contacts 342 are then formed and, optionally, interposer layer 346 is partially formed with openings corresponding to positions of metal contacts 342.

Figure 5F:
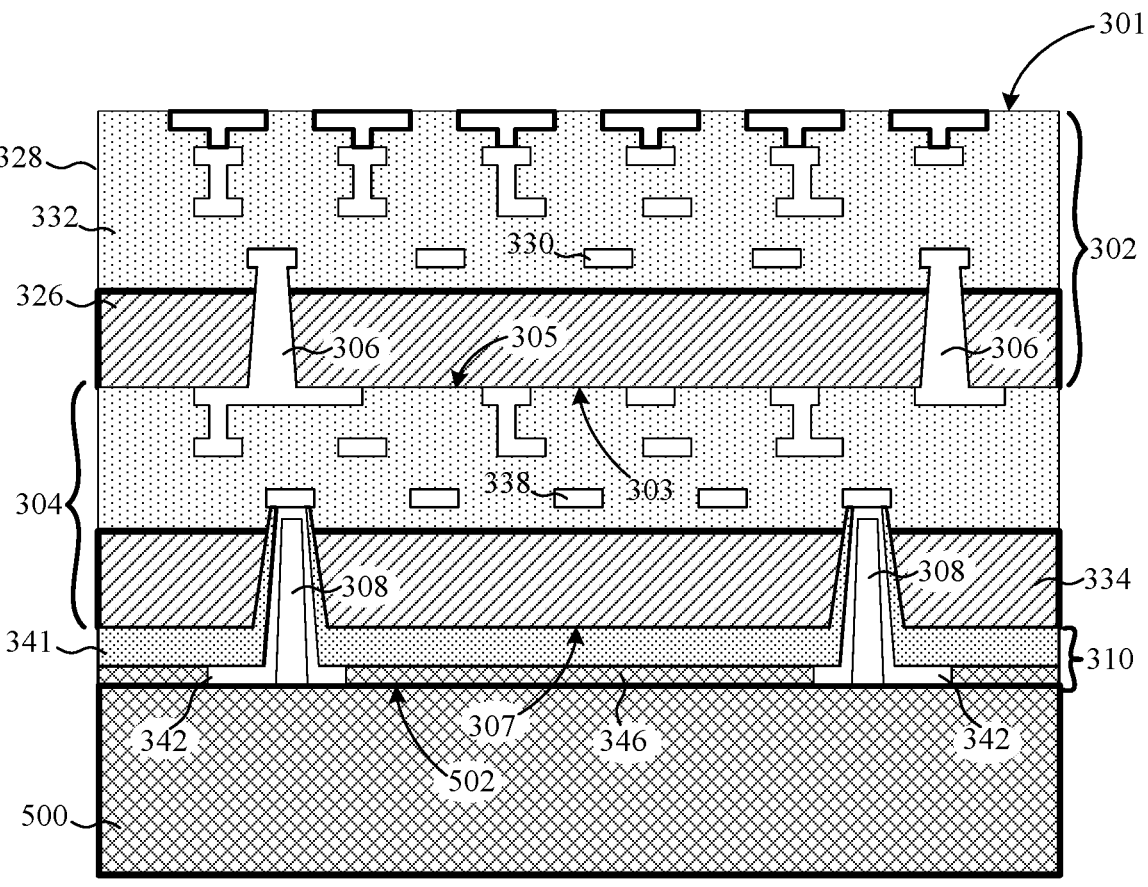
FIG. 5F illustrates a sixth step in the second example method of fabricating the LCOS display device of FIG. 3.
Figure 5G:
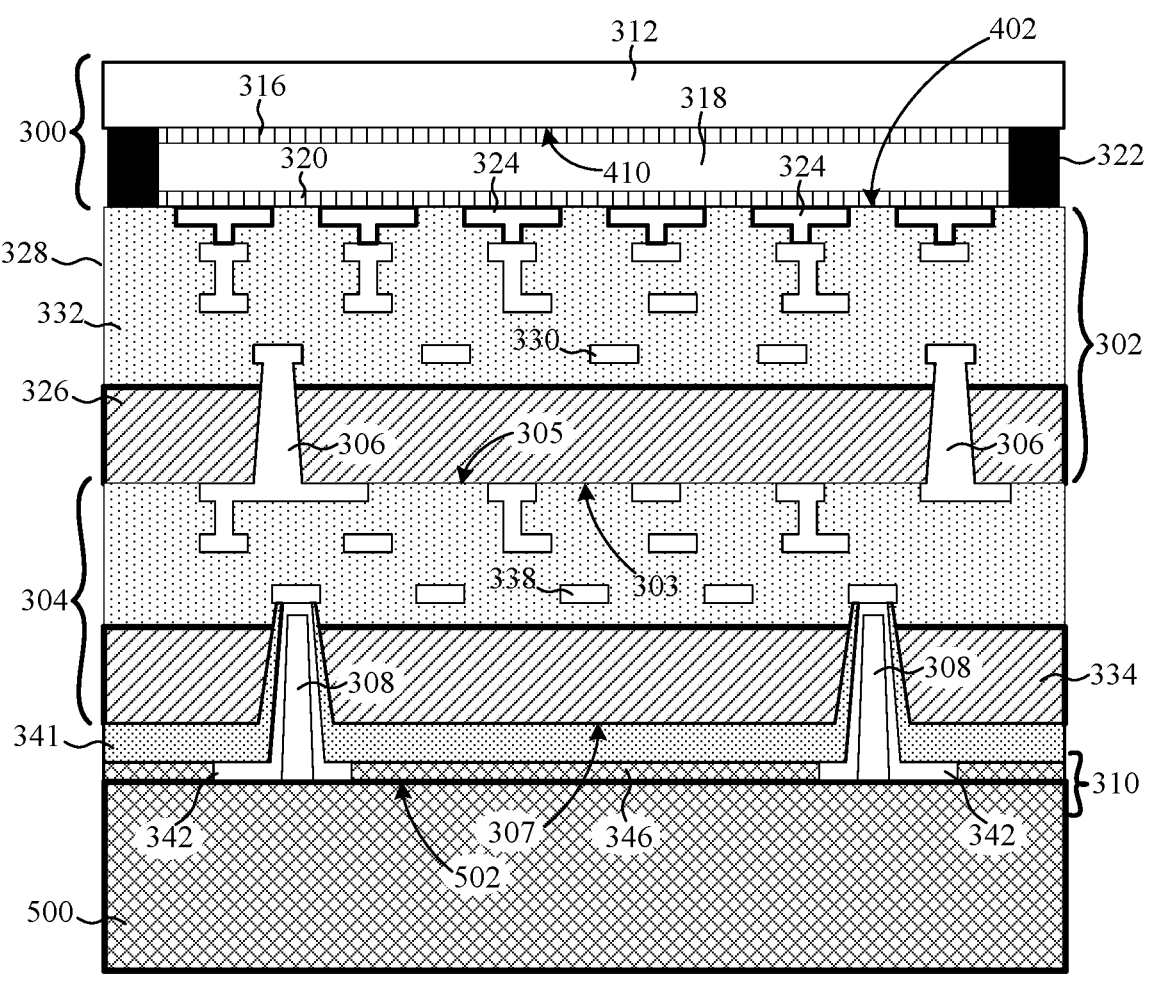
FIG. 5G illustrates a seventh step in the second example method of fabricating the LCOS display device of FIG. 3.

Then, as illustrated in FIG. 5F, a second carrier wafer substrate 500 is provided and bonded to the bottom surface 502 of CSP structure 310, and first carrier wafer substrate 400 is de-bonded and removed from top surface 301 of interconnect layer 328. Next, as illustrated in FIG. 5G, display assembly 300 is formed on the top surface 301 of interconnect layer 328, over pixel mirrors 324. That is, alignment layer 316 is formed on the bottom surface 410 of cover glass 312, alignment layer 320 is formed over the top surface 301 of interconnect layer 328 and pixel mirrors 324, dam 322 is sandwiched between the bottom surface 410 of cover glass 312 and the top surface 301 of interconnect layer 328, and liquid crystal material is deposited in the space bound by dam 322 and alignment layers 316 and 320 to form liquid crystal layer 318.

Figure 5H:
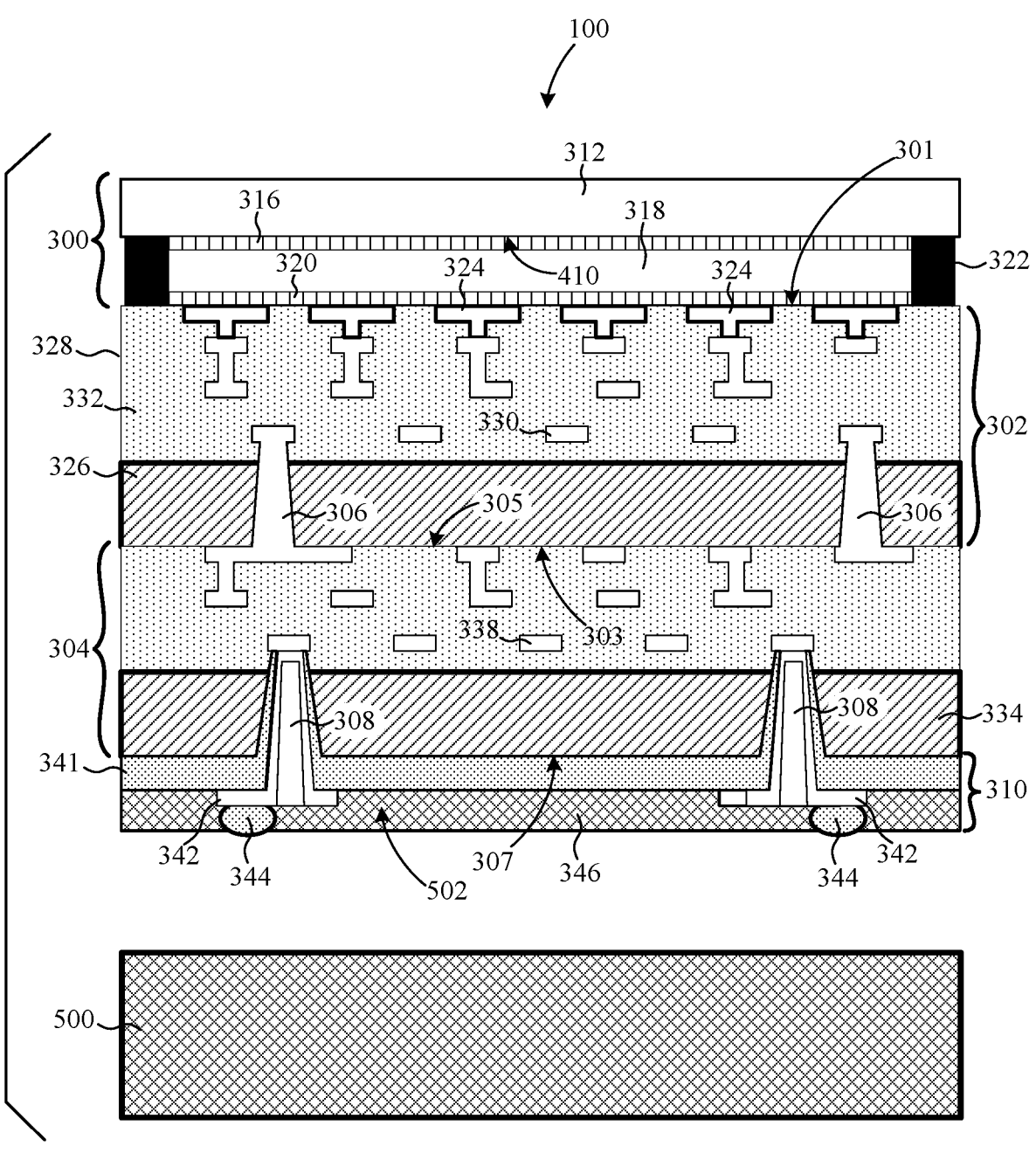
FIG. 5H illustrates an eighth step in the second example method of fabricating the LCOS display device of FIG. 3.

Finally, as illustrated in FIG. 5H, second carrier wafer substrate 500 is de-bonded and removed from CSP 310, thereby exposing metal contacts 342. Solder balls 344 can then be formed on metal contacts 342, and interposer layer 346 can be thickened, to complete CSP 310. In such process, CSP structure 310 can be formed without being subject to the thermal limitation (e.g., 100 degrees Celsius) of liquid crystal material, because liquid crystal layer 318 is formed after the formation of CSP structure 310.

Figure 6:
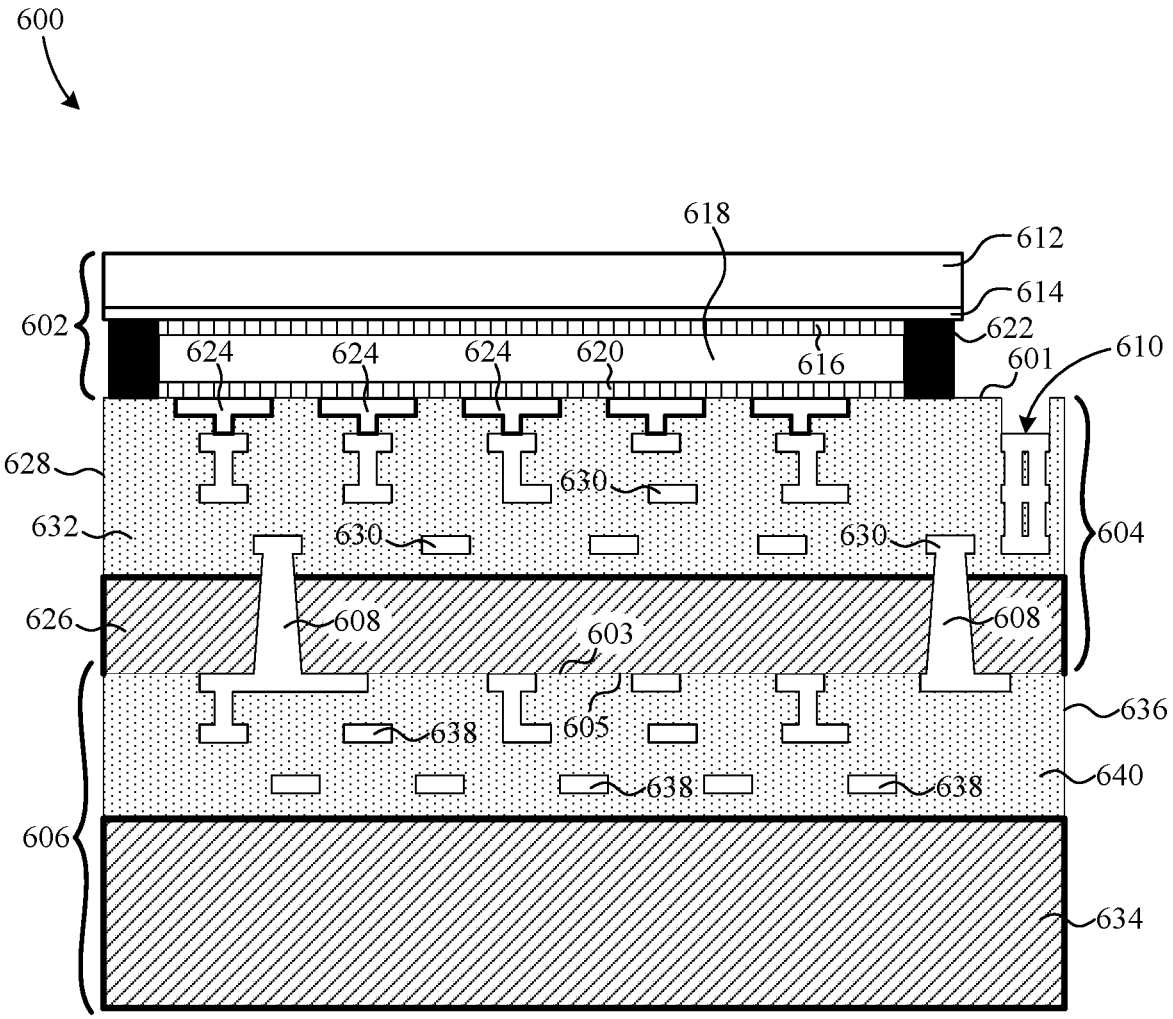
FIG. 6 is a cross-sectional side view of a second example LCOS display device, such as might be included in the projection systems of FIGS. 1 and 2.

FIG. 6 is a cross-sectional view of a second example LCoS display device 600, which includes a display assembly 602, a first circuit substrate 604, a second circuit substrate 606, a set of TSVs 608, and a set of contact pads 610. Display assembly 602 is formed over the top surface 601 of first circuit substrate 604, and the opposite bottom surface 603 of first circuit substrate 604 is bonded to the top surface 605 of second circuit substrate 606. The set of TSVs 608 electrically connect circuitry of second circuit substrate 606 to circuitry of first circuit substrate 604. Contact pads 610 are formed on the top surface 601 of first circuit substrate 604, to facilitate wire bonding LCoS display device 600 to circuitry of an external device, e.g., a host device. Contact pads 610 may be arranged and disposed adjacent to display assembly 602. Contact pads 610 may be arranged in a row and/or column manner.

Display assembly 602 includes a cover glass 612 (transparent layer), a transparent electrode 614, a first liquid crystal alignment layer 616, a liquid crystal layer 618, a second liquid crystal alignment layer 620, and a dam 622. Transparent electrode 614 is formed on the bottom surface of cover glass 612 and is, for example, a layer of conductive material (e.g., indium tin oxide) that is thin enough to be transparent and function as a common electrode across liquid crystal layer 618. Alignment layers 616 and 620 facilitate the alignment of the liquid crystal molecules of liquid crystal layer 618. Alignment layer 616 is formed on the bottom surface of transparent electrode 614, and alignment layer 620 is formed over first circuit substrate 604. Alignment layers 616 and 620 can be formed from any suitable material such as, for example, polyimide and/or SiO$_2$. Dam 622 is disposed around the perimeter of liquid crystal layer 618 and functions as a gasket to encapsulate liquid crystal layer 618 between alignment layers 616 and 620. Cover glass 612 does not cover the contact pads 610.

First circuit substrate 604 includes LCOS circuitry that is configured to drive a plurality of pixel mirrors 624. The LCOS circuitry includes various semiconductor circuit components used in a reflective display backplane, formed in and on a silicon substrate 626. For example, the LCOS circuitry can include, but is not limited to, pixel latches, row/column decoders, line registers, address registers, data storage, and/or any other circuitry useful in a reflective display backplane (not shown in FIG. 6). The various circuit components formed in and on silicon substrate 626 are electrically connected together and to pixel mirrors 624 by a metal interconnect layer 628, which includes various conductive metal elements 630 (e.g., traces, wires, etc.) and an electrically insulating material 632. Pixel mirrors 624 are highly reflective aluminum electrodes formed in and on the top surface 601 of interconnect layer 628.

Second circuit substrate 606 includes control circuitry, for example an application specific integrated circuit (ASIC), which further includes various logic circuit components (not visible) formed in and on a silicon substrate 634. The various logic circuit components may operate at different operating voltages that are lower than an operating voltage of the LCoS circuitry. In this example, the circuitry of second circuit substrate 606 would be configured as a display driver. Examples of such display driver circuitry include, but are not limited to, timing circuits, display data transfer circuits, display data buffers, frame buffers, display control signal generators, and so on. The various circuit components formed in and on silicon substrate 634 are electrically connected together through a metal interconnect layer 636, which includes multiple interconnected layers of various conductive metal elements 638 separated by an electrically insulating material 640. The top surface 605 of interconnect layer 636 is bonded to the bottom surface 603 of silicon substrate 626 in a stacked configuration.

The set of TSVs 608 are through-silicon-vias formed through silicon substrate 626 and filled or lined with conductive material (e.g. copper, aluminum, and so on) to electrically connect conductive metal elements 638 of interconnect layer 636 to conductive metal elements 630 of interconnect layer 628. Thus, the set of TSVs 608 interconnect the circuitry of circuit substrate 604 with the circuitry of circuit substrate 606. Although not shown in the drawings, an insulating layer similar to insulating layer 341 (FIG. 3) is disposed between first circuit substrate 604 and second circuit substrate 606, and each individual TSV of the set of TSVs 608.

Contact pads 610 are formed by removing (e.g, etching) a portion of insulating material 632 from the top surface 601 of interconnect layer 628 to expose predetermined portions of conductive metal elements 630.

In this example embodiment, first circuit substrate 604 is an LCOS chip (reflective display backplane) that operates at a first voltage, and second circuit substrate 606 is an ASIC chip having one or more circuitries that operates at a second, different voltage. The second voltage is lower than the first voltage. Specifically, the voltage required to drive integrating circuitries on silicon substrate 604 controlling operation of pixel mirrors 624 is higher than the voltage required to drive the logic circuitry of the second circuit substrate 606.

Figure 7A:
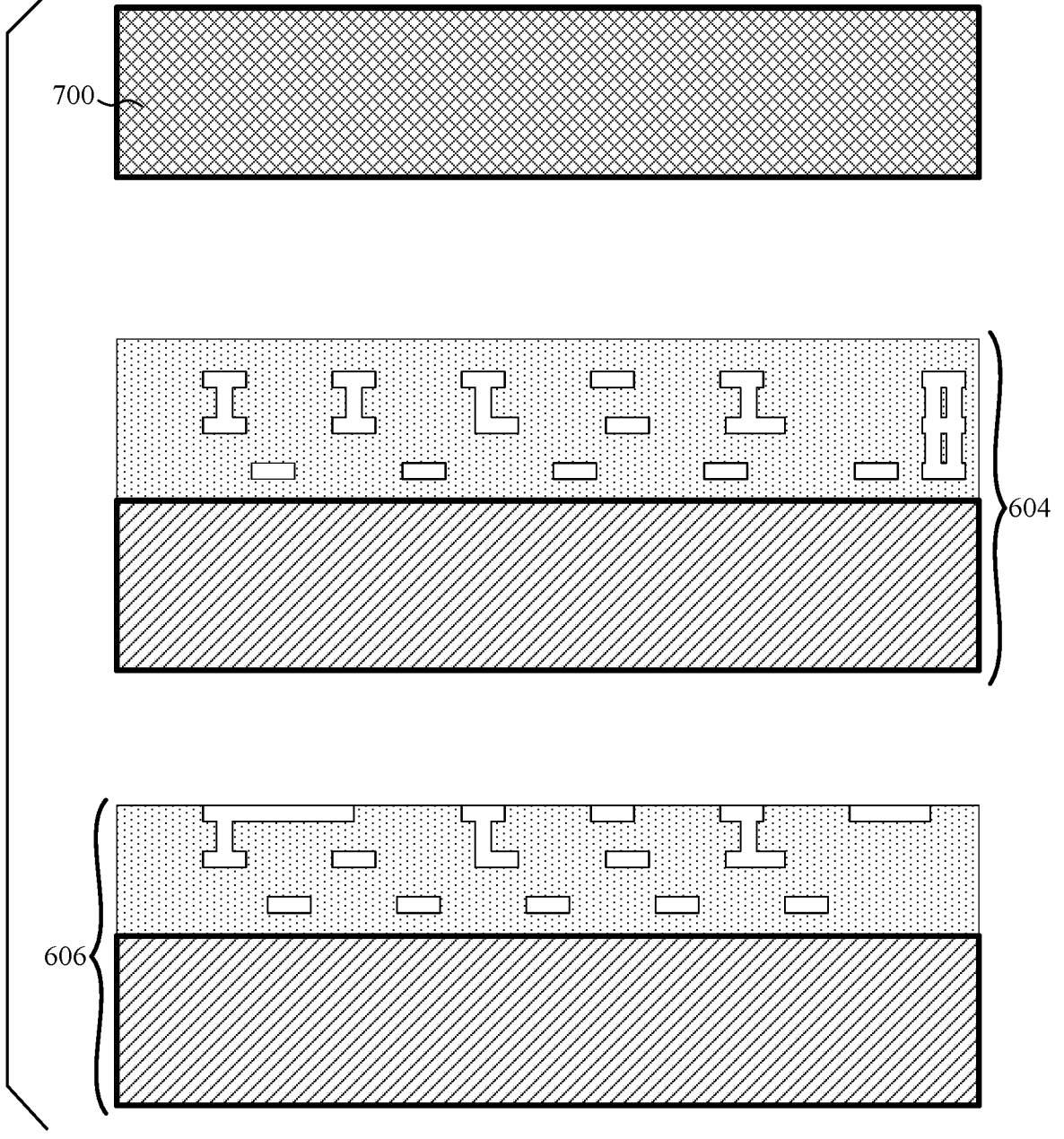
FIG. 7A illustrates a first step in an example method of fabricating the second example LCOS display device of FIG. 6.
Figure 7B:
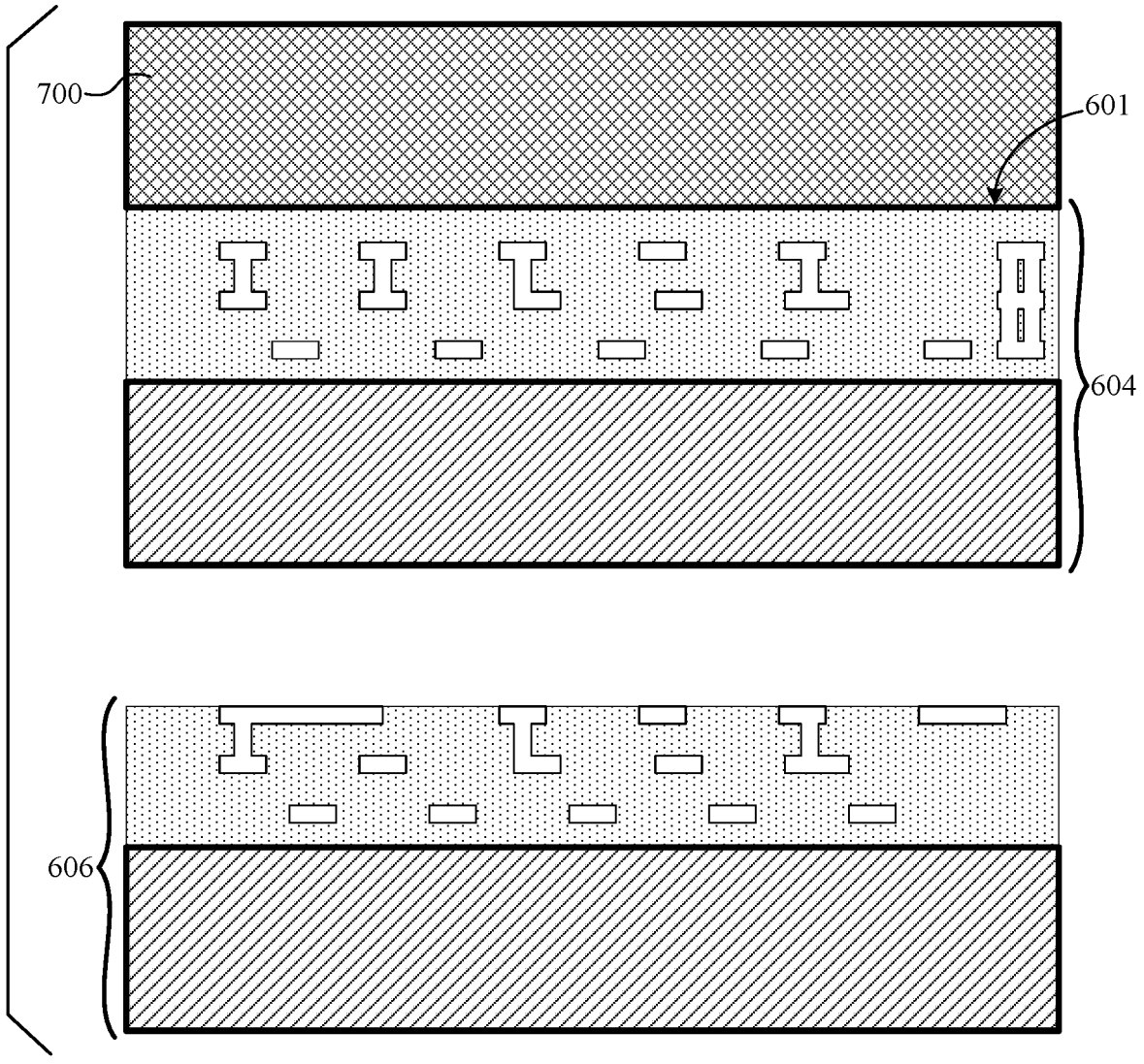
FIG. 7B illustrates a second step in the example method of fabricating the second example LCOS display device of FIG. 6.
Figure 7C:
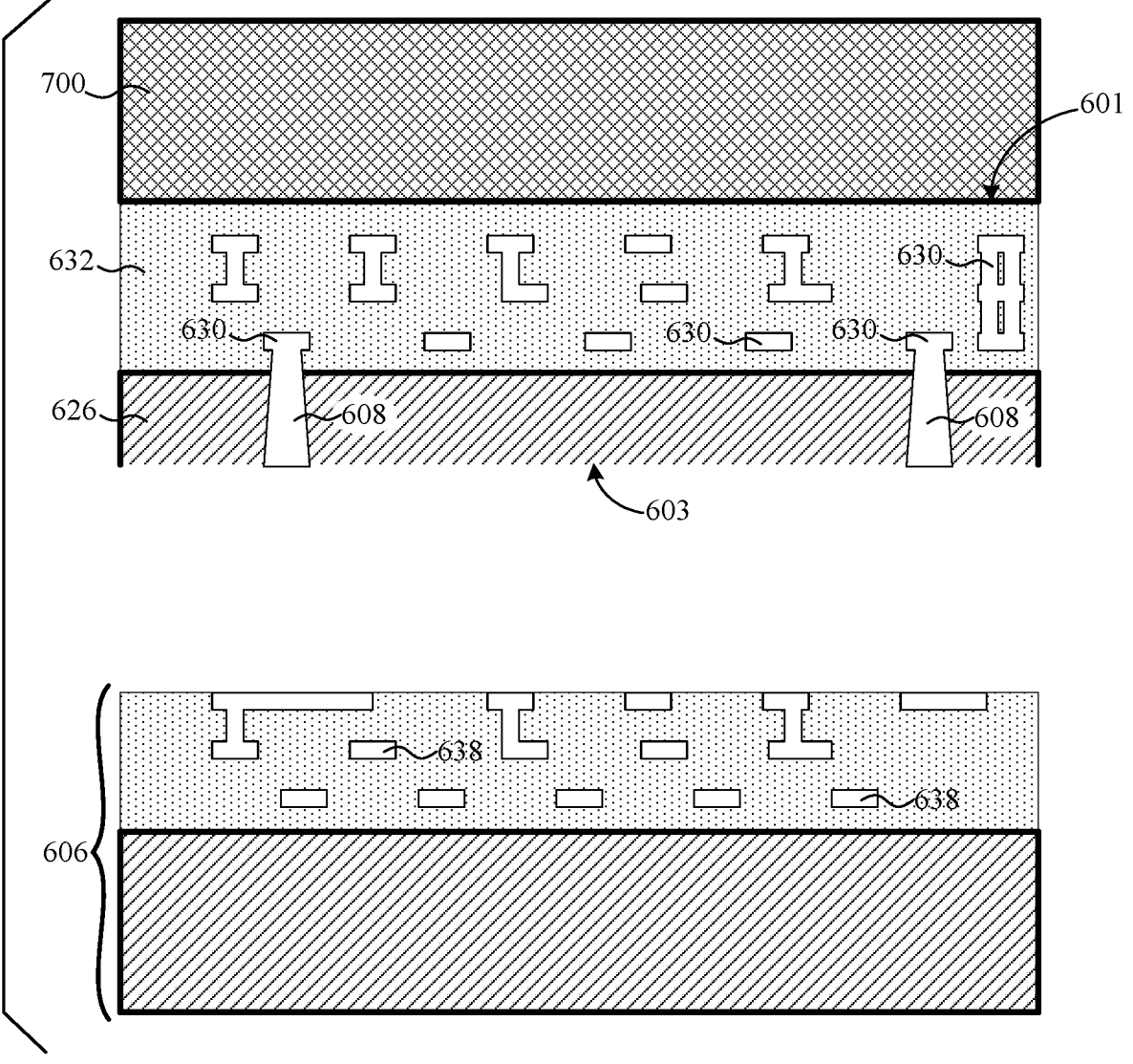
FIG. 7C illustrates a third step in the example method of fabricating the second example LCOS display device of FIG. 6.

FIGS. 7A-4H illustrate a method of manufacturing second example LCOS device 600. As illustrated in FIG. 7A, a carrier wafer substrate 700, first circuit substrate 604, and second circuit substrate 606 are provided as separate components. Next, as illustrated in FIG. 7B, the top surface 601 of interconnect layer 628 of first circuit substrate 604 is bonded (e.g. temperature bonded) to carrier wafer substrate 700. Then, as illustrated in FIG. 7C, silicon substrate 626 is thinned down to a predetermined thickness by removing material from the bottom surface 603 of silicon substrate 626 by some suitable means such as, for example, back grinding, back lapping, chemical etching, etc. Once silicon substrate 626 is thinned down, the set of TSVs 608 are formed through bottom surface 603 and silicon substrate 626. During formation of the set of TSVs 608, the set of TSVs 608 are electrically connected to conductive metal elements 630 forming electrical connections and left exposed on bottom surface 603 of silicon substrate 626.

Figure 7D:
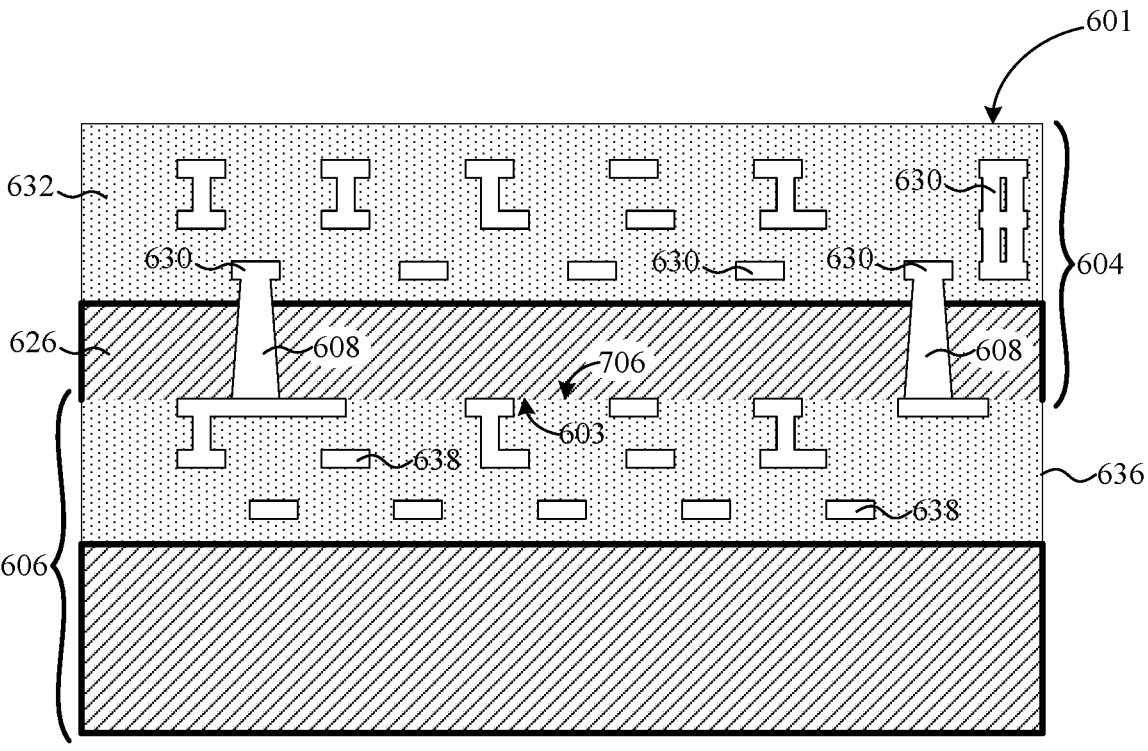
FIG. 7D illustrates a fourth step in the example method of fabricating the second example LCOS display device of FIG. 6.
Figure 7E:
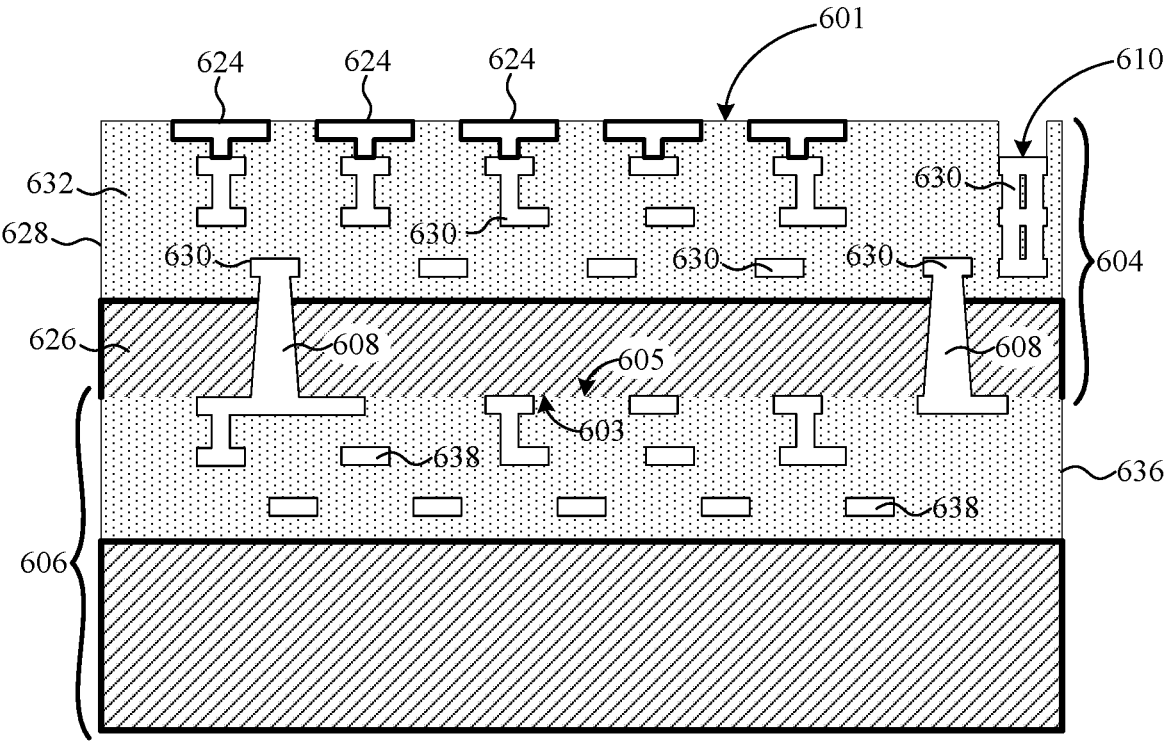
FIG. 7E illustrates a fifth step in the example method of fabricating the second example LCOS display device of FIG. 6.

Next, as illustrated in FIG. 7D, the bottom surface 603 of silicon substrate 626 is bonded to the top surface 605 of interconnect layer 636 of second circuit substrate 606, and carrier wafer substrate 700 is de-bonded and removed from the top surface 601 of interconnect layer 628 of first circuit substrate 604. Then, as illustrated in FIG. 7E, contact pads 610 and pixel mirrors 624 are formed on the top surface 601 of first circuit substrate 604. Contact pads 610 are formed by removing (e.g, etching) a portion of insulating material 632 from top surface 601 of interconnect layer 628, thereby exposing a portion of conductive metal elements 630. Pixel mirrors 624 are formed by patterning a reflective metal on interconnect layer 628, with each individual mirror in electrical contact with at least one of conductive metal elements 630.

Figure 7F:
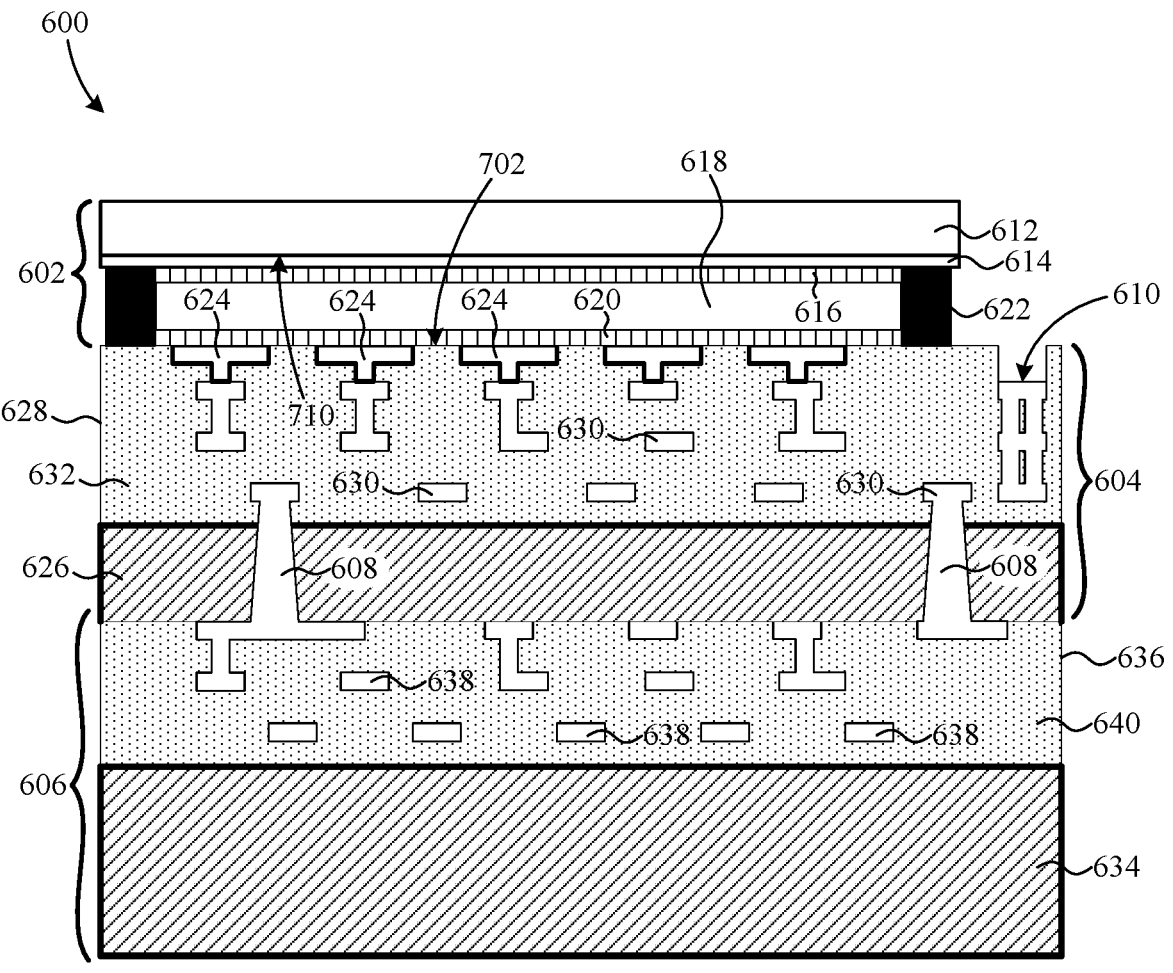
FIG. 7F illustrates a sixth step in the example method of fabricating the second example LCOS display device of FIG. 6.

Finally, as illustrated in FIG. 7F, display assembly 602 is formed on the top surface 601 of interconnect layer 628, over pixel mirrors 624. That is, alignment layer 616 is formed on the bottom surface 710 of glass 612 on transparent electrode 614, alignment layer 620 is formed over the top surface 601 of interconnect layer 628 and pixel mirrors 624, dam 622 is sandwiched between the bottom surface 710 of glass 612 and the top surface 601 of interconnect layer 628, and liquid crystal material is deposited in the space bound by dam 622 and alignment layers 616 and 620 to form liquid crystal layer 618.

Figure 8:
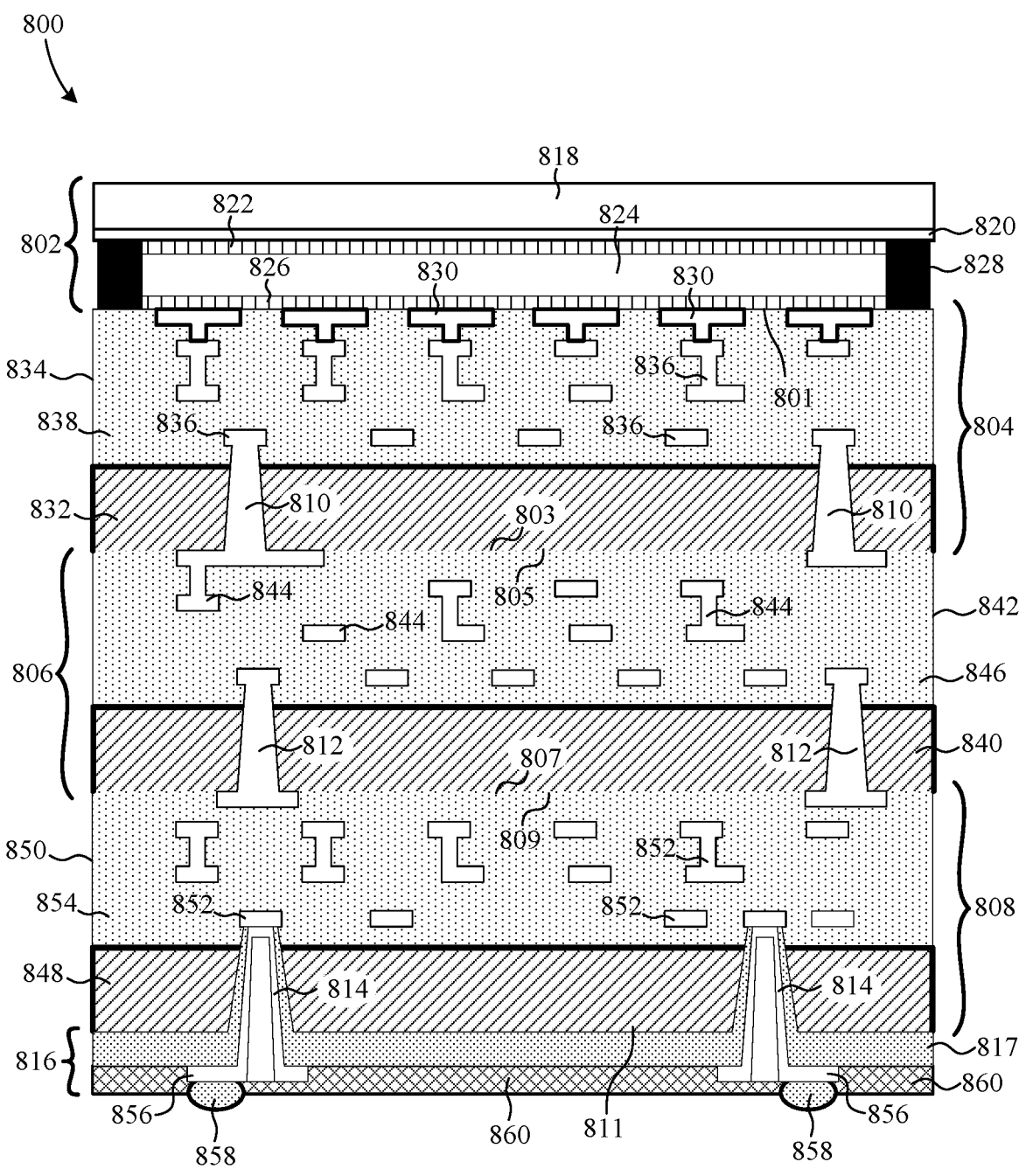
FIG. 8 is a cross-sectional side view of a third example LCOS display device, such as might be included in the projection systems of FIGS. 1 and 2.

FIG. 8 is a cross-sectional view of a third example LCOS display device 800, which includes a display assembly 802, a first circuit substrate 804, a second circuit substrate 806, a third circuit substrate 808, a first set of TSVs 810 (first set of conductive vias), a second set of TSVs 812 (second set of conductive vias), a third set of TSVs 814 (third set of conductive vias), and a CSP structure 816. Display assembly 802 is formed over the top surface 801 of first circuit substrate 804, and the opposite bottom surface 803 of first circuit substrate 804 is bonded to the top surface 805 of second circuit substrate 806. The bottom surface 807 of second circuit substrate 806 is bonded to the top surface 809 of third circuit substrate 808, and CSP structure 816 is formed on to the bottom surface 811 of third circuit substrate 808. The first set of TSVs 810 electrically connect circuitry of second circuit substrate 806 to circuitry of first circuit substrate 804. The second set of TSVs 812 electrically connect circuitry of third circuit substrate 806 to circuitry of second circuit substrate 806. The third set of TSVs 814 electrically connect circuitry of CSP structure 816 to circuitry of third circuit substrate 808.

Display assembly 802 includes a cover glass 818, a transparent electrode 820, a first liquid crystal alignment layer 822, a liquid crystal layer 824, a second liquid crystal alignment layer 826, and a dam 828. Transparent electrode 820 is formed on the bottom surface of cover glass 818 and is, for example, a layer of conductive material (e.g., indium tin oxide) that is thin enough to be transparent and function as a common electrode across liquid crystal layer 824. Alignment layers 822 and 826 facilitate the alignment of the liquid crystal molecules of liquid crystal layer 824. Alignment layer 822 is formed on the bottom surface of transparent electrode 820, and alignment layer 826 is formed over first circuit substrate 804. Alignment layers 822 and 826 can be formed from any suitable material such as, for example, polyimide and/or $SiO_2$. Dam 828 is disposed around the perimeter of liquid crystal layer 824 and functions as a gasket to encapsulate liquid crystal layer 824 between alignment layers 822 and 826.

First circuit substrate 804 includes LCOS circuitry that is configured to drive a plurality of pixel mirrors 830. In particular, first circuit substrate 804 is a reflective display backplane that includes, by way of non-limiting example, pixel data latches, data input lines, control signal lines, column and/or row decoders, address registers, data line buffers, and so on. These functional components are embodied in various semiconductor circuit components formed in and on a silicon substrate 832. The various circuit components formed in and on silicon substrate 832 are electrically connected together and to the plurality of pixel mirrors 830 by a metal interconnect layer 834, which includes multiple layers of various conductive metal elements 836 separated by an electrically insulating material 838. The plurality of pixel mirrors 830 in embodiments are highly reflective aluminum or silver-plated aluminum electrodes formed in and on the top surface 801 of interconnect layer 834.

Second circuit substrate 806 includes an application specific integrated circuit (ASIC), which further includes various logic circuit components (not visible) formed in and on a silicon substrate 840. As described with reference to the other example devices, the circuitry of second circuit substrate 805 functions as a display driver. The various circuit components formed in and on silicon substrate 840 are electrically connected together through a metal interconnect layer 842, which includes multiple layers of various conductive metal elements 844 separated by an electrically insulating material 846. The top surface 805 of interconnect layer 842 is bonded to the bottom surface 803 of silicon substrate 832 of first circuit substrate 804 in a stacked configuration.

Third circuit substrate 808 includes various logic circuit components (not visible) formed in and on a silicon substrate 848. The various circuit components formed in and on silicon substrate 848 are electrically connected together through a metal interconnect layer 850, which includes multiple layers of various conductive metal elements 852 separated by an electrically insulating material 854. The top surface 809 of interconnect layer 850 is bonded to the bottom surface 807 of silicon substrate 840 of second circuit substrate 806 in a stacked configuration.

The circuitry of third circuit substrate 808 can provide a great variety of functions that have a synergistic relationship with the display driver circuitry of second circuit substrate 806 and/or the reflective display backplane circuitry of first circuit substrate 804. For example, the circuitry of third circuit substrate 808 can include additional data storage for video data. As another example the circuitry of third circuit substrate can be configured to receive video data of a first format (e.g., 24-bit RGB data) and convert the video data to another format, for example, data having a combination of binary-weighted bits and other equally weighted bits. As another example, the circuitry of third circuit substrate 808 can include a processing unit and storage for executable code. The code can include AR or VR applications, video processing and/or augmentation applications, configuration routines, and so on. Alternatively, such functionality can be provided with a preconfigured controller or logic array. The foregoing examples are not intended to be limiting, but rather are intended to provide a small example of the types of display-synergistic functionality that can be integrated into third circuit substrate 808.

TSVs included in the first set of TSVs 810 are through-silicon-vias formed through silicon substrate 832 and filled or coated with conductive material (e.g. copper, aluminum, etc.) to electrically connect the circuitry of interconnect layer 842 to the circuitry of interconnect layer 834. TSVs included in the second set of TSVs 812 are through-silicon-vias formed through silicon substrate 840 and filled or coated with conductive material (e.g. copper, aluminum, etc.) to electrically connect the circuitry of interconnect layer 850 to the circuitry of interconnect layer 842. TSVs included in the third set of TSVs 814 are through-silicon-vias formed through silicon substrate 848 and filled or coated with conductive material (e.g. copper, aluminum, etc.) to electrically connect the circuitry of CSP structure 816 to the circuitry of interconnect layer 850.

First circuit substrate 804 is an LCOS chip that operates at a first voltage and second circuit substrate 806 is an ASIC chip that operates at a second, different voltage that is lower than the first voltage. Specifically, the voltage that drives integrated circuitries (e.g., LCoS driver circuitries) of first circuit substrate 804 and pixel mirrors 830 is higher than the voltage that drives the logic circuitry of second circuit substrate 806. The voltage that drives third circuit substrate 808 may be the same voltage that drives integrated circuitries of the second circuit substrate 806, the same the voltage that drives circuitries of first circuit substrate 804, or some third voltage different than the previous two voltages.

CSP structure 816 is coupled to the bottom surface 811 of silicon substrate 848 and is configured to electrically connect the circuitry of LCOS display device 800 to the circuitry of a hosting device. CSP structure 816 includes and insulating layer 817, a plurality of metal contacts 856, a plurality of solder bumps 858, and an interposer layer 860 (e.g., solder mask). Insulating layer 817 is formed after via holes are made through silicon substrate 848, but before the deposition of the conductive material e.g., (metal material such as copper or aluminum) of TSVs 814. Contacts 856 are electrically connected to corresponding TSVs of the third set of TSVs 814, and solder bumps 858 are electrically connected to contacts 856. Solder bumps 858 facilitate electrical connection to contact pads of an external device, such as a host device, for providing control signals and/or display image data thereto, by some suitable process such as, for example, reflow, ultrasonic bonding, etc. Interposer layer 860 is disposed around and between contacts 856.

Although not shown in the drawings, an insulating layer similar to insulating layer 817 is disposed between first circuit substrate 804 and second circuit substrate 806, and between individual TSVs included in the first set of TSVs 810 and silicon substrate 832. Similarly, an insulating layer is disposed between circuit substrate 806 and circuit substrate 808, and between individual TSVs included in the first set of TSVs 812 and silicon substrate 840.

Although LCOS display device 800 includes three stacked circuit substrates, it should be understood that alternative devices may include any desirable number of circuit substrates connected in a stacked configuration.

Figure 9A:
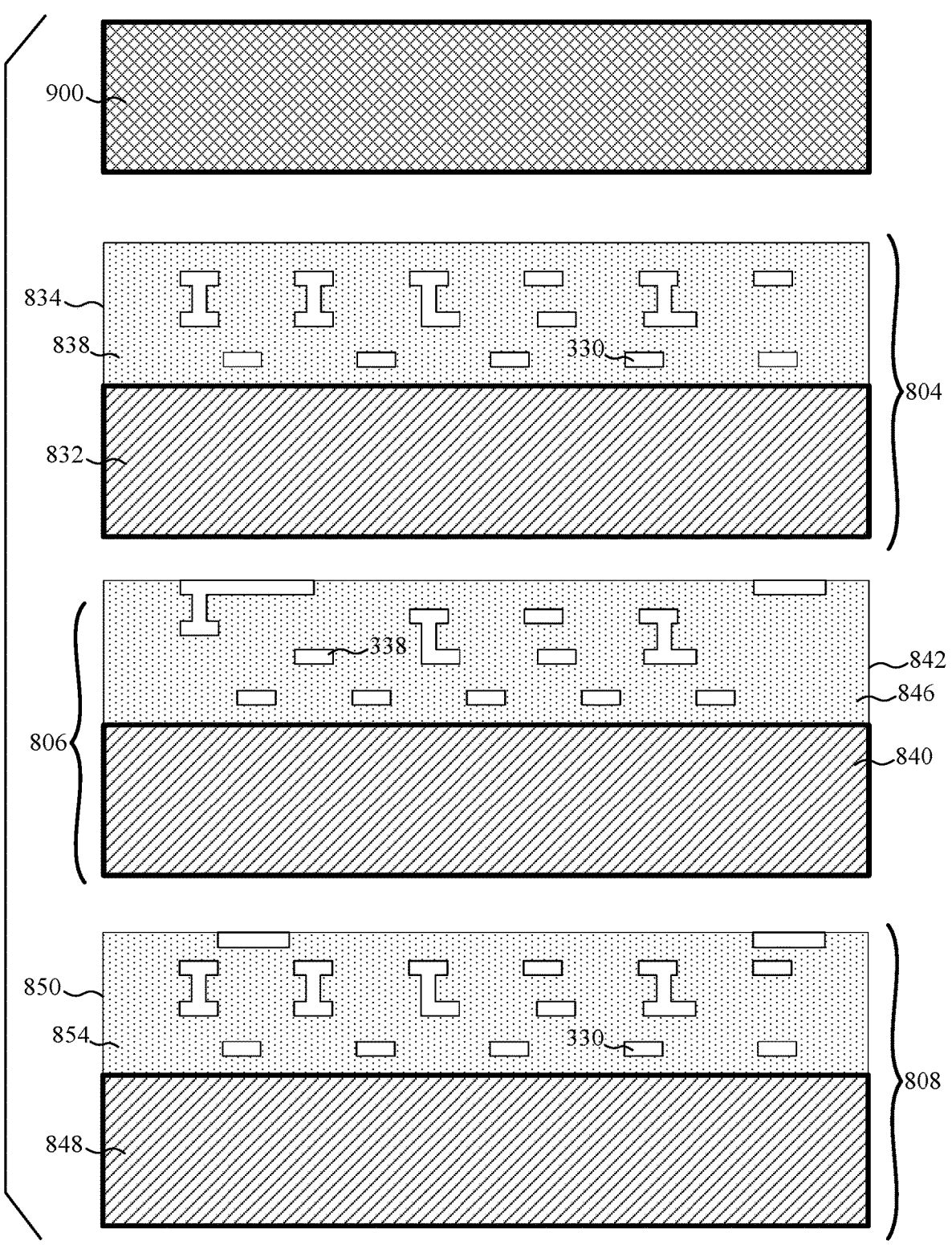
FIG. 9A illustrates a first step in a first example method of manufacturing the third example LCOS display device of FIG. 8.
Figure 9B:
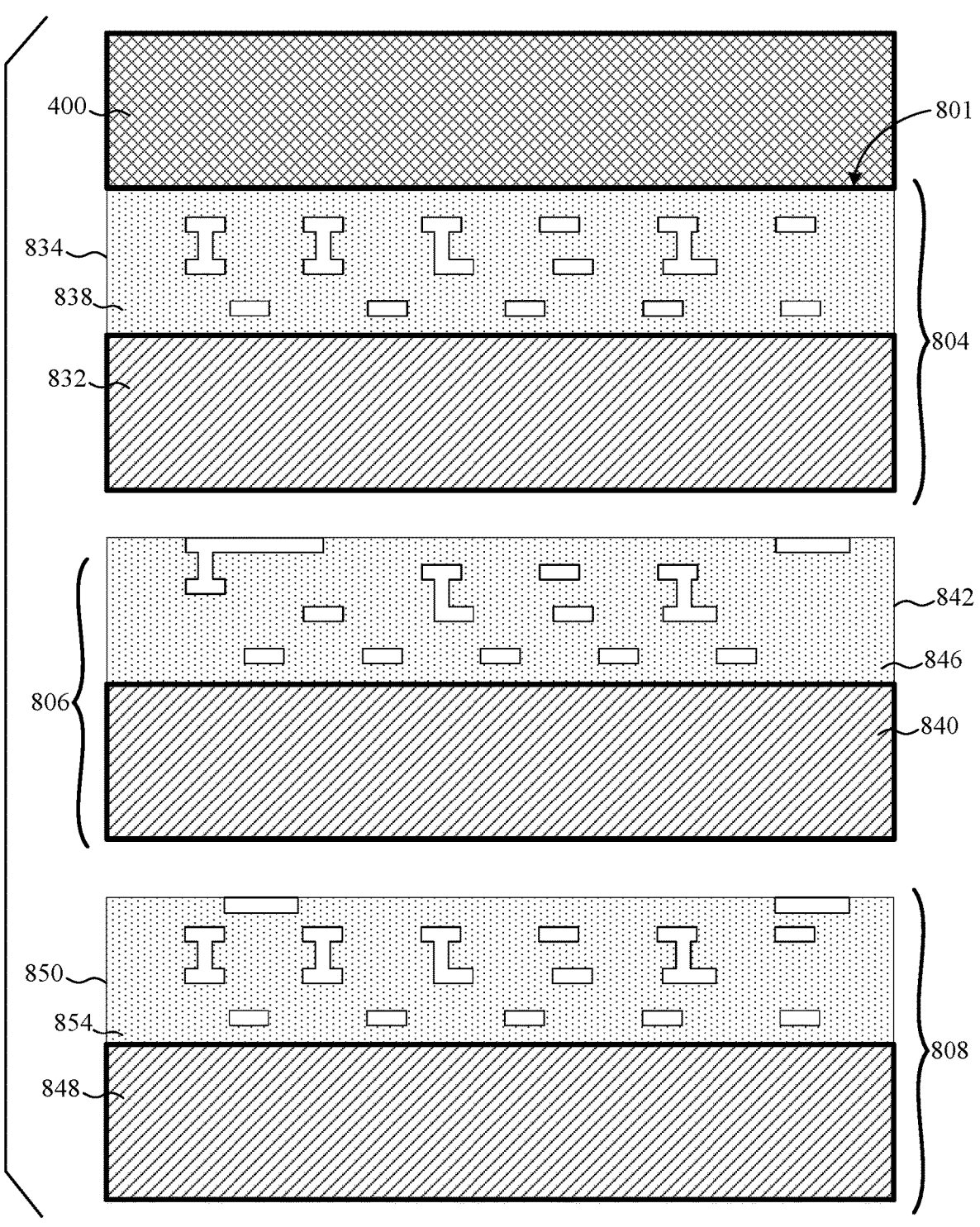
FIG. 9B illustrates a second step in the first example method of manufacturing the third example LCOS display device of FIG. 8.
Figure 9C:
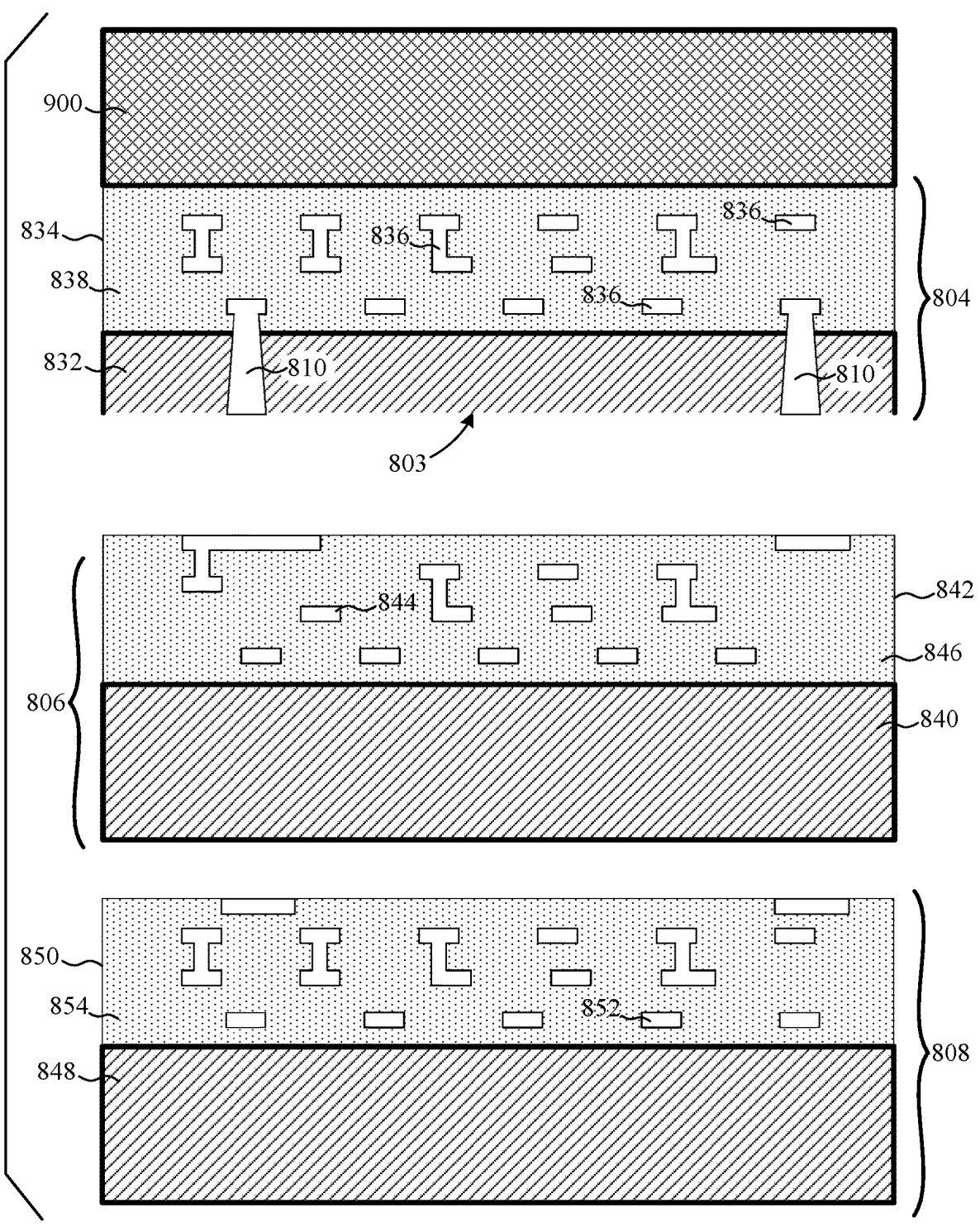
FIG. 9C illustrates a third step in the first example method of manufacturing the third example LCoS display device of FIG. 8.

FIGS. 9A-9K illustrate a first example method of manufacturing LCOS device 800. As illustrated in FIG. 9A, a carrier wafer substrate 900, first circuit substrate 804, second circuit substrate 806, and third circuit substrate 808 are provided as separate components. Then, as illustrated in FIG. 9B, carrier wafer substrate 900 is bonded (e.g. by temperature bonding) to the top surface 801 of interconnect layer 834. Next, as illustrated in FIG. 9C, silicon substrate 832 is thinned down by removing material from the bottom surface 803 of silicon substrate 832, by some suitable means such as, for example, back grinding, back lapping, chemical etching, etc. After silicon substrate 832 is thinned down, TSVs 810 are formed through bottom surface 803 and substrate 832. During formation of the first set of TSVs 810, the first set of TSVs 810 are electrically connected to particular metal elements 836 and left exposed on the bottom surface 803 of silicon substrate 832.

Figure 9D:
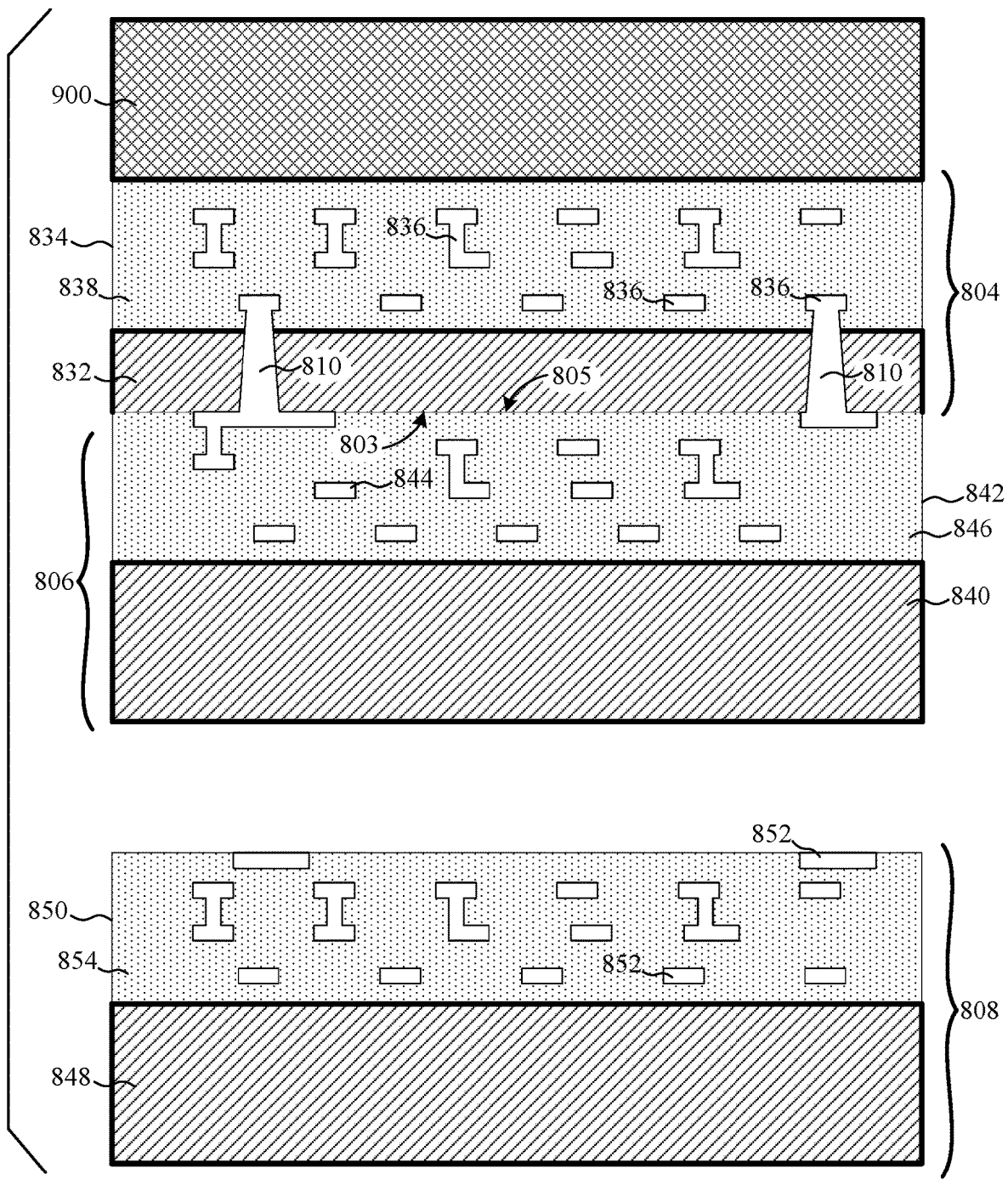
FIG. 9D illustrates a fourth step in the first example method of manufacturing the third example LCOS display device of FIG. 8.
Figure 9E:
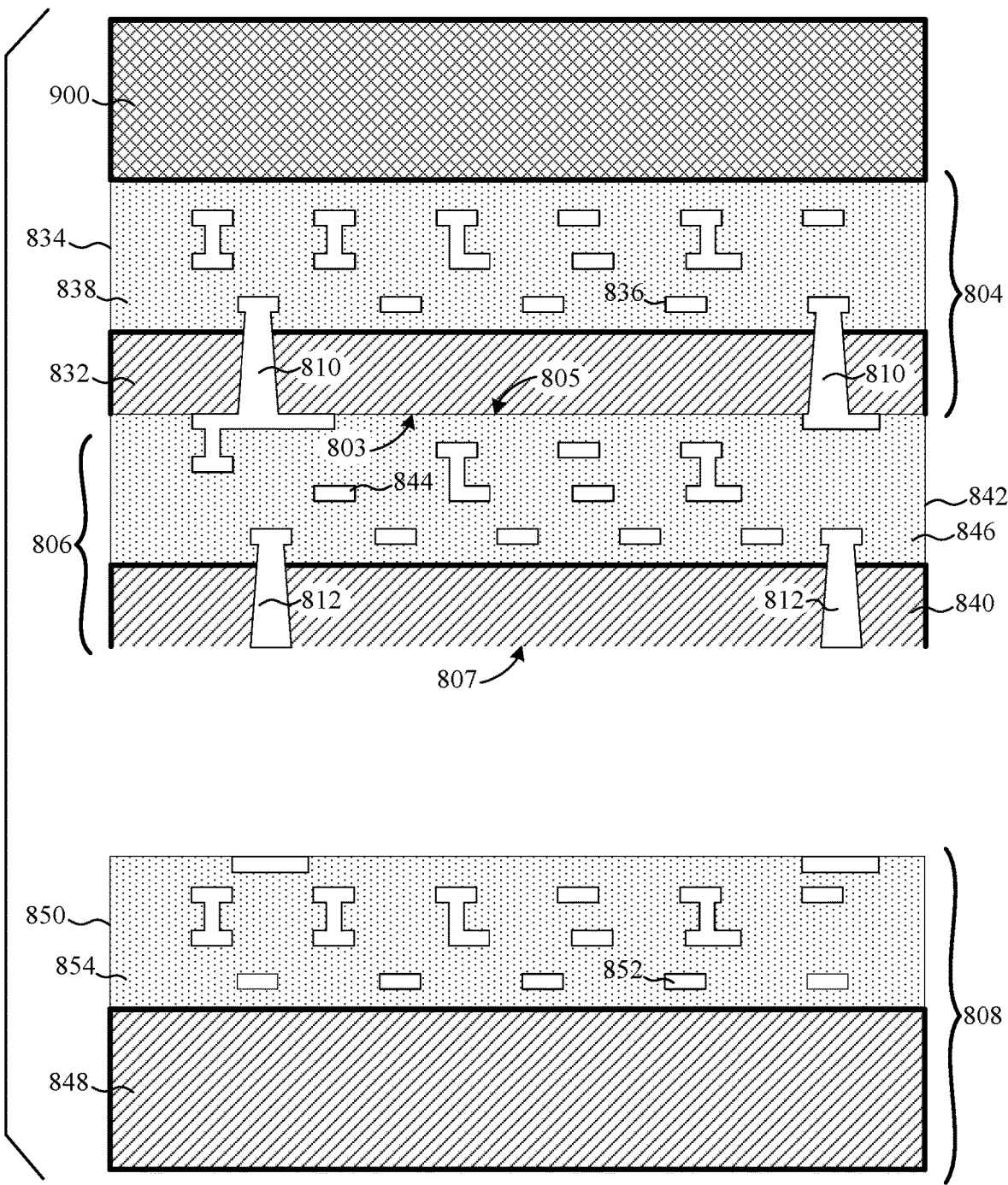
FIG. 9E illustrates a fifth step in the first example method of manufacturing the third example LCOS display device of FIG. 8.

Then, as illustrated in FIG. 9D, the top surface 805 of interconnect layer 842 is bonded to the ground-down bottom surface 803 of silicon substrate 832. The bonding of interconnect layer 842 to silicon substrate 832 includes physically bonding interconnect layer 842 to silicon substrate 832 and also electrically connecting certain metal elements 844 of interconnect layer 842 to respective TSVs included in the first set of TSVs 810. Next, as illustrated in FIG. 9E, silicon substrate 840 is thinned down by removing material from the bottom surface 807 of silicon substrate 840 by some suitable means such as, for example, back grinding, back lapping, chemical etching, etc. After silicon substrate 840 is thinned down, TSVs of the second set of TSVs 812 are formed through bottom surface 807 and substrate 840. During formation of the second set of TSVs 812, the second set of TSVs 812 are electrically connected to certain of ones of metal elements 844 and left exposed on the bottom surface 807 of silicon substrate 840.

Figure 9F:
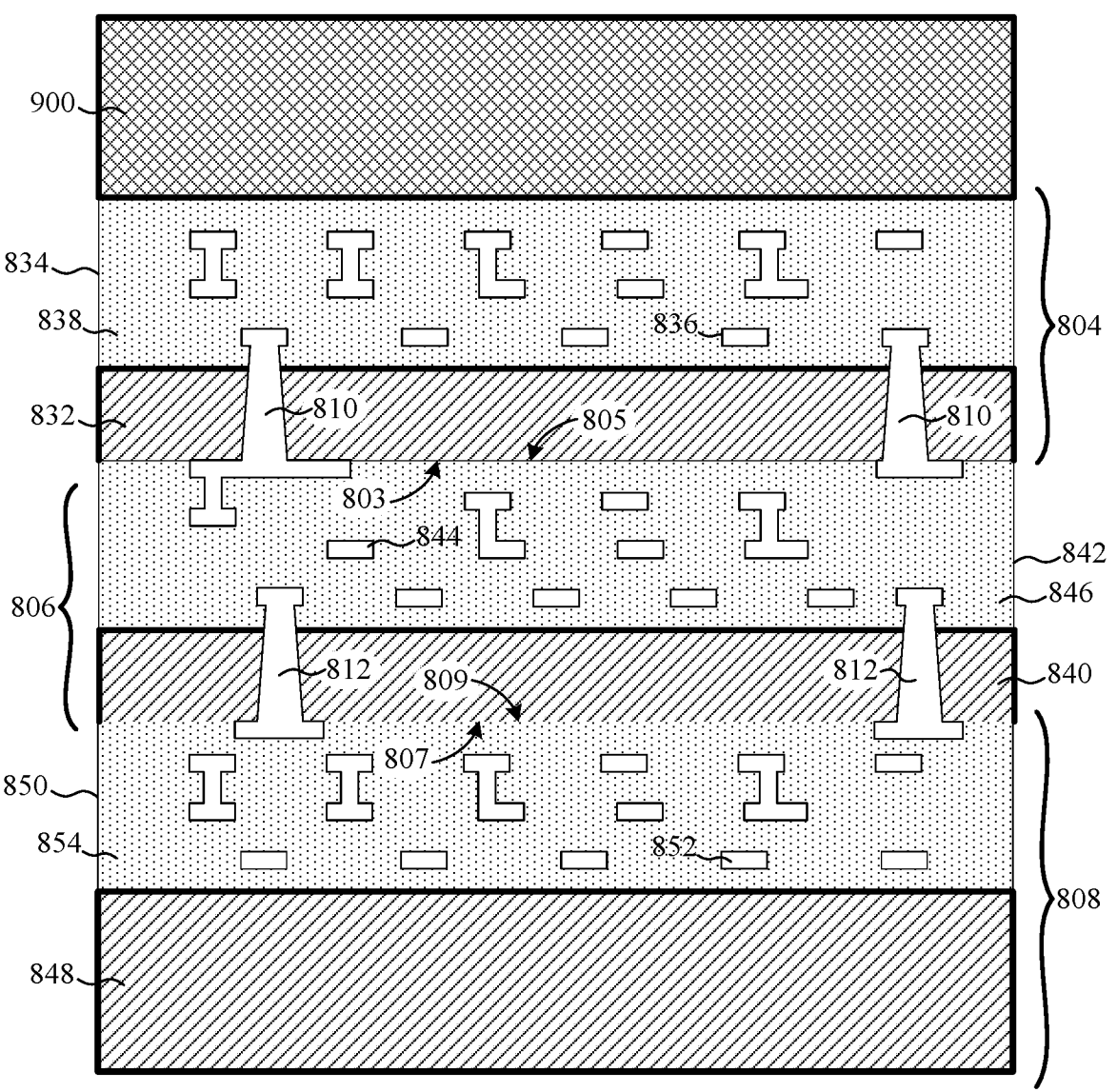
FIG. 9F illustrates a sixth step in the first example method of manufacturing the third example LCOS display device of FIG. 8.

Then, as illustrated in FIG. 9F, the top surface 809 of interconnect layer 850 is bonded to the ground-down bottom surface 807 of silicon substrate 840. The bonding of interconnect layer 850 to silicon substrate 840 includes physically bonding interconnect layer 850 to silicon substrate 840 and also electrically connecting certain ones of metal elements 852 of interconnect layer 850 to respective TSVs of the second set of TSVs 812.

Figure 9G:
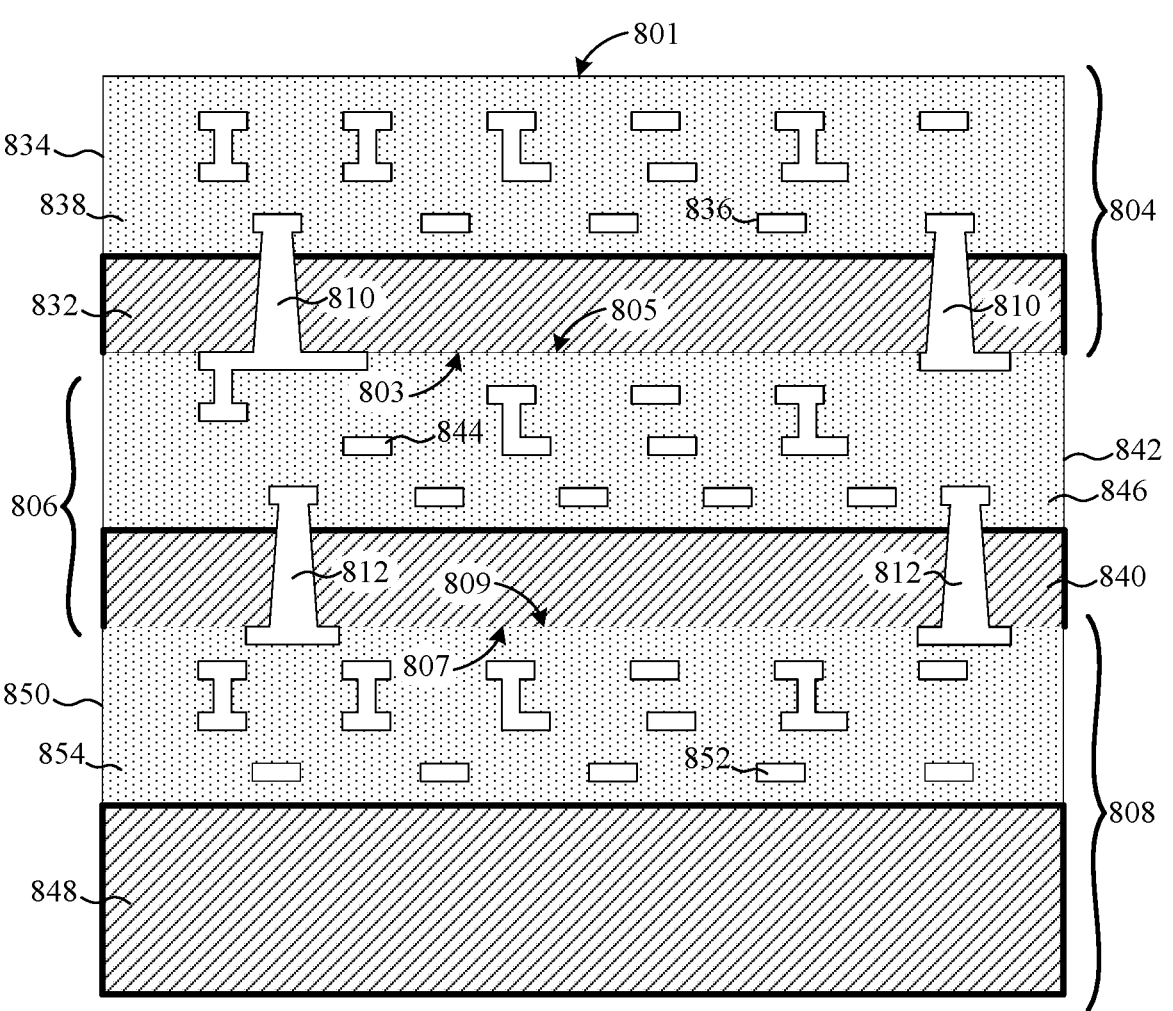
FIG. 9G illustrates a seventh step in the first example method of manufacturing the third example LCOS display device of FIG. 8.
Figure 9H:
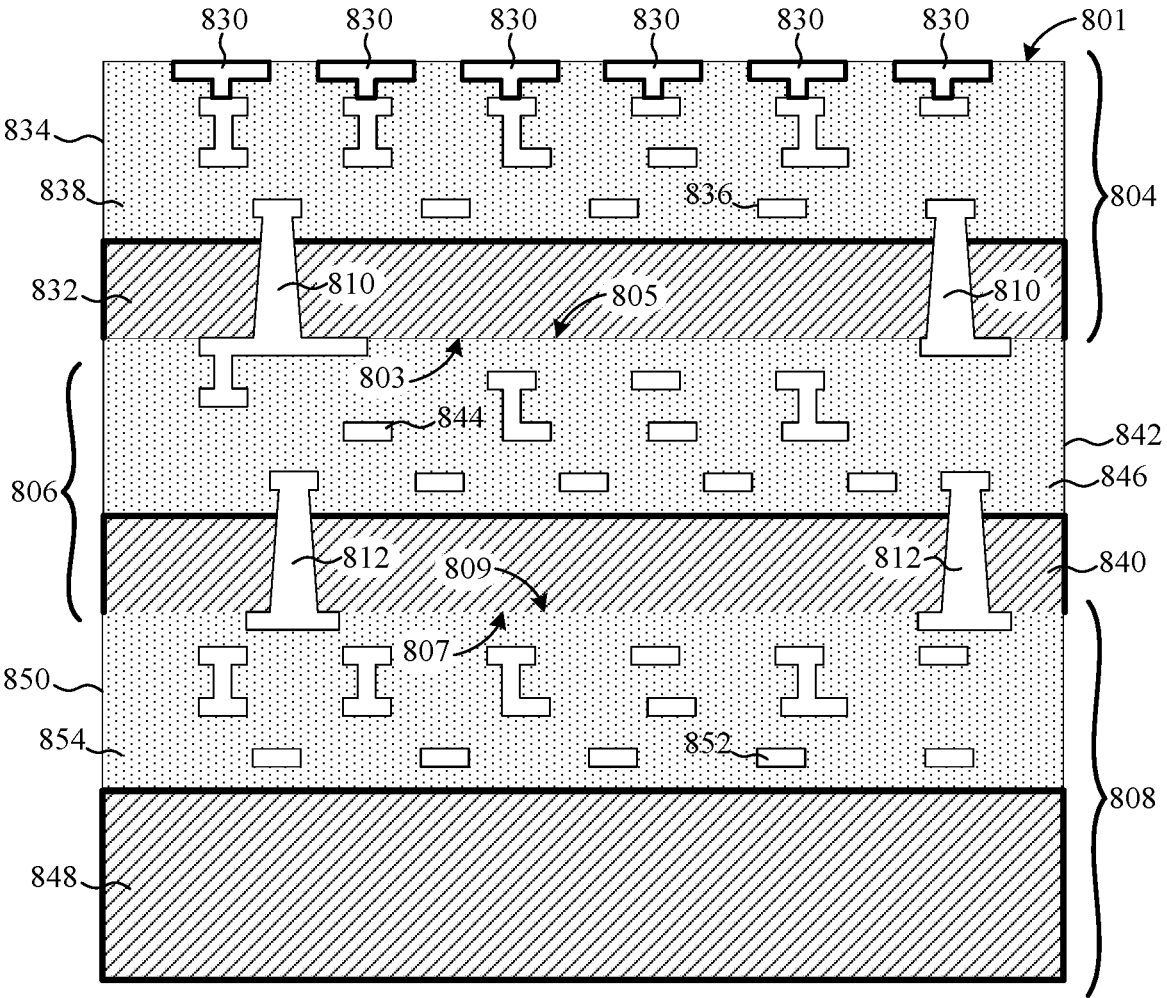
FIG. 9H illustrates an eighth step in the first example method of manufacturing the third example LCoS display device of FIG. 8.

Next, as illustrated in FIG. 9G, carrier wafer substrate 900 is removed from top surface 801 of interconnect layer 834. Then, as illustrated in FIG. 9H, pixel mirrors 830 are formed on the top surface 801 of interconnect layer 834 of first circuit substrate 804. In forming pixel mirrors 830, each pixel mirror 830 is electrically connected to a particular one of metal elements 836 of interconnect layer 834.

Figure 9I:
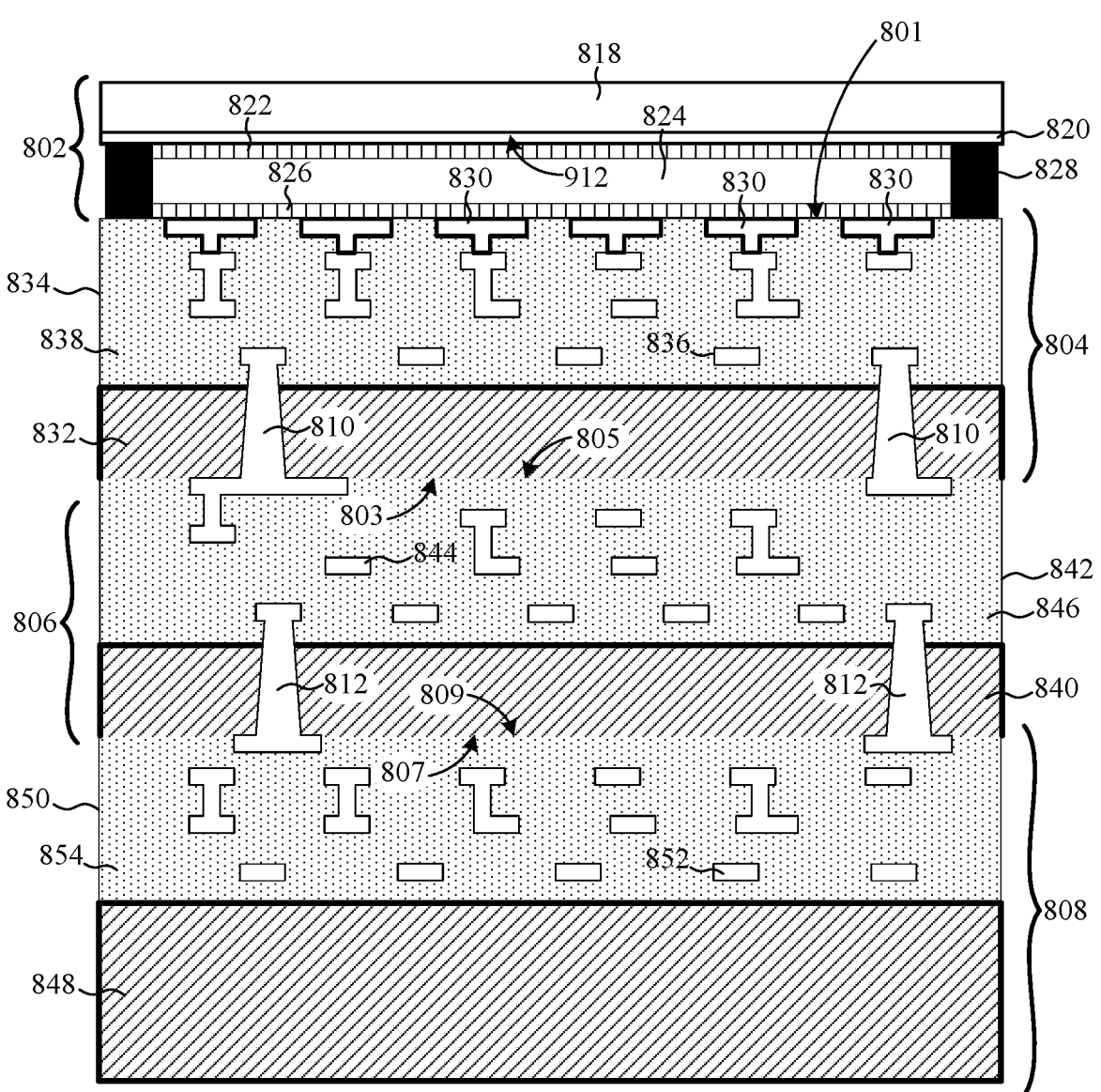
FIG. 9I illustrates a ninth step in the first example method of manufacturing the third example LCOS display device of FIG. 8.
Figure 9J:
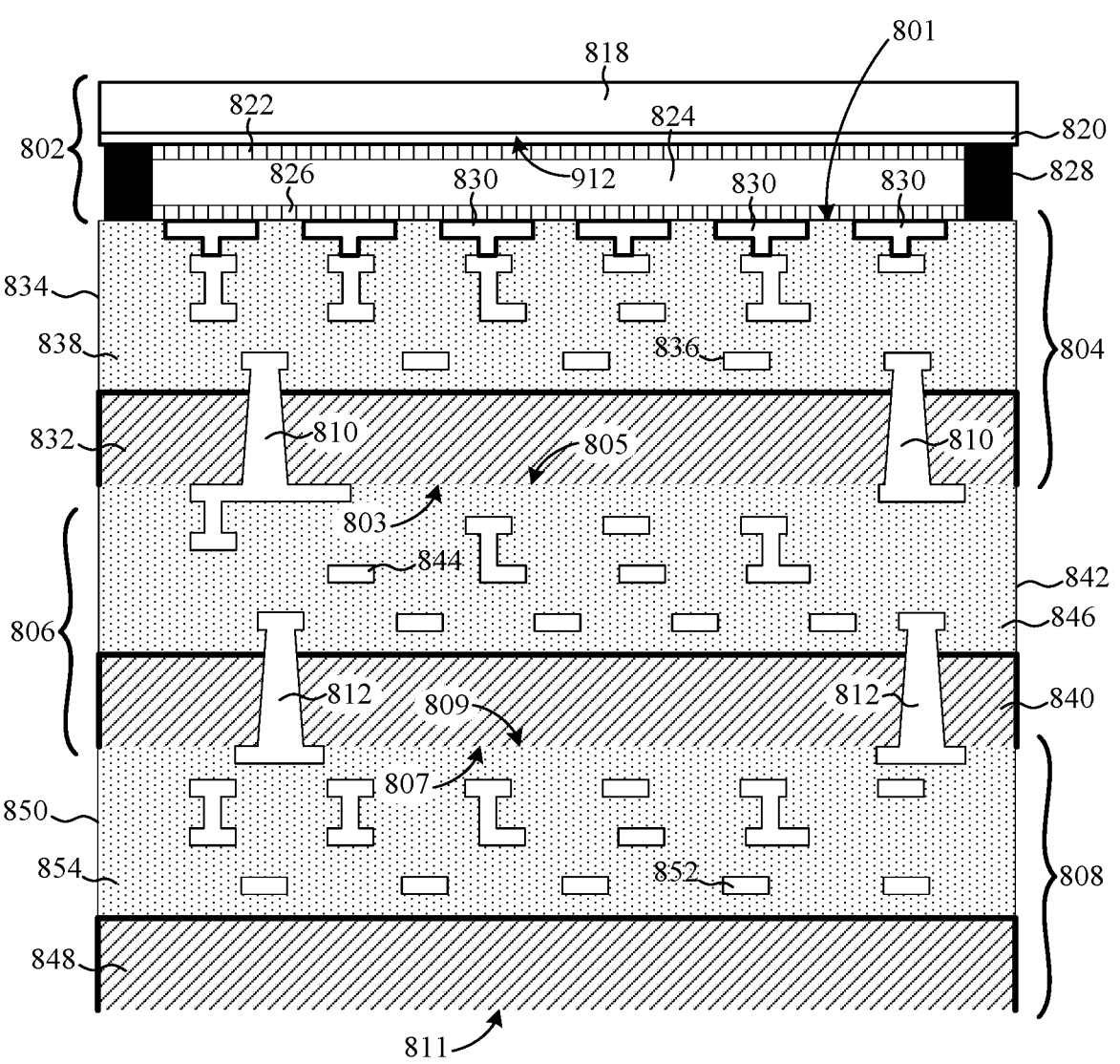
FIG. 9J illustrates a tenth step in the first example method of manufacturing the third example LCOS display device of FIG. 8.

Next, as illustrated in FIG. 9I, display assembly 802 is formed on the top surface 801 of interconnect layer 834, over pixel mirrors 830. That is, alignment layer 822 is formed on the bottom surface 912 of glass 818 over transparent electrode 820, alignment layer 826 is formed over the top surface 801 of interconnect layer 834 and pixel mirrors 830, dam 828 is sandwiched between the bottom surface 912 of glass 818 and the top surface 801 of interconnect layer 834, and liquid crystal material is deposited in the space bound by dam 828 and alignment layers 822 and 826 to form liquid crystal layer 824. Then, as illustrated in FIG. 9J, silicon substrate 848 is thinned down by removing material from the bottom surface 811 of silicon substrate 848 by some suitable means such as, for example, back grinding, back lapping, chemical etching, etc.

Figure 9K:
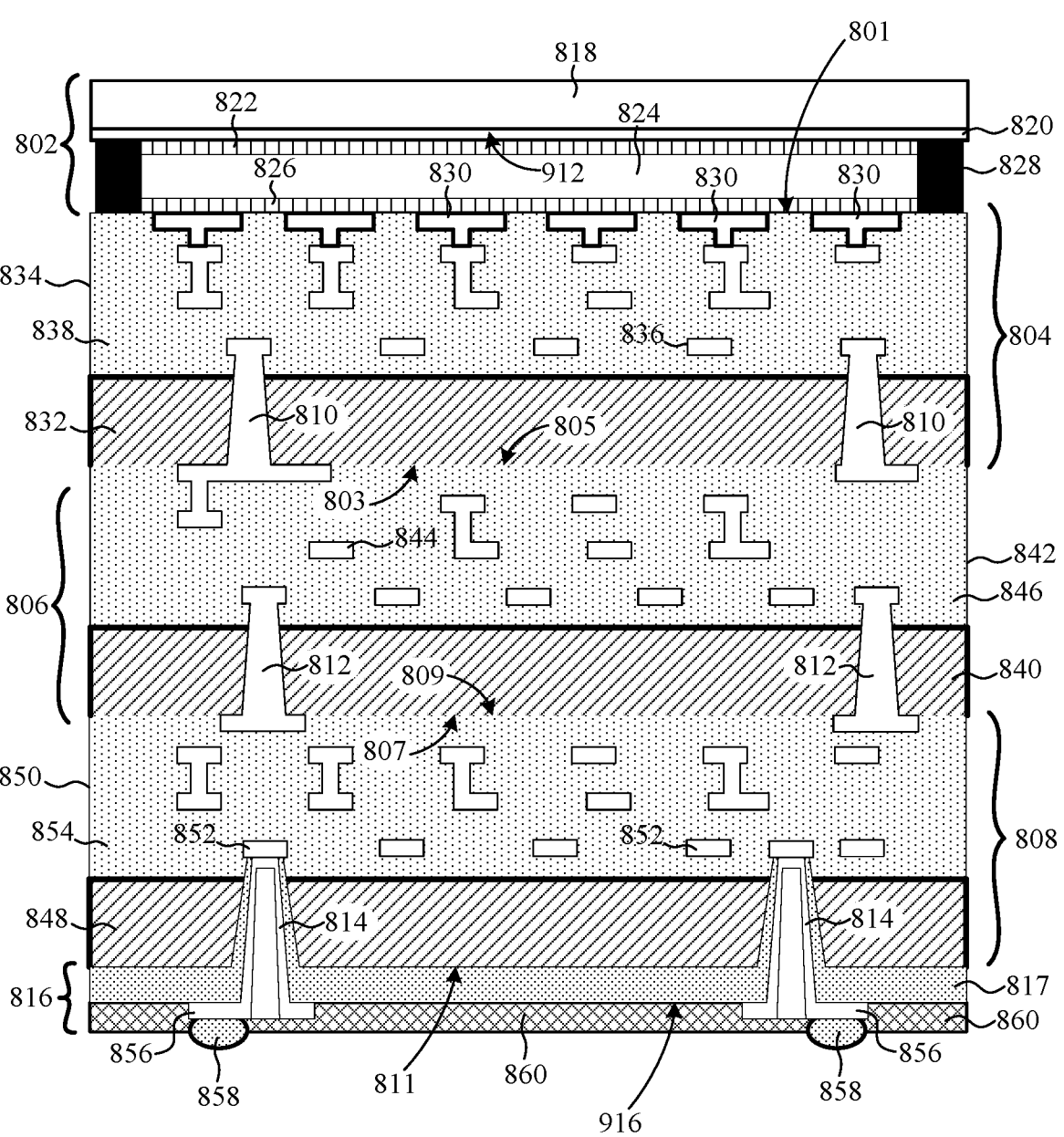
FIG. 9K illustrates an eleventh step in the first example method of manufacturing the third example LCOS display device of FIG. 8.

Finally, as illustrated in FIG. 9K, the third set of TSVs 814 and CSP structure 816 are formed. CSP structure 816 includes an insulating layer 817 formed on the bottom surface 811 of substrate 848. TSVs of the third set of TSVs 814 are formed through bottom surface 811 and silicon substrate 848. In one example, a plurality of openings or trenches corresponding to positions of TSVs of the third set of TSVs 814 are formed through or on silicon substrate 848. Insulating layer 817 is deposited after openings (or trenches) are formed through silicon substrate 848, lining sidewall surfaces of the openings or trenches, but before the deposition of conductive material (e.g., metal material such as copper or aluminum) forming individual TSVs included in the third set of TSVs 814, such that the insulating layer 817 provides electrical isolation between conductive material of each individual TSV included in the third set of TSVs 814 and silicon substrate 848. During formation of the third set of TSVs 814, the third set of TSVs 814 are electrically connected to respective ones of metal elements 852 and left exposed on the bottom surface 916 of silicon substrate 848. The bottom surface of insulating layer 817 may be the surface of the insulating layer 817 that is away from the bottom surface 811 of silicon substrate 848. Metal contacts 856 are then formed in electrical contact with respective TSVs included in the third set of TSVs 814, and solder bumps 858 are formed on the bottom surface 811 of silicon substrate 848 in contact with metal contacts 856. Interposer layer 860 (soldier mask) is disposed around and between metal contacts 856. In embodiments, interposer layer 860 may enclose the metal contacts 856. Interposer layer 860 may further be disposed to surround solder bumps 856.

FIGS. 10A-10J illustrate a second method of manufacturing third example LCOS device 800.

Figure 10A:
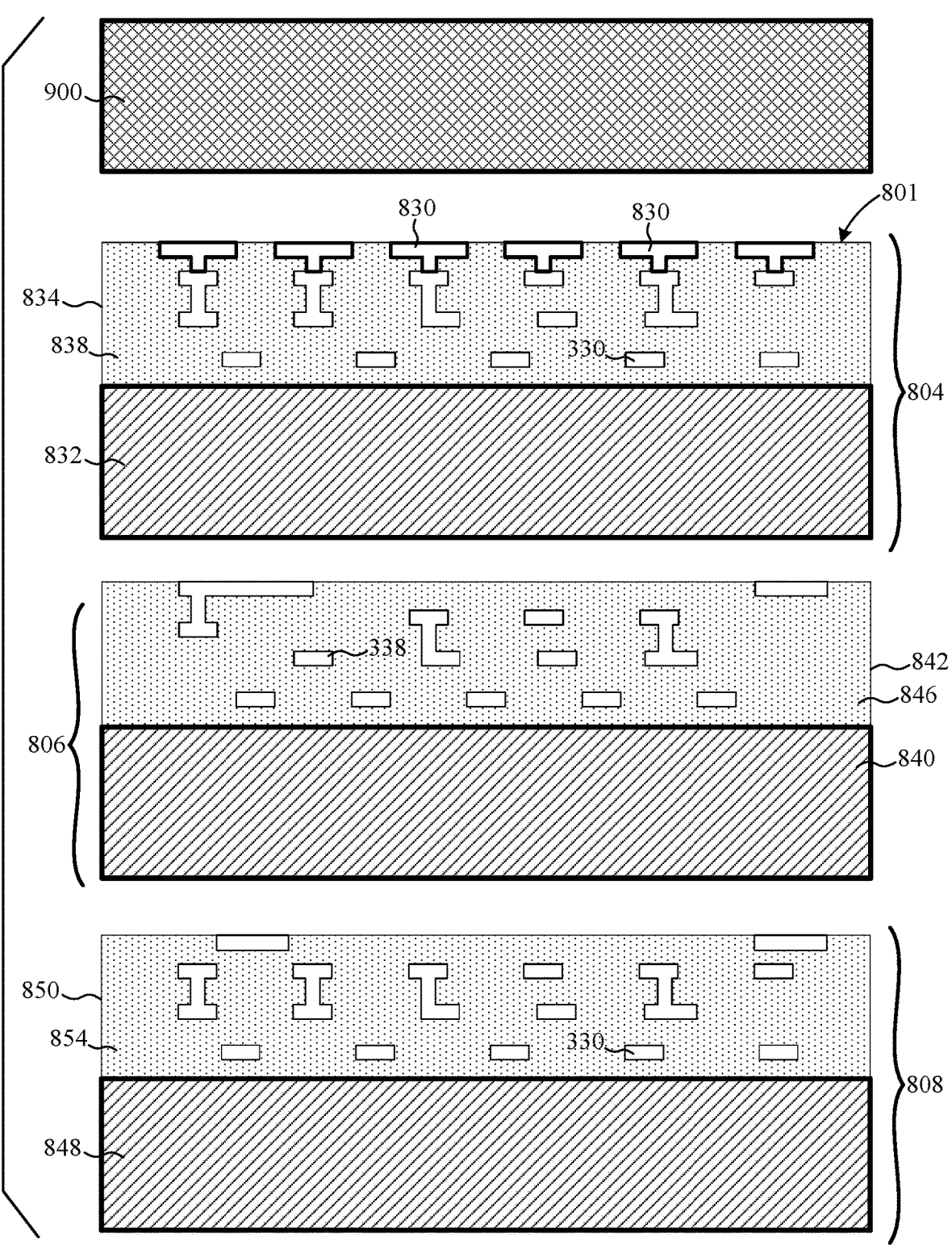
FIG. 10A illustrates a first step in a second example method of manufacturing the third example LCOS display device of FIG. 8.
Figure 10B:
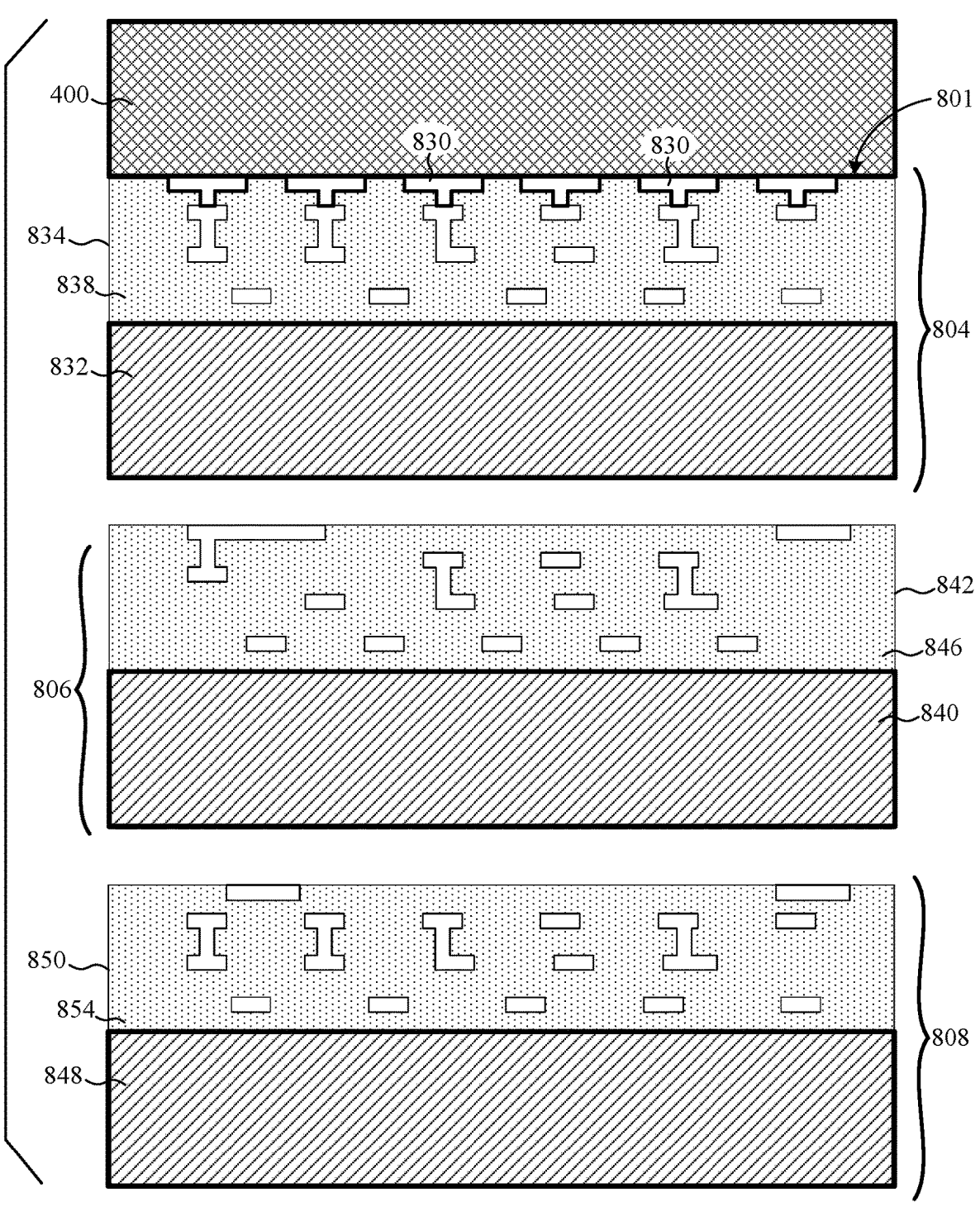
FIG. 10B illustrates a second step in the second example method of manufacturing the third example LCOS display device of FIG. 8.

As illustrated in FIG. 10A, carrier wafer substrate 900, first circuit substrate 804, second circuit substrate 806, and third circuit substrate 808 are provided as separate components. In this particular method, first circuit substrate 804 includes a plurality of pixel mirrors 830 already formed on top surface 801 of interconnect layer 834. Then, as illustrated in FIG. 10B, a carrier wafer substrate 900 is bonded (e.g. temperature bonded) to top surface 801 of interconnect layer 834.

Figure 10C:
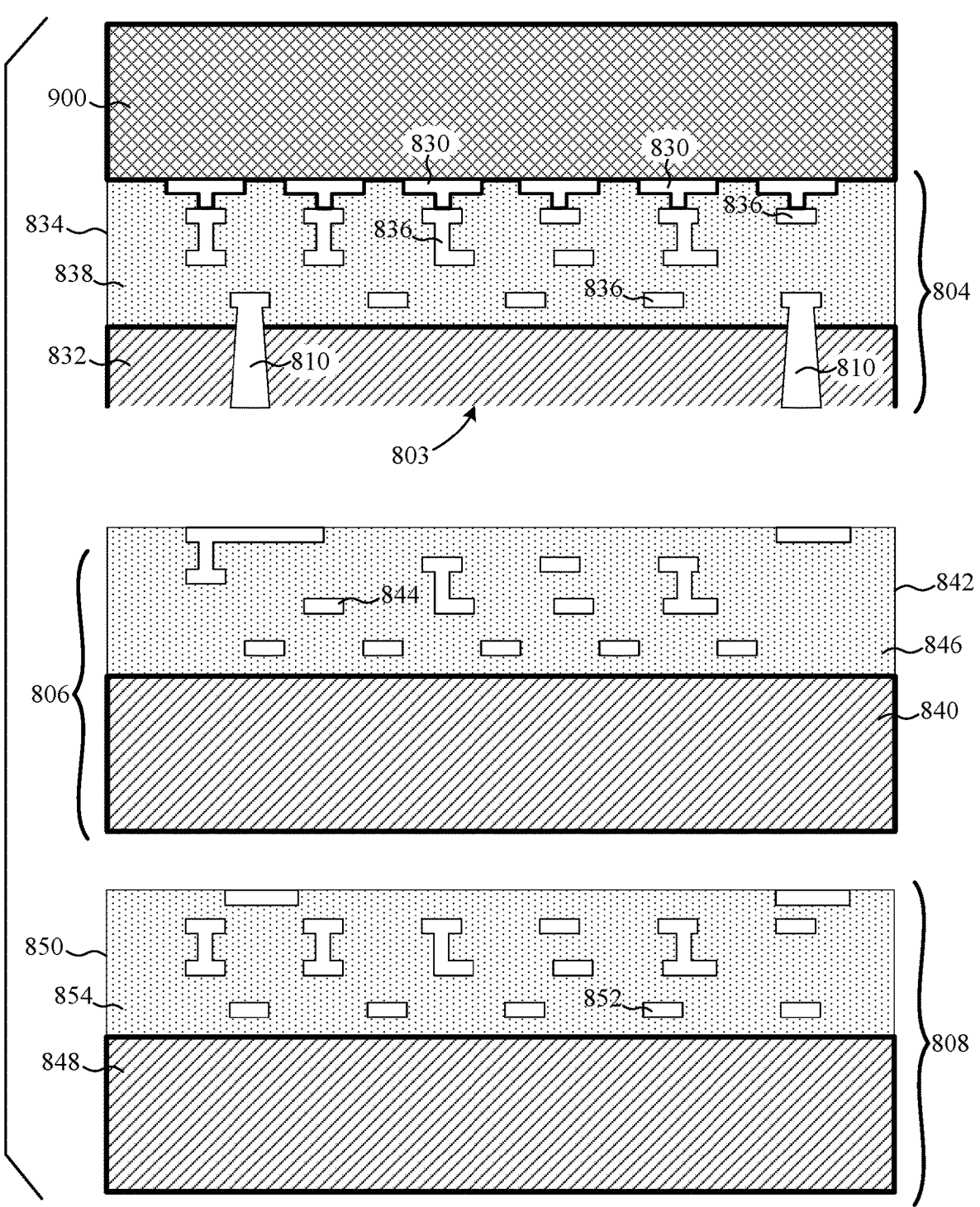
FIG. 10C illustrates a third step in the second example method of manufacturing the third example LCOS display device of FIG. 8.

Next, as illustrated in FIG. 10C, silicon substrate 832 is thinned down by removing material from the bottom surface 803 of silicon substrate 832 by some suitable means such as, for example, back grinding, back lapping, chemical etching, etc. After silicon substrate 832 is thinned down, the first set of TSVs 810 are formed through bottom surface 803 and silicon substrate 832. During formation of conductive TSVs included in the first set of TSVs 810, TSVs included in the first set of TSVs 810 are electrically connected to certain ones of metal elements 836 and left exposed on the bottom surface of silicon substrate 832.

Figure 10D:
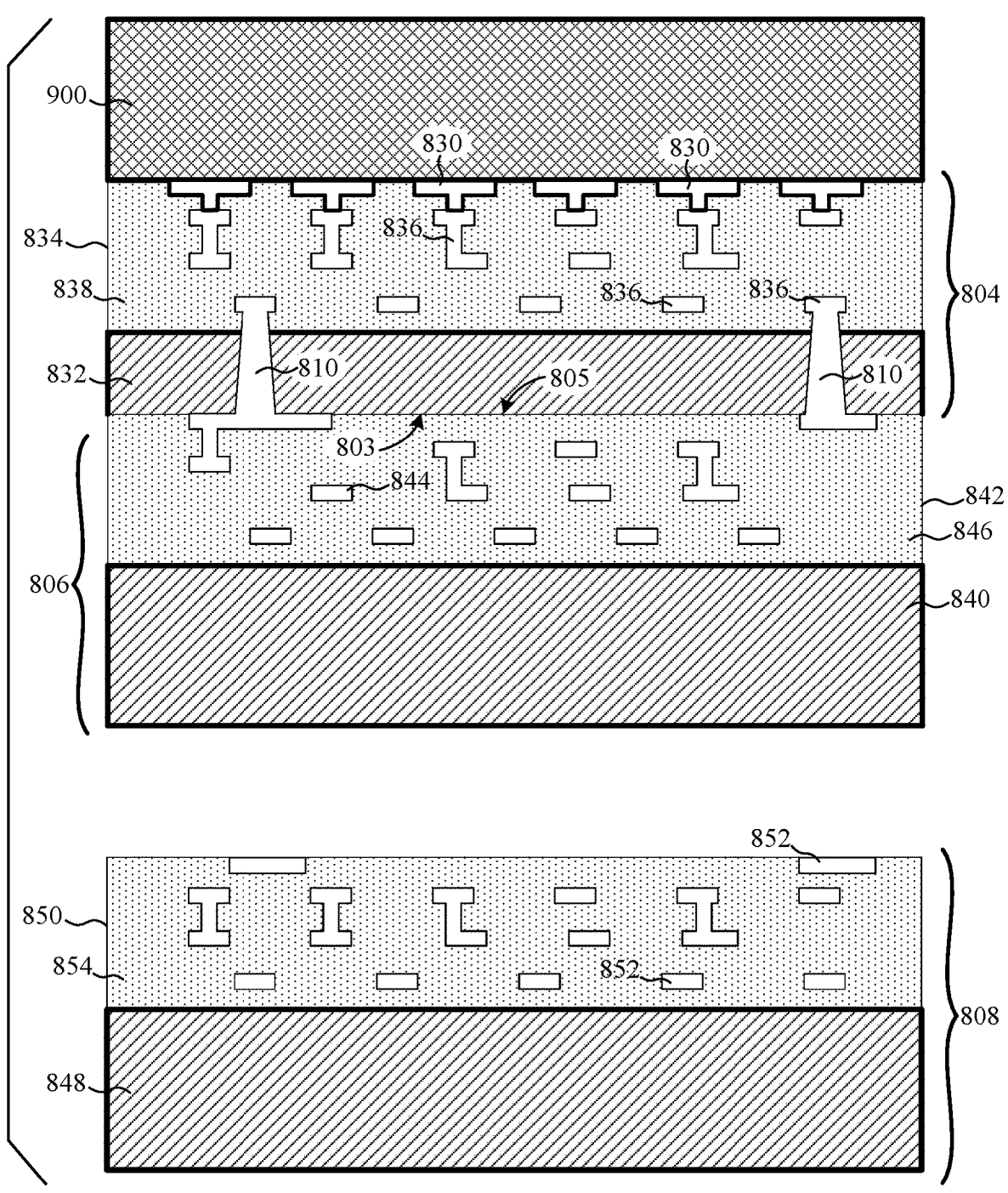
FIG. 10D illustrates a fourth step in the second example method of manufacturing the third example LCOS display device of FIG. 8.

Then, as illustrated in FIG. 10D, the top surface 805 of interconnect layer 842 is bonded to the ground-down bottom surface 803 of silicon substrate 832. The bonding of interconnect layer 842 to silicon substrate 832 includes physically bonding interconnect layer 842 to silicon substrate 832 and also electrically connecting certain ones of metal elements 844 of interconnect layer 842 to respective TSVs included in the first set of TSVs 810.

Figure 10E:
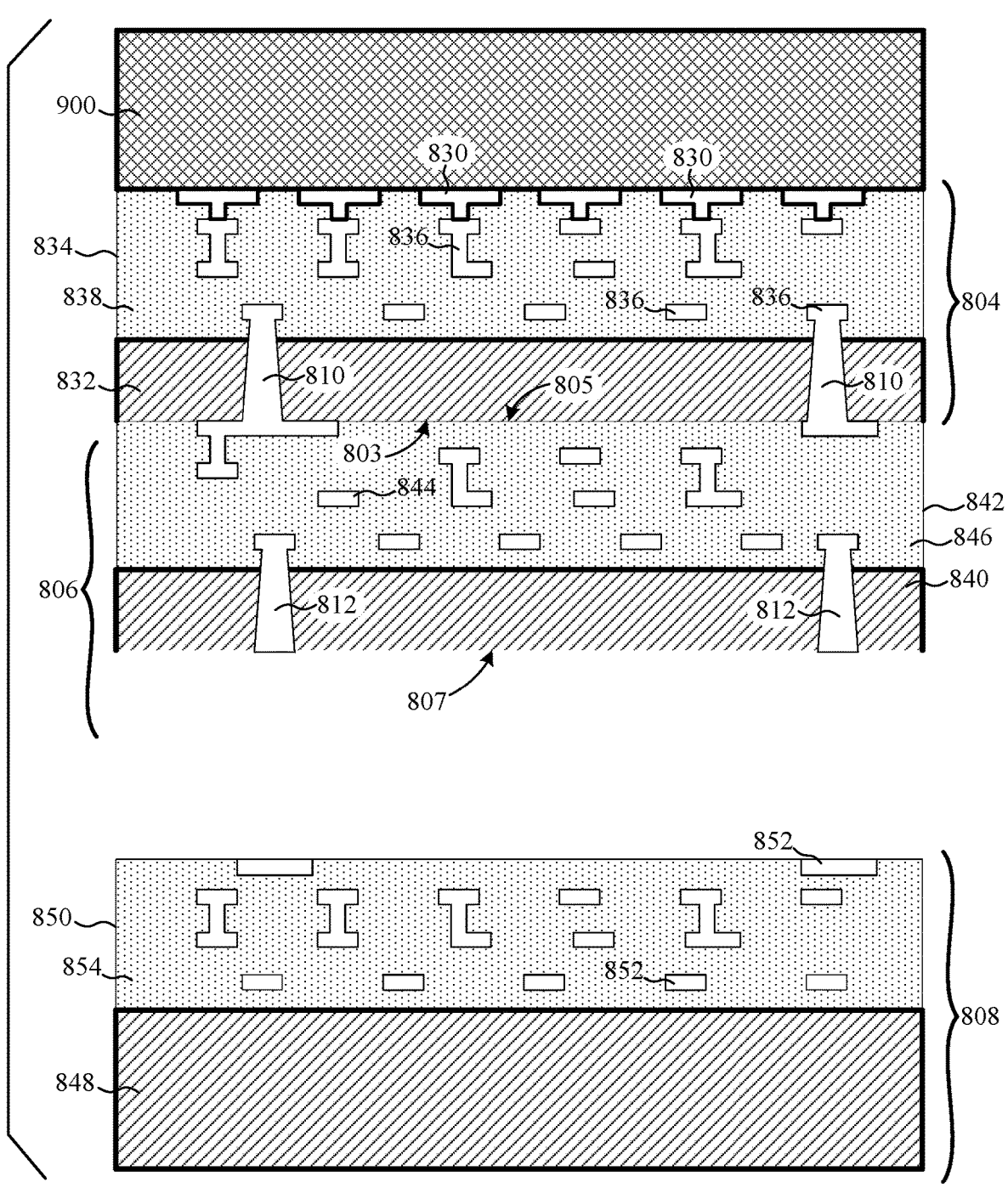
FIG. 10E illustrates a fifth step in the second example method of manufacturing the third example LCOS display device of FIG. 8.

Next, as illustrated in FIG. 10E, silicon substrate 840 is thinned down by removing material from the bottom surface 807 of silicon substrate 840. Once silicon substrate 840 is thinned down, the second set of TSVs 812 are formed through bottom surface 807 and silicon substrate 840. During formation of conductive TSVs included in the second set of TSVs 812, TSVs included in the second set of TSVs 812 are electrically connected to certain ones of metal elements

Figure 10F:
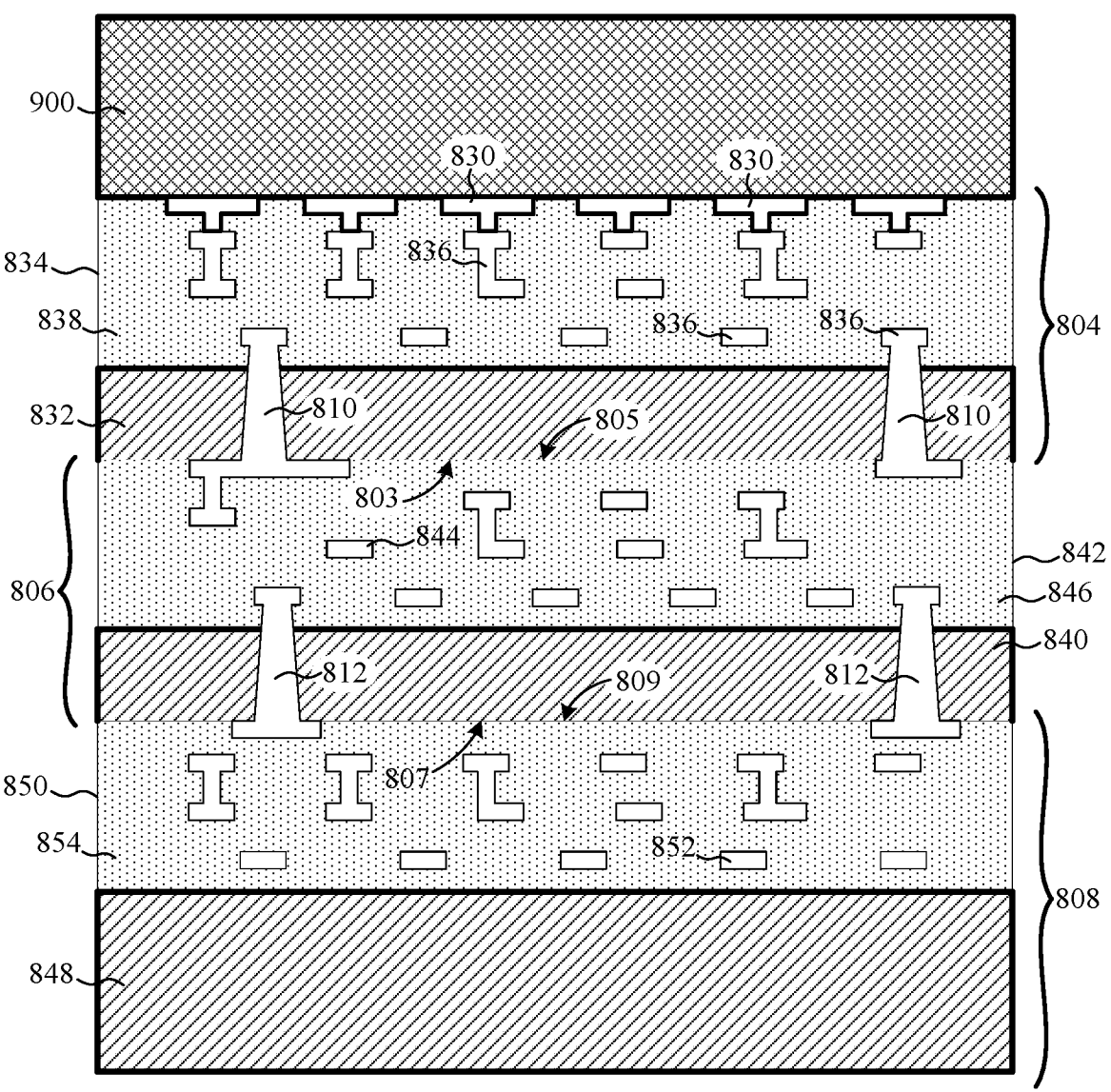
FIG. 10F illustrates a sixth step in the second example method of manufacturing the third example LCOS display device of FIG. 8.

844 and left exposed on the bottom surface 807 of silicon substrate 840. Then, as illustrated in FIG. 10F, the top surface 809 of interconnect layer 850 is bonded to the ground-down bottom surface 807 of silicon substrate 840. The bonding of interconnect layer 850 to silicon substrate 840 includes physically bonding interconnect layer 850 to silicon substrate 840 and also electrically connecting certain ones of metal elements 852 of interconnect layer 850 to TSVs 812.

Figure 10G:
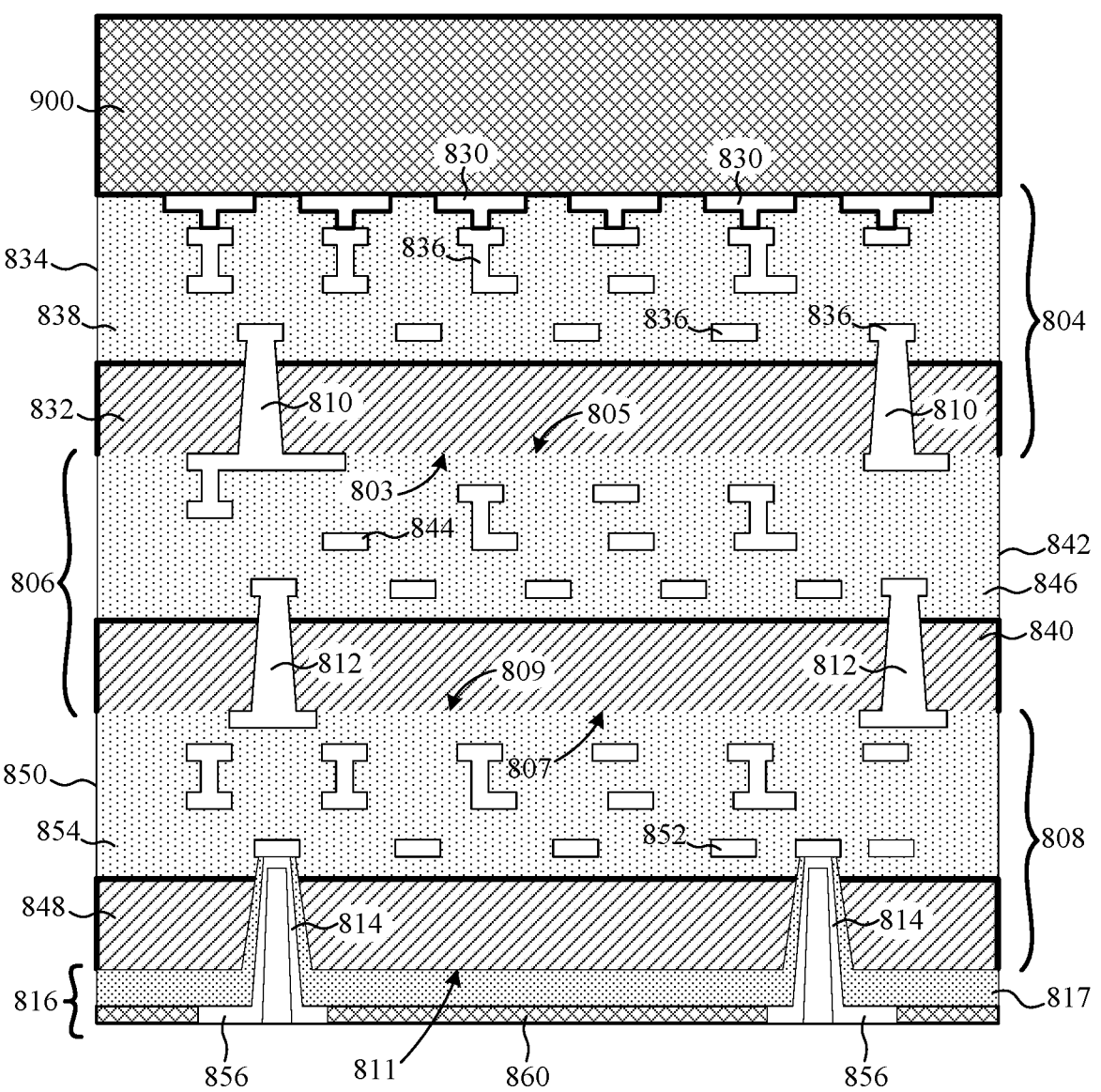
FIG. 10G illustrates a seventh step in the second example method of manufacturing the third example LCOS display device of FIG. 8.

Next, as illustrated in FIG. 10G, the silicon substrate 848 is thinned down, insulating layer 817, the third set of TSVs 814, and portions of CSP structure 816 are formed. Silicon substrate 848 is thinned down by removing material from the bottom surface 811 of silicon substrate 848. TSVs 814 are formed through bottom surface 811 and substrate 848. Insulating layer 817 is deposited after via openings are formed through substrate 848, but before the deposition of the conductive material (e.g., metal) of TSVs included in the third set of TSVs 814. During formation of the third set of TSVs 814 and contact pads 856, TSVs included in the third set of TSVs 814 are electrically connected to certain ones of metal elements 852, and contact pads 856 are left exposed on the bottom surface 811 of insulating layer 817. Interposer layer 860 is then partially formed between and around contact pads 856.

Figure 10H:
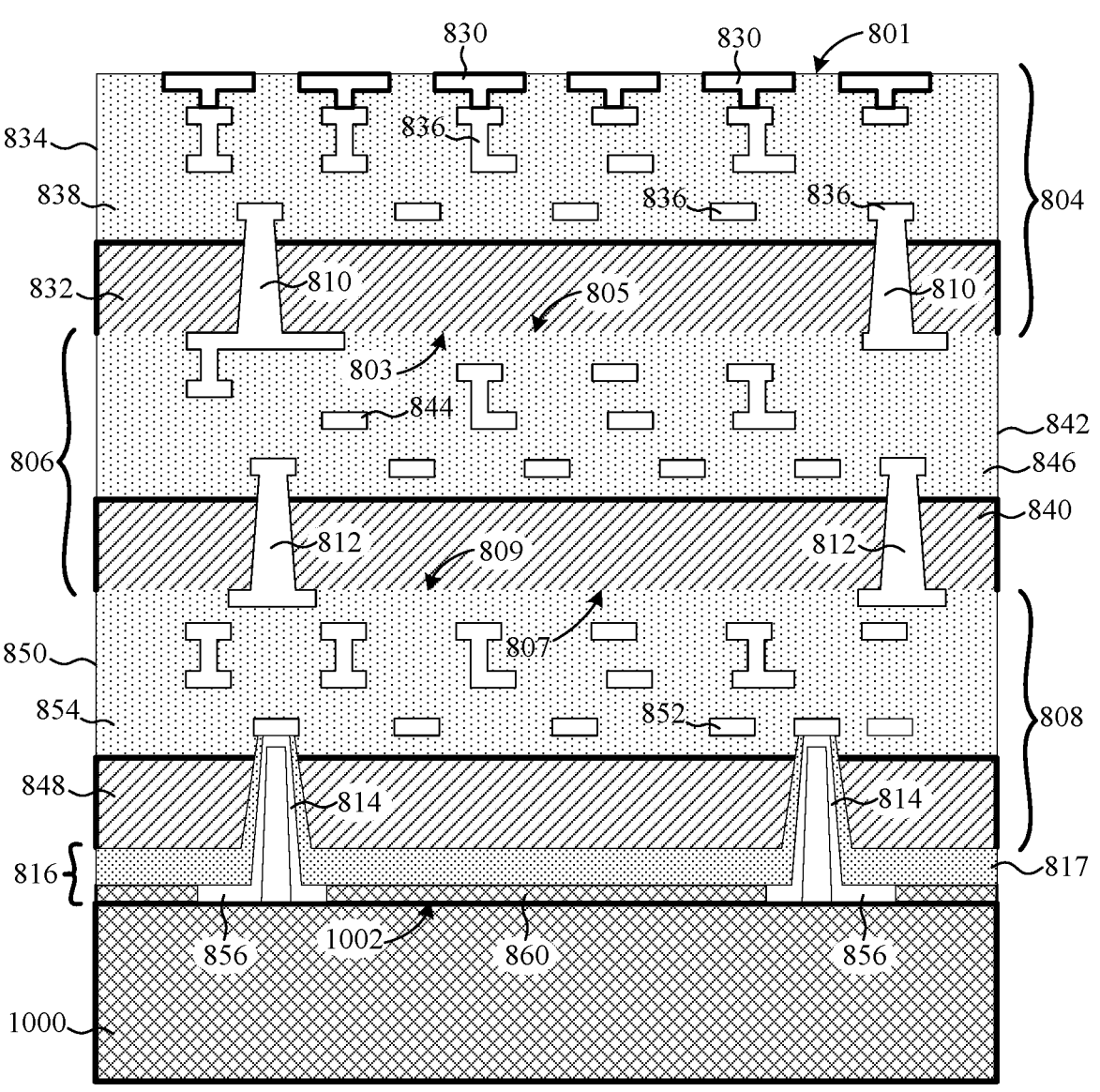
FIG. 10H illustrates an eighth step in the second example method of manufacturing the third example LCOS display device of FIG. 8.

Then, as illustrated in FIG. 10H, a second carrier wafer substrate 1000 is provided and bonded to the bottom surface 1002 of CSP structure 816, and first carrier wafer substrate 900 is de-bonded and removed from top surface 801 of interconnect layer 834.

Figure 10I:
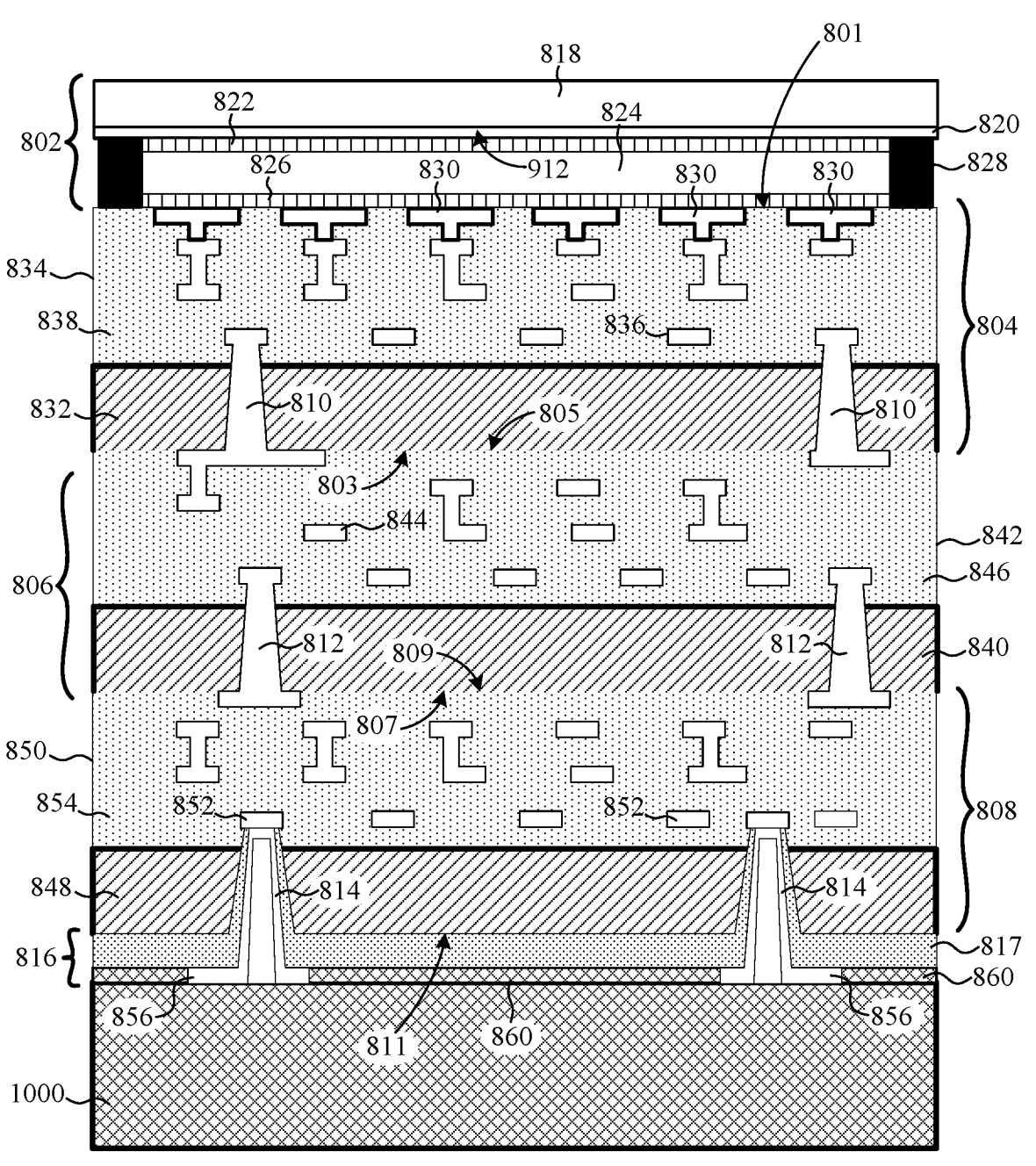
FIG. 10I illustrates a ninth step in the second example method of manufacturing the third example LCoS display device of FIG. 8.

Next, as illustrated in FIG. 10I, display assembly 802 is formed on the top surface 801 of interconnect layer 834, over pixel mirrors 830. That is, alignment layer 822 is formed on the bottom surface 912 of cover glass 818, alignment layer 826 is formed over the top surface 801 of interconnect layer 834 and pixel mirrors 830, dam 828 is sandwiched between the bottom surface 912 of glass 818 and the top surface 801 of interconnect layer 834, and liquid crystal material is deposited in the space bound by dam 828 and alignment layers 822 and 826 to form liquid crystal layer 824.

Figure 10J:
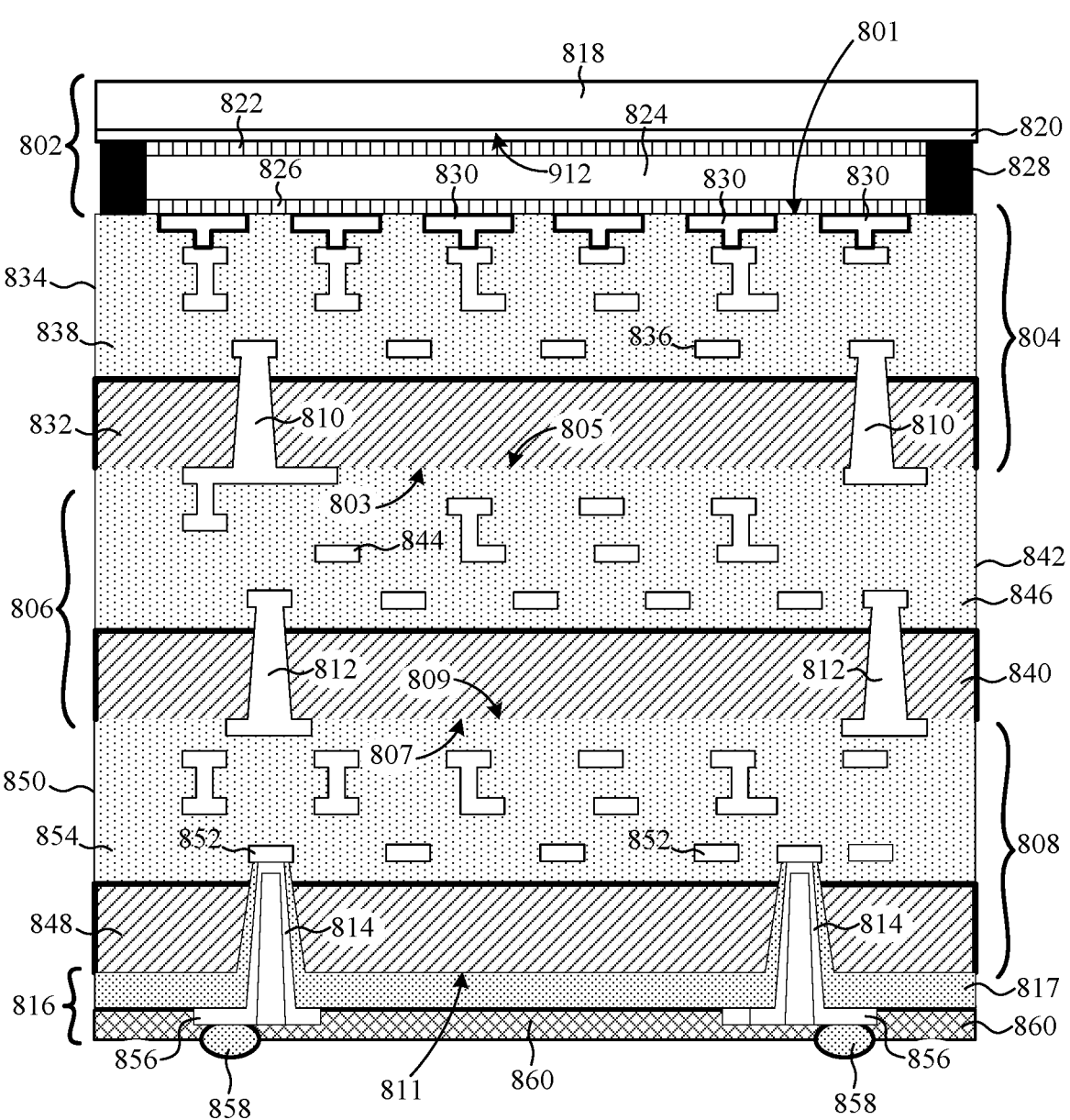
FIG. 10J illustrates a tenth step in the second example method of manufacturing the third example LCOS display device of FIG. 8.

Finally, as illustrated in FIG. 10J, second carrier wafer substrate 1000 is de-bonded and removed from CSP 816, thereby exposing metal contacts 856. Solder balls 858 formed on each of metal contacts 856, and the remainder of interposer layer 860 can be formed.

FIG. 11 is a flowchart summarizing an example method 1100 of manufacturing an LCoS display device. In a first step 1102, a reflective display backplane (RDB) is provided. Circuit substrates 302, 604, and 804 are non-limiting examples of reflective display backplanes. Then, in a second step 1104, TSVs are formed in the RDB. Next, in a third step 1106, according to a first option, liquid crystal display components are assembled on the RDB. Then, in a fourth step 1108, one or more circuit substrates are provided. Next, in a fifth step 1110, any required TSVs are formed in the one or more circuit substrates. Then, in a sixth step 1112, the RDB and one or more circuit substrates are assembled and electrically interconnected in a stacked configuration. Next, in an optional seventh step 1114, a CSP structure is formed on the bottom circuit substrate. Finally, in an eighth step 1116, according to a second option instead of the first option of step 1106, liquid crystal display components are assembled on the RDB.

Figure 12A:
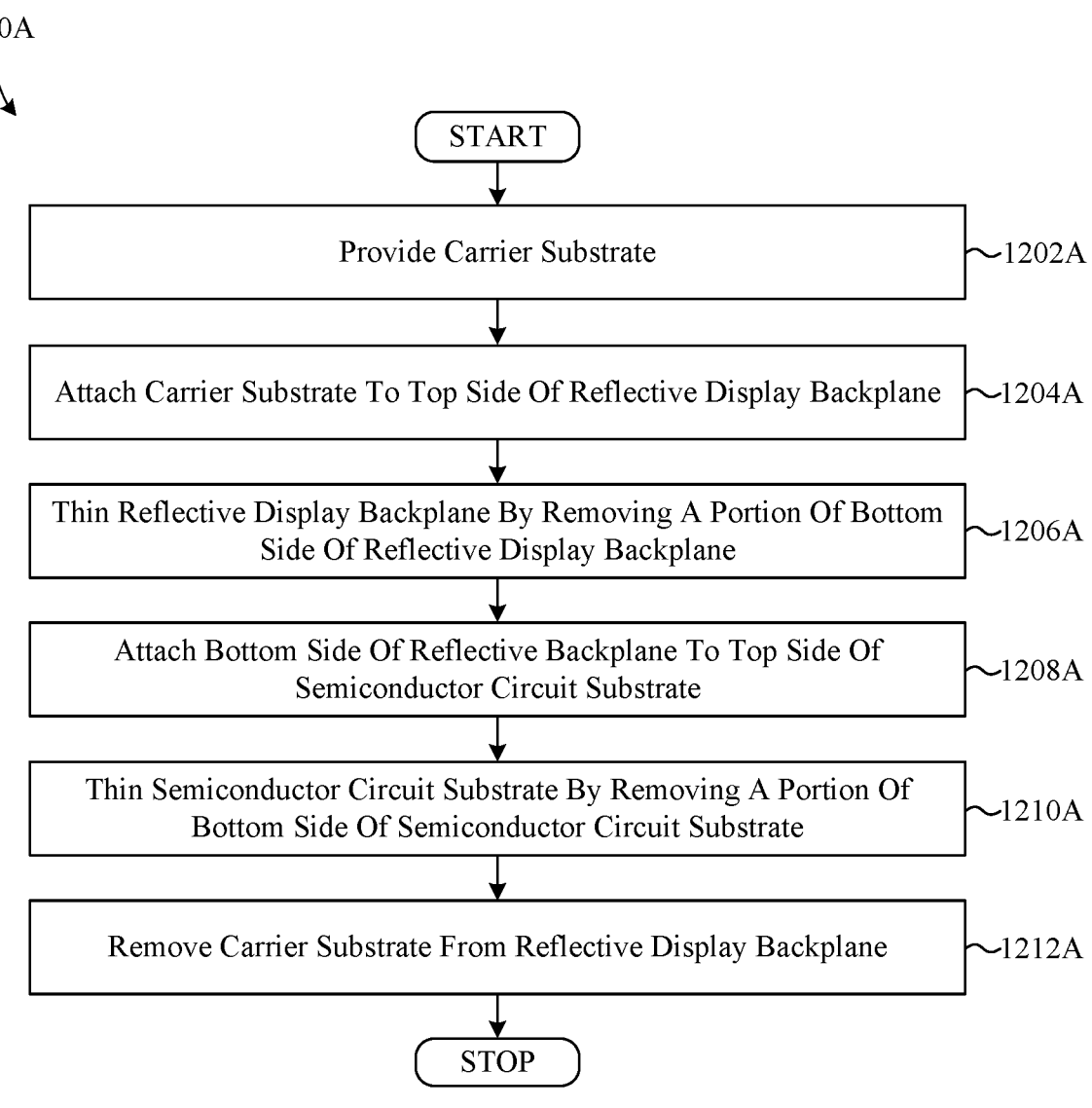
FIG. 12A is a flowchart summarizing an example method of performing step 1112 of the method of FIG. 11.

FIG. 12A is a flowchart summarizing one example method of performing sixth step 1112 of method 1100. In a first step 1202A, a carrier substrate is provided. Then, in a second step 1204A, the carrier substrate is attached to the top side of RDB. Next, in a third step 1206A, the RDB is thinned by removing a portion of the bottom side of RDB. Then, in a fourth step 1208A, the bottom side of RDB is attached to the top side of the circuit substrate. Next, in a fifth step 1210A, the circuit substrate is thinned by removing a portion of the bottom side of the circuit substrate. Finally, in a sixth step 1212A, the carrier substrate is removed from the RDB.

FIG. 12B is a flowchart summarizing another example method of performing sixth step 1112 of method 1100. In a first step 1202B, a carrier substrate is provided. Then, in a second step 1204B, the carrier substrate is attached to the top side of the RDB. Next, in a third step 1206B, the RDB is thinned by removing a portion of the bottom side of the RDB. Then, in a fourth step 1208B, the bottom side of the RDB is attached to the top side of the circuit substrate. Finally, in a fifth step 1210B, the carrier substrate is removed from the RDB.

Figure 12C:
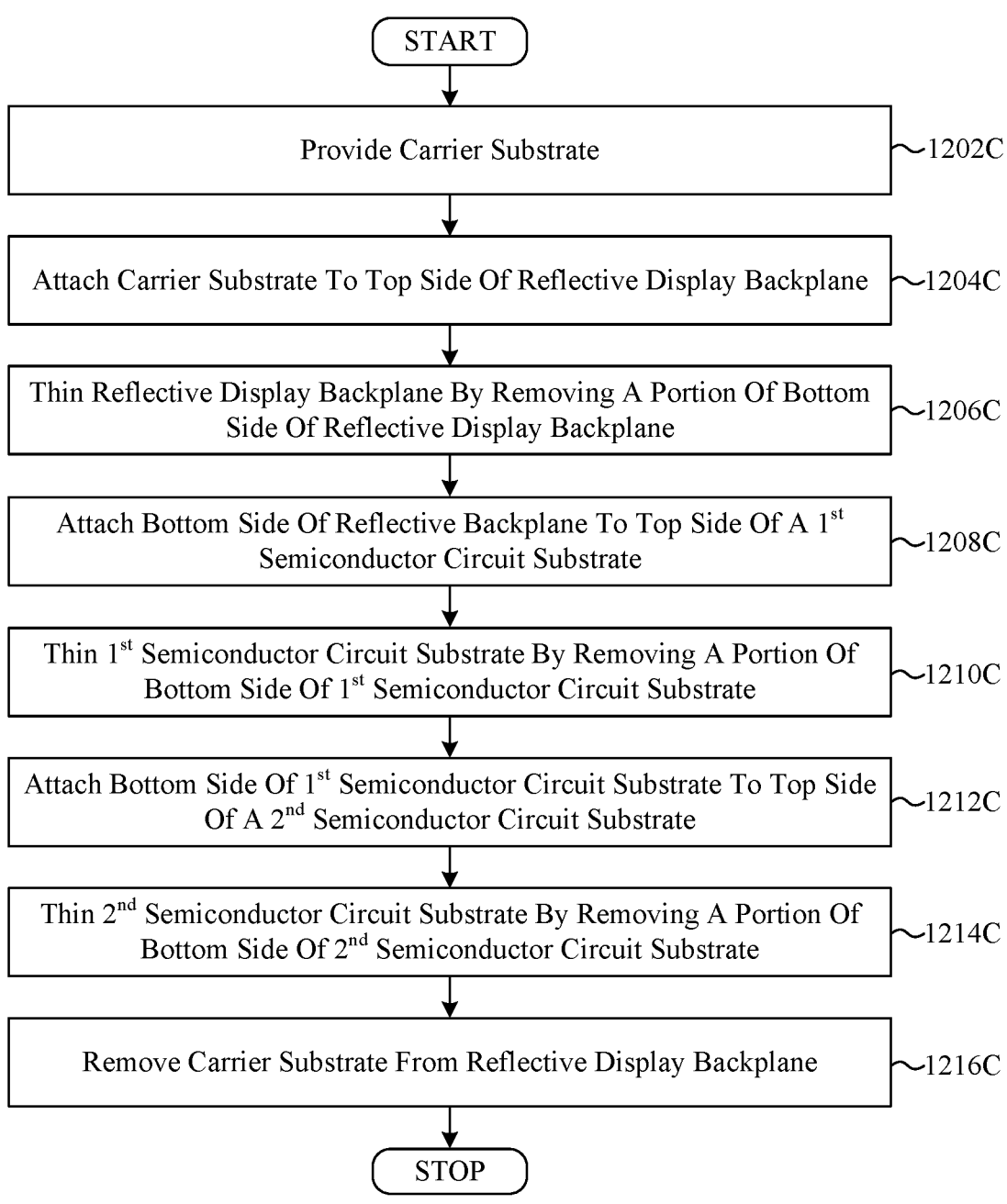
FIG. 12C is a flowchart summarizing yet another example method of performing step 1112 of the method of FIG. 11.

FIG. 12C shows a flowchart summarizing another method of step 1112 of method 1100. In a first step 1202C, a carrier substrate is provided. Then, in a second step 1204C, the carrier substrate is attached to the top side of an RDB. Next, in a third step 1206C, the RDB is thinned by removing a portion of the bottom side of RDB. Then, in a fourth step 1208C, the bottom side of the RDB is attached to the top side of a first circuit substrate. Next, in a fifth step 1210B, the first circuit substrate is thinned by removing a portion of the bottom side of the first circuit substrate. Then, in a sixth step 1212C, the bottom side of the first circuit substrate is attached to the top side of a second circuit substrate. Next, in a seventh step 1214C, the second circuit substrate is thinned by removing a portion of the bottom side of the second circuit substrate. Finally, in an eighth step 1216C, the carrier substrate is removed from the RDB.

Any number of circuit substrates can be added to the stack by repeating sixth step 1212C and seventh step 1214C for each of the subsequent (third, fourth, fifth, . . . ) substrates, before proceeding to eighth step 1216C.

The description of particular embodiments of the present invention is now complete. Many of the described features may be substituted, altered or omitted without departing from the scope of the invention. For example, the LCOS devices disclosed herein can be used in hosting devices different than the AR glasses and goggles presented herein by way of example, including, but not limited to, mobile phones, medical devices, optical systems, and so on. As another example, alternate electrical connections (e.g. stud bumps), may be substituted for the solder balls shown herein by way of example. As another example, the liquid crystal display devices of the present invention are not limited to only two or three circuit substrates in a stacked configuration, but may include any number (i.e. four or more) of circuit substrates configured in a stacked relationship. These and other deviations from the particular embodiments shown will be apparent to those skilled in the art, particularly in view of the foregoing disclosure.

We claim:

1. A liquid crystal display device comprising:
   a first circuit substrate having a first surface, a second surface opposite said first surface, a first set of integrated circuits formed in and on said second surface of said first circuit substrate and including a first set of metal interconnect layers, and an array of conductive pixel mirrors formed over said first set of metal interconnect layers and electrically coupled to said circuits of said first set of integrated circuits via said first set of metal interconnect layers;

a second circuit substrate having a first surface, a second surface opposite said first surface, and a second set of integrated circuits formed in and on said second surface of said second circuit substrate and including a second set of metal interconnect layers;

a first set of conductive vias passing through said first circuit substrate and electrically connecting said first set of metal interconnect layers to said second set of metal interconnect layers;

a layer of liquid crystal material disposed over said array of conductive pixel mirrors; and a transparent electrode disposed over said layer of liquid crystal material.

2. The liquid crystal display device of claim 1, wherein said first set of metal interconnect layers includes at least one bond pad exposed on said first surface of said first circuit substrate.

3. The liquid crystal display device of claim 1, further comprising:

a chip scale packaging (CSP) structure having a first surface and a second surface opposite said first surface, said CSP structure including a first set of contacts formed on said first surface of said CSP structure and a second set of contacts formed on said second surface of said CSP structure; and a second set of conductive vias passing through said second circuit substrate and electrically connecting said second set of metal interconnect layers to said first set of contacts.

4. The liquid crystal display device of claim 1, further comprising:

a third circuit substrate having a first surface, a second surface opposite said first surface, and a third set of integrated circuits formed in and on said second surface of said third circuit substrate and including a third set of metal interconnect layers; and a second set of conductive vias passing through said second circuit substrate and electrically connecting said second set of metal interconnect layers to said third set of metal interconnect layers.

5. The liquid crystal display device of claim 4, further comprising:

a chip scale packaging (CSP) structure having a first surface and a second surface opposite said first surface, said CSP structure including a first set of contacts formed on said first surface of said CSP structure and a second set of contacts formed on said second surface of said CSP structure; and a third set of conductive vias passing through said third circuit substrate and electrically connecting said third set of metal interconnect layers to said first set of contacts.

6. The liquid crystal display device of claim 4, wherein:

said first circuit substrate is a reflective display backplane including a data input and a control signal input;

said second set of integrated circuits includes a video data buffer and a control signal generator configured to generate control signals based on data stored in said data buffer and to provide said control signals to said control signal input of said reflective display backplane; and said third set of integrated circuits includes video processing circuitry.

7. The liquid crystal display device of claim 6, wherein said video processing circuitry includes:

circuitry configured to receive video data of a first format; and circuitry configured to convert said video data of said first format to video data of a second format.

8. The liquid crystal display device of claim 1, wherein:

said first set of integrated circuits includes a plurality of pixel latches, each pixel latch of said array of pixel latches being electrically coupled to an associated one of said conductive pixel mirrors; and said second set of integrated circuits includes a frame buffer configured to store at least one frame of pixel data.

9. The liquid crystal display device of claim 8, wherein said frame buffer has a capacity sufficient to store a plurality of frames of pixel data.

10. The liquid crystal display device of claim 1, wherein:

said first set of integrated circuits operate at a first voltage;

said second set of integrated circuits operate at a second voltage; and said first voltage is higher than said second voltage.

11. The liquid crystal display device of claim 10, further comprising interface circuitry whereby digital video data is transferred from said second set of integrated circuits operating at said second voltage to said first set of integrated circuits operating at said first voltage.

12. The liquid crystal display device of claim 1, wherein:

said first circuit substrate has a technology node of at least 65 nm; and said second circuit substrate has a technology node of 28 nm or less.

13. The liquid crystal display device of claim 12, wherein said first circuit substrate has a technology node of at least 130 nm.

14. The liquid crystal display device of claim 12, wherein said second circuit substrate has a technology node of 22 nm or less.

15. The liquid crystal display device of claim 1, wherein said second set of integrated circuits includes display driver circuits.

16. The liquid crystal display device of claim 15, wherein said display driver circuits include control circuitry and memory.

17. The liquid crystal display device of claim 1, further comprising:

a dam surrounding said layer of liquid crystal material; and wherein said first set of integrated circuits, said first set of metal interconnect layers, said second set of integrated circuits, and said second set of metal interconnect layers are all contained within a space defined by a perimeter of said dam projected along an axis perpendicular to said first surface of said first circuit substrate.

18. A liquid crystal display device comprising:

a first circuit substrate including a top surface, an opposite bottom surface, an array of pixel mirrors formed on said top surface, a first set of integrated circuits configured to assert pixel data on said pixel mirrors, and a plurality of electrical contacts formed on said bottom surface, said electrical contacts connected to said first set of integrated circuits;

a liquid crystal layer disposed over said pixel mirrors;

a transparent electrode disposed over said liquid crystal layer; and a second circuit substrate including a top surface, a bottom surface opposite said top surface, a second set of electrical contacts formed on said top surface, and a second set of integrated circuits electrically coupled to said second set of electrical contacts, said second set of integrated circuits including a frame buffer configured to store digital video data and control circuitry configured to generate control signals based at least in part on said digital video data; and wherein said first set of electrical contacts is rigidly connected to said second set of electrical contacts, thereby providing a mechanical bond between said first circuit substrate and said second circuit substrate, and providing an electrical connection over which said control signals are communicated from said second set of integrated circuits to said first set of integrated circuits.

19. A method of manufacturing a liquid crystal display device, said method comprising:

providing a reflective display backplane including an array of pixel mirrors;

forming vias through said reflective display backplane;

providing one or more integrated circuit substrates;

forming vias in said one or more integrated circuit substrates;

assembling said reflective display backplane and said one or more integrated circuit substrates in a stacked relationship with said reflective display backplane disposed between a cover glass and said one or more integrated circuit substrates;

electrically connecting circuitry of said reflective display backplane and said one or more integrated circuit substrates by said vias;

forming a chip-scale-package structure on a bottom one of said integrated circuit substrates; and assembling liquid crystal display components over said array of pixel mirrors.

* * * * *